United States Patent
Johnson et al.

(10) Patent No.: US 6,279,946 B1
(45) Date of Patent: Aug. 28, 2001

(54) METHODS FOR CONTROLLING A SYSTEM IN A VEHICLE USING A TRANSMITTING/RECEIVING TRANSDUCER AND/OR WHILE COMPENSATING FOR THERMAL GRADIENTS

(75) Inventors: Wendell C. Johnson, Torrance, CA (US); Wilbur E. Duvall, Kimberling City, MO (US); David S. Breed, Boonton Township, Morris County, NJ (US)

(73) Assignee: Automotive Technologies International Inc., Denville, NJ (US)

( * ) Notice: Subject to any disclaimer, the term of this patent is extended or adjusted under 35 U.S.C. 154(b) by 0 days.

(21) Appl. No.: 09/328,566

(22) Filed: Jun. 9, 1999

Related U.S. Application Data

(60) Provisional application No. 60/088,386, filed on Jun. 9, 1998.

(51) Int. Cl.$^7$ .................................................. B60R 21/32

(52) U.S. Cl. ............................................ 280/735; 701/45

(58) Field of Search ............................... 280/735; 701/45, 701/46, 47; 340/438; 381/338, 353, 150

(56) References Cited

U.S. PATENT DOCUMENTS

| | | |
|---|---|---|
| 3,989,965 * | 11/1976 | Smith et al. . |
| 3,991,607 * | 11/1976 | Niklas . |
| 4,063,549 | 12/1977 | Beretsky et al. . |
| 4,264,788 * | 4/1981 | Keidel et al. . |
| 4,379,212 | 4/1983 | Martin . |
| 4,648,052 | 3/1987 | Friedman et al. .................. 364/550 |
| 4,720,189 | 1/1988 | Heynen et al. ..................... 351/210 |
| 4,771,470 | 9/1988 | Geiser et al. . |
| 4,836,670 | 6/1989 | Hutchinson ......................... 351/210 |
| 4,881,270 | 11/1989 | Knecht et al. ...................... 382/191 |
| 4,950,069 | 8/1990 | Hutchinson ......................... 351/210 |
| 5,008,946 | 4/1991 | Ando ................................. 382/104 |

(List continued on next page.)

FOREIGN PATENT DOCUMENTS

| | | |
|---|---|---|
| 3347442 * | 7/1985 | (DE) . |
| 3832948 * | 3/1990 | (DE) . |
| 342337 | 2/1991 | (JP) . |
| 95/27635 | 10/1995 | (WO) . |

OTHER PUBLICATIONS

Society of Automotive Engineers (SAE) Paper No. 940527, Vehicle Occupant Position Sensing, David S. Breed et al., Feb. 28, 1994–Mar. 3, 1994.

Society of Automotive Engineers (SAE) Paper No. 920124, A Critique of Single Point Sensing, David S. Breed et al., Feb., 1992.

(List continued on next page.)

Primary Examiner—Anne Marie Boehler
Assistant Examiner—Bryan Fischmann
(74) Attorney, Agent, or Firm—Brian Roffe

(57) ABSTRACT

Methods for controlling a system in a vehicle in which radiation is directed from a transducer into the passenger compartment and is reflected off or modified by an object in the passenger compartment and received by the same or a different transducer. When ultrasonic waves in particular are used, several techniques are used to compensate for thermal gradients in the passenger compartment and/or enable the use of a single transducer to send and receive waves. This is accomplished through the use of a tubular mounting structure for the transducers, electronic suppression of ringing of the transducer, mechanical damping of the transducer cone, shaped horns, grills and reflectors for the output of the transducers to precisely control the beam pattern, a logarithmic compression amplifier, a method of temperature compensation based on the change in transducer properties with temperature and/or a dual level network, one level for categorization and the second for occupant position sensing, to improve the accuracy of categorization and the speed of position measurement for dynamic out-of-position.

39 Claims, 41 Drawing Sheets

Standard 40 kHz Ultrasonic Transducer With Damping

U.S. PATENT DOCUMENTS

| | | | |
|---|---|---|---|
| 5,071,160 | 12/1991 | White et al. | 280/735 |
| 5,074,583 | 12/1991 | Fujita et al. | 280/730.1 |
| 5,111,509 | 5/1992 | Takeuchi et al. | 381/150 |
| 5,118,134 | 6/1992 | Mattes et al. | 280/735 |
| 5,181,254 | 1/1993 | Schweizer et al. | 382/100 |
| 5,214,744 | 5/1993 | Schweizer et al. | 395/11 |
| 5,235,339 | 8/1993 | Morrison et al. | 342/159 |
| 5,267,219 * | 11/1993 | Woodward . | |
| 5,282,134 | 1/1994 | Gioutros et al. . | |
| 5,298,732 | 3/1994 | Chen | 250/203.4 |
| 5,305,012 | 4/1994 | Faris | 345/7 |
| 5,390,136 | 2/1995 | Wang | 364/754 |
| 5,482,314 | 1/1996 | Corrado et al. | 280/735 |
| 5,629,681 | 5/1997 | DuVall et al. | 340/438 X |
| 5,653,462 | 8/1997 | Breed et al. | 280/735 |
| 5,684,701 | 11/1997 | Breed | 364/424.055 |
| 5,748,473 | 5/1998 | Breed et al. | 364/424.055 |
| 5,822,707 | 10/1998 | Breed et al. | 701/49 |
| 5,829,782 | 11/1998 | Breed et al. | 280/735 |
| 5,835,613 | 11/1998 | Breed et al. | 382/100 |
| 5,845,000 | 12/1998 | Breed et al. | 382/100 |
| 6,012,006 | 1/2000 | Ohneda et al. | 701/45 |
| 6,029,105 | 2/2000 | Schweizer | 701/45 |
| 6,039,139 | 3/2000 | Breed et al. | 280/735 X |
| 6,064,746 | 5/2000 | Nakamura et al. | 381/353 X |
| 6,078,854 | 6/2000 | Breed et al. | 701/45 X |
| 6,081,757 * | 6/2000 | Breed et al. | 701/45 |
| 6,094,610 | 7/2000 | Steffens, Jr. et al. | 701/45 |

OTHER PUBLICATIONS

How Airbags Works, David S. Breed, Canadian Association of Road Safety Professionals International Conference on Airbags and Seat Belts: Evaluation and Implications for Public Safety, Oct. 19–20, 1992.

Analysis of Hidden Units in a Layered Network Trained to Classify Sonar Targets, R. Gorman and T. Sejnowski, Neural Networks, vol. 1, pp. 75–89, 1988.

Learned Classification of Sonat Targets Using a Massively Parallel Network, R. Gorman and T. Sejnowski, ieee Transactions on Acoustics, Speech and Signal Processing, vol. 36, No. 7, pp. 1135–1140, Jul., 1988.

* cited by examiner

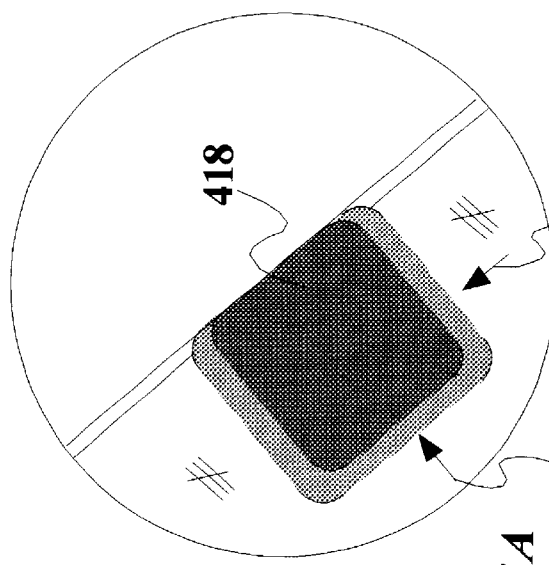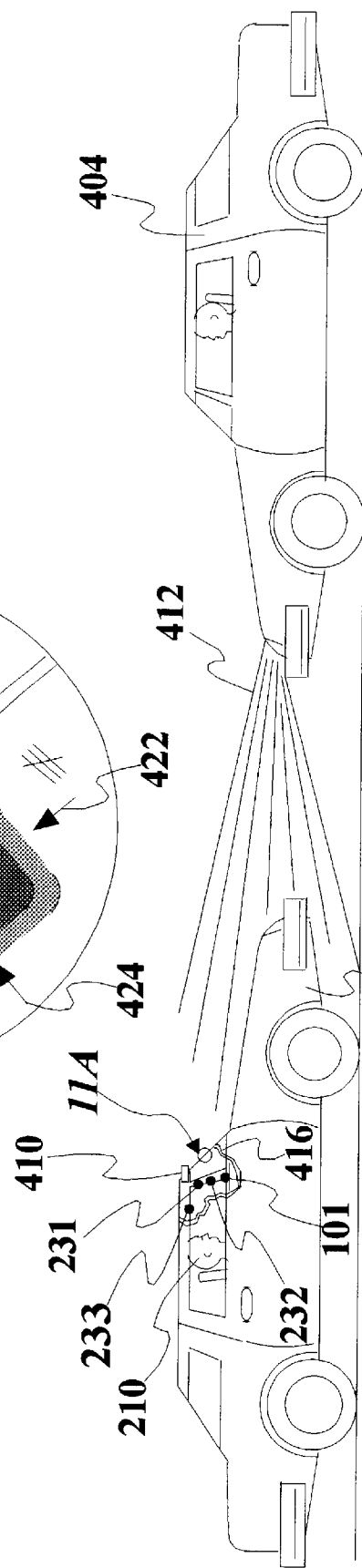

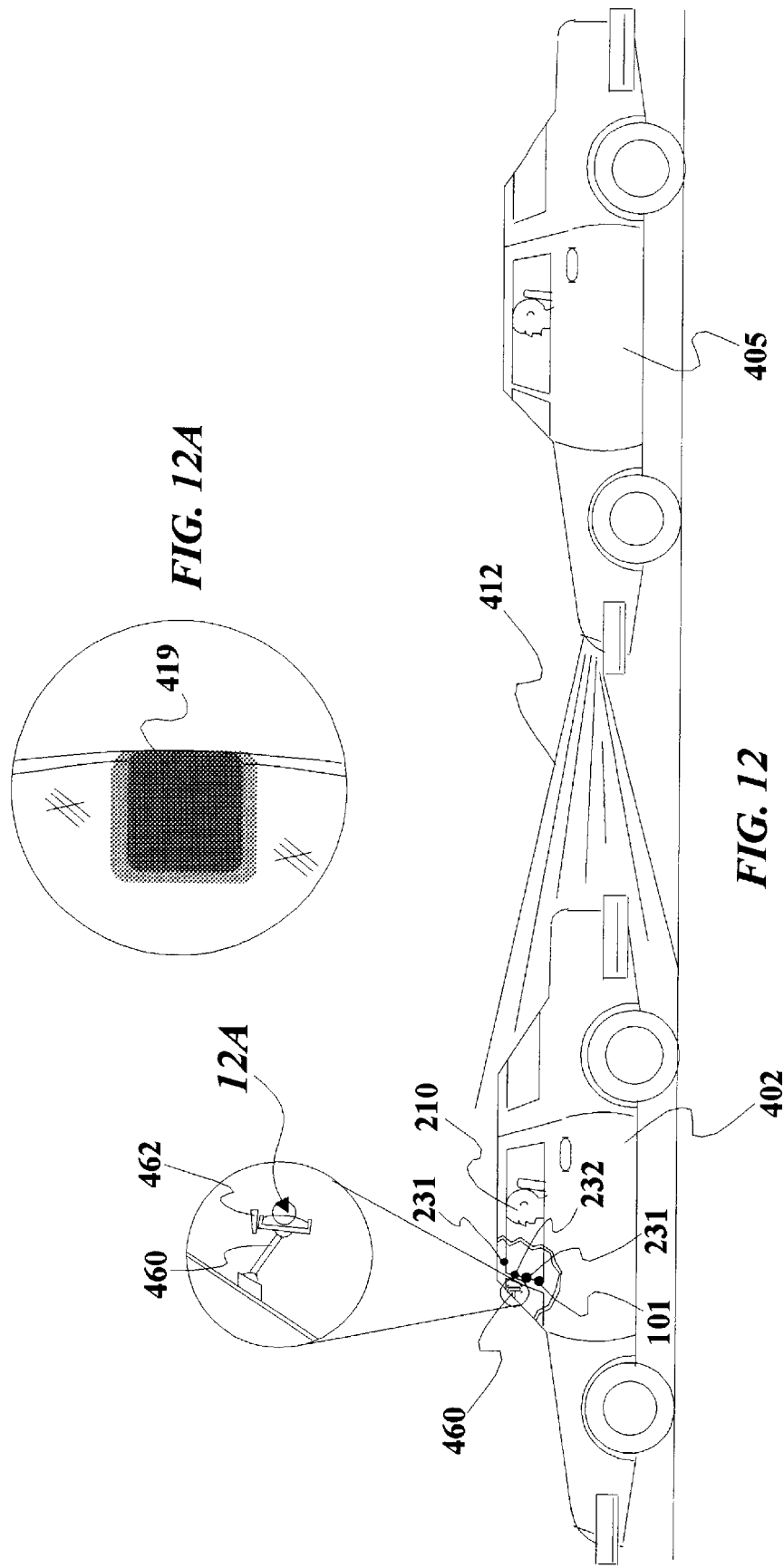

STANDARD 40 kHz ULTRASONIC TRANSDUCER WITH DAMPING

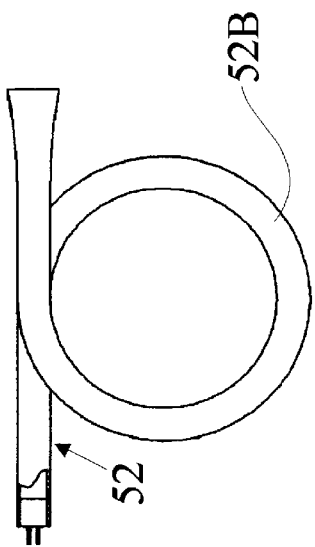
FIG. 32D
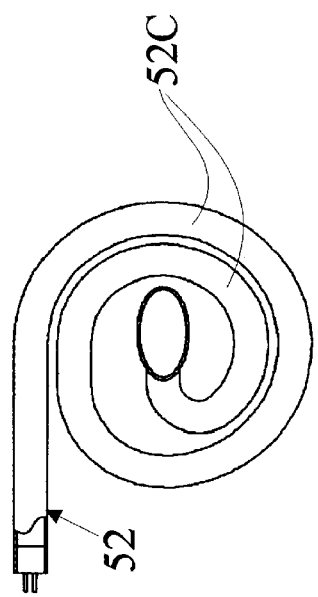
FIG. 32E
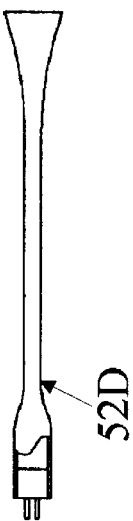
FIG. 32F
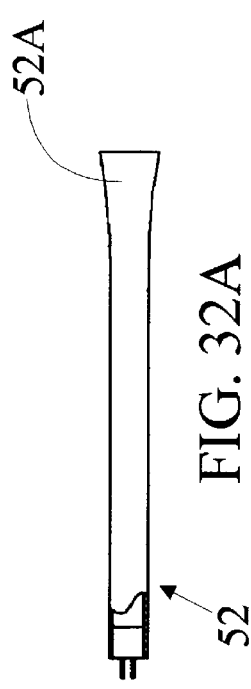
FIG. 32A
FIG. 32B
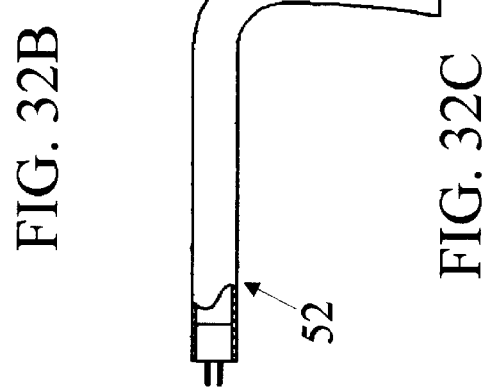
FIG. 32C

STANDARD CONFIGURATION

MODIFIED CONFIGURATION

METHODS FOR CONTROLLING A SYSTEM IN A VEHICLE USING A TRANSMITTING/ RECEIVING TRANSDUCER AND/OR WHILE COMPENSATING FOR THERMAL GRADIENTS

CROSS REFERENCE TO RELATED APPLICATIONS

This application claims priority under 35 U.S.C. 119(e) of U.S. provisional patent application Ser. No. 60/088,386 filed Jun. 9, 1998.

This application is related to: (i) U.S. patent application Ser. No. 08/505,036 entitled "Vehicle Occupant Position And Velocity Sensor" filed Jul. 21, 1995 (now U.S. Pat. No. 5,653,462), which is a continuation of U.S. patent application Ser. No. 08/040,978 filed Mar. 31, 1993, now abandoned, which in turn is a continuation of U.S. patent application Ser. No. 07/878,571 filed May 5, 1992, now abandoned; (ii) U.S. patent application Ser. No. 08/239,978 entitled "Vehicle Interior Identification and Monitoring System" filed May 9, 1994 (now U.S. Pat. No. 5,829,782); (iii) U.S. patent application Ser. No. 08/474,786 entitled "Optical Identification and Monitoring System Using Pattern Recognition for use with Vehicles" filed Jun. 7, 1995, now U.S. Pat. No. 5,845,000; (iv) U.S. patent application Ser. No. 08/474,783 entitled "Automatic Vehicle Seat Adjuster" filed Jun. 7, 1995, now U.S. Pat. No. 5,822,707; (v) U.S. patent application Ser. No. 08/474,784 entitled "Automatic Vehicle Seat Adjuster" filed Jun. 7, 1995, now U.S. Pat. No. 5,748,473; (vi) U.S. patent application Ser. No. 08/474,782 entitled "Optical Identification and Monitoring System Using Pattern Recognition for use with Vehicles" filed Jun. 7, 1995 now U.S. Pat. No. 5,835,613; and, (vii) U.S. patent application Ser. No. 08/798,029 entitled "Method of Identifying The Presence and Orientation of an Object in a Vehicle" filed Feb. 6, 1997, now allowed, which are all incorporated by reference herein.

FIELD OF THE INVENTION

The present invention relates to the field of sensing, detecting, monitoring and identifying various objects, and parts thereof, which are located within the passenger compartment of a motor vehicle. In particular, the present invention provides improvements to ultrasonic transducers, and systems of such transducers, which improve the speed and accuracy and reduce the cost and complexity of systems, and which are efficient and highly reliable for detecting a rear facing child seat (RFCS), situated in the passenger compartment in a location where it may interact with a deploying airbag, or for detecting an out-of-position occupant. This permits the selective suppression of airbag deployment when the deployment may result in greater injury to the occupant than the crash forces. This is accomplished in part through (i) the use of a tubular mounting structure for the transducers; (ii) the use of electronic suppression of transducer ringing; (iii) the use of mechanical damping of the transducer cone, all three of which permits the use of a single transducer for both sending and receiving; (iv) the use of multiple frequencies thereby permitting the simultaneous transmission of all transducers thereby reducing the time and increasing the accuracy of dynamic occupant position measurements; (v) the use of shaped horns, grills and reflectors for the output of the transducers to precisely control the beam pattern and thereby minimizing false echoes; (vi) the use of a logarithmic compression amplifier to minimize the effects of thermal gradients in the vehicle; (vii) the use of a method of temperature compensation based on the change in transducer properties with temperature; and, (viii) the use of a dual level network, one level for categorization and the second for occupant position sensing, to improve the accuracy of categorization and the speed of position measurement for dynamic out-of-position.

BACKGROUND OF THE INVENTION

In 1984, the National Highway Traffic Safety Administration (NHTSA) of the U.S. Department of Transportation issued a requirement for frontal crash protection of automobile occupants. This regulation mandated "passive occupant restraints" for all passenger cars by 1992. A more recent regulation requires both driver and passenger side airbags on all passenger cars and light trucks by 1998. In addition, the demand for airbags is accelerating in both Europe and Japan and it is expected that, now virtually all vehicles produced in these areas (36 million vehicles) are equipped and eventually worldwide (50 million vehicles) will be equipped with airbags as standard equipment.

Whereas thousands of lives have been saved by airbags, significant improvements can be made. As discussed in detail in U.S. Pat. No. 5,653,462 referenced above, and included herein by reference, for a variety of reasons, vehicle occupants can be or get too close to the airbag before it deploys and can be seriously injured or killed by the deployment of the airbag.

Also, a child in a rear facing child seat, which is placed on the right front passenger seat, is in danger of being seriously injured if the passenger airbag deploys. This has now become an industry-wide concern and the US automobile industry is urgently searching for an easy, economical solution, which will prevent the deployment of the passenger side airbag if a rear facing child seat is present. An improvement on the invention disclosed in the above-referenced patent application, as will be disclosed in greater detail below, includes more sophisticated means to identify objects within the passenger compartment and will solve this problem.

Initially, these systems will solve the out-of-position occupant and the rear facing child seat problems related to current airbag systems and prevent unneeded deployments when a seat is unoccupied. Airbags are now under development to protect rear seat occupants in frontal and side vehicle crashes. A system will therefore be needed to detect the presence and position of occupants, to determine if they are out-of-position, and type to identify the presence of a rear facing child seat in the rear seat, for example. Future automobiles can be expected to have eight or more airbags as protection is sought for rear seat occupants and from side impacts. In addition to eliminating the disturbance of unnecessary airbag deployments, the cost of replacing these airbags will be excessive if they all deploy in an accident. The improvements described below minimize this cost by not deploying an airbag for a seat that is not occupied by a human being. An occupying item of a seat may be a living occupant such as a human being or dog, another living organism such as a plant, or an inanimate object such as a box or bag of groceries.

A device to monitor the vehicle interior and identify its contents is needed to solve these and many other problems. For example, once a Vehicle Interior Identification and Monitoring System (VIMS) for identifying and monitoring the contents of a vehicle is in place, many other products become possible including the following:

1. Inflators now exist which will adjust the amount of gas flowing to the airbag to account for the size and position of the occupant and for the severity of the accident. The vehicle identification and monitoring system of this invention will control such inflators based on the presence and position of vehicle occupants or of a rear facing child seat.

2. Side impact airbag systems began appearing on 1995 vehicles. The danger of deployment induced injuries exist for side impact airbags as they now do for frontal impact airbags. A child with his head against the airbag is such an example. The system of this invention will minimize such injuries.

3. Future vehicles may be provided with a standard cellular phone as well as the Global Positioning System (GPS), an automobile navigation or location system, which is now available on several vehicle models. In the event of an accident, the phone may automatically call 911 for emergency assistance and report the exact position of the vehicle. If the vehicle also has a system as described below for monitoring each seat location, the number and perhaps the condition of the occupants could also be reported. In that way, the emergency service (EMS) would know what equipment and how many ambulances to send to the accident site.

4. Vehicle entertainment system engineers have stated that the quality of the sound in the vehicle could be improved if the number, size and location of occupants and other objects were known. This information can be provided by the vehicle interior identification and monitoring system of this invention.

5. Similarly to the entertainment system, the heating, ventilation and air conditioning system (HVAC) could be improved if the number, attributes and location of vehicle occupants were known. This can be used to provide a climate control system tailored to each occupant, for example, or the system can be turned off for certain seat locations if there are no occupants present at those locations.

6. In some cases, the position of a particular part of the occupant is of interest such as: (a) the occupant's hand or arm and whether it is in the path of a closing window so that the motion of the window needs to be stopped; (b) the position of the occupant's shoulder so that the seat belt anchorage point can be adjusted for the best protection of the occupant; or, (c) the position of the rear of the occupant's head so that the headrest can be adjusted to minimize whiplash injuries in rear impacts.

The above applications illustrate the wide range of opportunities that become available if the identity and location of various objects and occupants, and some of their parts, within the vehicle were known. Once the system is operational, it would be logical for the system to also incorporate the airbag electronic sensor and diagnostics module (SDM) since it needs to interface with SDM anyway and since the two electronic circuits could share computer capabilities resulting in a significant cost saving to the auto manufacturer. For the same reasons, it would be logical for VIMS to include the side impact sensor and diagnostic system since occupant sensing systems can also be used with side airbags.

As the VIMS improves to where the exact location of the occupants ears and eyes can be determined, even more significant improvements to the entertainment system become possible through the use of noise canceling sound, and the rear view mirror can be automatically adjusted for the driver's eye location. Another example involves the monitoring of the driver's behavior over time which can be used to warn a driver if he or she is falling asleep, or to stop the vehicle if the driver loses the capacity to control it.

Using an advanced VIMS, as explained below, the position of the driver's eyes can be accurately determined and portions of the windshield can be selectively darkened to eliminate the glare from the sun or oncoming vehicle headlights. This system uses electro-chromic glass, a liquid crystal system, or other appropriate technology, and detectors to detect the direction of the offending light source. In addition to eliminating the glare, the sun visor can now also be eliminated.

1. Prior Art on Apparatus for Sensing Out-of-position Occupants and Rear Facing Child Seats Whereas thousands of lives have been saved by airbags, a large number of people have also been injured, and almost 150 people have now been killed, by the deploying airbag, and thus significant improvements need to be made to eliminate these deaths and injuries. As discussed in detail in one or more of the patents and copending patent applications cross-referenced above, for a variety of reasons vehicle occupants may be too close to the airbag before it deploys, or, if unbelted, may be thrown there by the crash dynamics and can be seriously injured or killed as a result of the airbag deployment. Also, a child in a rear facing child seat which is placed on the right front passenger seat is in danger of being seriously injured if the passenger airbag deploys. For these reasons and, as first publicly disclosed in Breed, D. S. "How Airbags Work" presented at the International Conference on Seatbelts and Airbags in 1993, in Canada, occupant position sensing and rear facing child seat detection is required in order to minimize the damages caused by deploying airbags.

Inflators now exist which have the capability of adjusting the amount of gas flowing into the airbag to account for the size and position of the occupant and for the severity of the accident and thereby adapt the deployment of the airbag to the occupant and accident. The vehicle identification and monitoring system (VIMS) discussed in U.S. Pat. No. 5,829,782, among others, can control such inflators based on the presence and position of vehicle occupants or of a rear facing child seat. The instant invention is an improvement on that VIMS system and uses an advanced ultrasonic system comprising two or more ultrasonic transmitters/receivers combined with a trained neural network or neural-fuzzy pattern recognition system as discussed in much greater detail below.

The automatic adjustment of the deployment rate of the airbag based on occupant identification and position and on crash severity has been termed "smart airbags". Central to the development of smart airbags is the occupant identification and position system described herein. Such smart airbag systems are described in more detail in U.S. patent application Ser. No. 08/865,525 entitled "Smart Airbag System" filed May 29, 1997 which is also included herein by reference. To complete the development, an anticipatory crash detecting system such as disclosed in U.S. patent application Ser. No. 08/247,760 filed May 23, 1994 is desirable. Prior to the implementation of anticipatory crash sensing, the use of a neural network smart crash sensor which identifies the type of crash and thus its severity based on the early part of the crash acceleration signature should be developed and thereafter implemented. U.S. Pat. No. 5,684,701 to Breed, describes a crash sensor based on neural networks. This crash sensor, as with all other crash sensors, determines whether or not the crash is of sufficient severity to require deployment of the airbag and, if so, initiates the deployment. A neural network based on a smart airbag crash sensor can also be designed to identify the crash and categorize it with regard to severity thus permitting the airbag deployment to be matched not only to the characteristics and position of the occupant but also the severity and timing of the crash itself, as more fully described in U.S. patent application Ser. No. 08/247,760.

Significant improvements were made to the art in U.S. patent application Ser. No. 08/798,029 referenced above which describes the method of placement of the transducers to increase the reliability of detecting and discriminating out-of-position occupants, empty seats, and rear facing child-seats. In order to detect occupants that are very close to the transducer in that invention, separate transducers are used for sending and receiving the ultrasonic waves. Also, although that system is capable of detecting out-of-position occupants for most real world cases, in situations where the crash sensor fails to trigger or triggers very late in a high speed crash, the system based on alternately transmitting and receiving from each location can require as much as 50 milliseconds to determine the location of an occupant which can be too slow. The use of one or two transducers for ranging during the crash, giving 10 or 20 millisecond response time, works in most cases but can be defeated if the chosen transducer is blocked by a newspaper, for example. Finally, the wide beam patterns of the transducers used in that system sometimes results in false decisions when an occupant of the rear seat is leaning forward, for example, and the system interprets that as an in position forward facing person even thought in fact it may be a rear facing child seat.

Others have also observed the need for an occupant out-of-position sensor and several methods have been disclosed in certain U.S. patents for determining the position of an occupant of a motor vehicle. Some of these systems will be discussed below and unfortunately have significant limitations.

In White et al. (U.S. Pat. No. 5,071,160), for example, a single acoustic sensor and detector is described and, as illustrated, is mounted lower than the steering wheel. White et al. correctly perceive that such a sensor could be defeated, and the airbag falsely deployed, by an occupant adjusting the control knobs on the radio and thus they suggest the use of a plurality of such sensors but do not disclose where they would be mounted, other than on the instrument panel below the steering wheel, or how they would be combined to uniquely monitor particular locations in the passenger compartment and to identify what is occupying those locations.

Mattes et al. (U.S. Pat. No. 5,118,134) describe a variety of methods of measuring the change in position of an occupant including ultrasonic, active or passive infrared and microwave radar sensors, and an electric eye. Their use of these sensors is to measure the change in position of an occupant during a crash and use that information to assess the severity of the crash and thereby decide whether or not to deploy the airbag. They are thus using the occupant motion as a crash sensor. No mention is made of determining the out-of-position status of the occupant or of any of the other features of occupant monitoring as disclosed in the above cross-referenced patent applications. It is interesting to note that nowhere does Mattes et al. discuss how to use a combination of ultrasonic sensors/transmitters to identify the presence of a human occupant and then to find his/her location in the passenger compartment.

The object of an occupant out-of-position sensor is to determine the location of the head and/or chest of the vehicle occupant relative to the airbag since it is the impact of either the head or chest with the deploying airbag which can result in serious injuries. Both White et al. and Mattes et al. disclose only lower mounting locations of their sensors that are mounted in front of the occupant such as on the dashboard or below the steering wheel. Both such mounting locations are particularly prone to detection errors due to positioning of the occupant's hands, arms and legs. This would require at least three, and preferably more, such sensors and detectors and an appropriate logic circuitry which ignores readings from some sensors if such readings are inconsistent with others, for the case, for example, where the driver's arms are the closest objects to two of the sensors.

White et al. also describe the use of error correction circuitry, without defining or illustrating the circuitry, to differentiate between the velocity of one of the occupant's hands, as in the case where he/she is adjusting the knob on the radio, and the remainder of the occupant. Three ultrasonic sensors of the type disclosed by White et al. might, in some cases, accomplish this differentiation if two of them indicated that the occupant was not moving while the third was indicating that he or she was moving. Such a combination, however, is not disclosed in White and would not differentiate between an occupant with both hands and arms in the path of the ultrasonic transmitter at such a location that they were blocking a substantial view of the occupant's head or chest. Since the sizes and driving positions of occupants are extremely varied, trained pattern recognition systems, such as neural networks, are required when a clear view of the occupant, unimpeded by his/her extremities, cannot be guaranteed. White et al. does not suggest the use of such neural networks.

Fujita et al., in U.S. Pat. No. 5,074,583, describe another method of determining the position of the occupant but do not use this information to suppress deployment if the occupant is out-of-position, or if a rear facing child seat is present. In fact, the closer that the occupant gets to the airbag the faster the inflation rate of the airbag is according to the Fujita patent, which thereby increases the possibility of injuring the occupant. Fujita et al. do not measure the occupant directly but instead determine his or her position indirectly from measurements of the seat position and the vertical size of the occupant relative to the seat. This occupant height is determined using an ultrasonic displacement sensor mounted directly above the occupant's head.

Finally, Corrado et al., in U.S. Pat. No. 5,482,314 describe a method of determining the location of an occupant based on the "fusion" of the information from an ultrasonic and a passive infrared sensor. The passive infrared sensor can be easily fooled by: (i) an occupant holding a cup of coffee near to where a rear facing child seat would be located; (ii) an increase in the ambient temperature to above body temperature; (iii) the use of a blanket to cover the occupant of a rear facing child seat; (iv) or by any other method by which the sensor is blocked such as by a newspaper or map. The ultrasonic sensor is used only in a ranging mode and therefore can only measure the distance to the closest object which may by a newspaper or balloon or the occupant's hat or hand. Since both sensor systems are easily fooled the combination is also unreliable. Nowhere in the patent does it answer the question of which sensor to believe if one says one thing and the other something else.

It is important to note that in all cases in the prior art, except those assigned to the current assignee of the instant invention, where ultrasonic sensors are used to determine displacement, only the initial return of reflected waves is used so that only the distance to the closest part of the object can be determined. In contrast, in the instant invention, the return echo pattern over several milliseconds corresponding to the entire portion of the passenger compartment volume of interest is analyzed providing distance information to many points on the items occupying the passenger compartment.

2. Definitions

The use of pattern recognition is central to the instant invention as well as those cross-referenced patent applications above, although the improvements disclosed herein may also be used in other systems and therefore this invention is not limited to systems using pattern recognition. Nowhere in the prior art, except in that assigned to the current assignee of the instant invention, is pattern recognition which is based on training, as exemplified through the use of neural networks, mentioned for use in monitoring the interior passenger compartment or exterior environments of the vehicle.

"Pattern recognition" as used herein will mean any system which processes one or more signals that are generated by an object, e.g., representative of a pattern of returned or received impulses, waves or other physical property specific to and/or characteristic of and/or representative of that object, or is modified by interacting with an object, in order to determine to which one of a set of classes that the object belongs. Such a system might determine only that the object is or is not a member of one specified class, or it might attempt to assign the object to one of a larger set of specified classes, or find that it is not a member of any of the classes in the set. The signals processed generally include a series of electrical signals coming from transducers that are sensitive to acoustic (ultrasonic) or electromagnetic radiation.

A trainable or a trained pattern recognition system as used herein means a pattern recognition system which is taught to recognize various patterns constituted within the signals by subjecting the system to a variety of examples. The most successful such system is the neural network or neural fuzzy system. Thus, to generate the pattern recognition algorithm, test data is first obtained which constitutes a plurality of sets of returned waves, or wave patterns and other information from weight, seat position sensors etc., from an object and an indication of the identify of that object, i.e., a number of different objects are tested to obtain the unique patterns in the data from each object. As such, the algorithm is generated, and stored in a computer processor, which is later applied to provide the identity of an object based on the patterns in the data being received during use by a wave receiver and other transducers connected to the processor. For the purposes, the identity of an object sometimes applies to not only the object itself but also to its location in the passenger compartment. For example, a rear facing child seat is a different object than a forward facing child seat and an out-of-position adult is a different object than a normally seated adult.

To "identify" as used herein will mean to determine that the object belongs to a particular set or class. The class may be one containing, for example, all rear facing child seats, one containing all human occupants, or all human occupants not sitting in a rear facing child seat depending on the purpose of the system. In the case where a particular person is to be recognized, the set or class will contain only a single element, i.e., the person to be recognized.

An "occupying item" of a seat may be a living occupant such as a human being or a dog, another living organism such as a plant, or an inanimate object such as a box or bag of groceries.

"Out-of-position" as used for an occupant means that the occupant, either driver or passenger, is sufficiently close to the airbag prior to deployment that he or she is likely to be more seriously injured by the deployment event itself than by the accident. This typically occurs when the occupant's head or chest is closer than some distance such as about 5 inches from the deployment door of the airbag module. The actual distance value where airbag deployment should be suppressed depends on the design of the airbag module and is typically further for the passenger airbag than for the driver airbag.

"Dynamic out-of-position" refers to the situation where a vehicle occupant, either driver or passenger, is in position at a point in time prior to an accident but becomes out-of-position, (that is, too close to the airbag module so that he or she could be injured or killed by the deployment of the airbag,) prior to the deployment of the airbag due to pre-crash braking or other action which causes the vehicle to decelerate prior to a crash.

"Transducer" as used herein in conjunction with ultrasonics or electromagnetics will in general mean the combination of a transmitter and a receiver. In some cases, the same device will serve both as the transmitter and receiver while in others two separate devices adjacent to each other will be used. In the instant invention, a single transducer will in general be used for both sending and receiving at a particular location.

"Thermal instability" or "thermal gradients" refers to the situation where a change in air density causes a change in the path of ultrasonic waves from what the path would be in the absence of the density change. This density change ordinarily occurs due to a change in the temperature of a portion of the air through which the ultrasonic waves travel. The high speed flow of air (wind) through the passenger compartment can cause a similar effect. Thermal instability is generally caused by the sun beating down on the top of a closed vehicle ("long-term thermal instability") of through the operation of the heater or air conditioner ("short-term thermal instability"). Of course other heat sources can cause a similar effect and thus the term as used herein is not limited to the examples provided.

In the description herein on anticipatory sensing, the term "approaching" when used in connection with the mention of an object or vehicle approaching another will mean the relative motion of the object toward the vehicle having the anticipatory sensor system. Thus, in a side impact with a tree, the tree will be considered as approaching the side of the vehicle and impacting the vehicle. In other words, the coordinate system used in general will be a coordinate system residing in the target vehicle. The "target" vehicle is the vehicle which is being impacted. This convention permits a general description to cover all of the cases such as where (i) a moving vehicle impacts into the side of a stationary vehicle, (ii) where both vehicles are moving when they impact, or (iii) where a vehicle is moving sideways into a stationary vehicle, tree or wall.

3. Pattern Recognition Prior Art Japanese patent 3-42337 (A) to Ueno discloses a device for detecting the driving condition of a vehicle driver comprising a light emitter for irradiating the face of the driver and a means for picking up the image of the driver and storing it for later analysis. Means are provided for locating the eyes of the driver and then the irises of the eyes and then determining if the driver is looking to the side or sleeping. Ueno determines the state of the eyes of the occupant rather than determining the location of the eyes relative to the other parts of the vehicle passenger compartment. Such a system can be defeated if the driver is wearing glasses, particularly sunglasses, or another optical device which obstructs a clear view of his/her eyes. Pattern recognition technologies such as neural networks are not used.

U.S. Pat. No. 5,008,946 to Ando uses a complicated set of rules to isolate the eyes and mouth of a driver and uses this information to permit the driver to control the radio, for example, or other systems within the vehicle by moving his eyes and/or mouth. Ando uses natural light and illuminates only the head of the driver. He also makes no use of trainable pattern recognition systems such as neural networks, nor is there any attempt to identify the contents of the vehicle nor of their location relative to the vehicle passenger compartment. Rather, Ando is limited to control of vehicle devices by responding to motion of the driver's mouth and eyes.

U.S. Pat. No. 5,298,732 to Chen also concentrates in locating the eyes of the driver so as to position a light filter between a light source such as the sun or the lights of an oncoming vehicle, and the driver's eyes. Chen does not explain in detail how the eyes are located but does supply a calibration system whereby the driver can adjust the filter so that it is at the proper position relative to his or her eyes. Chen references the use of an automatic equipment for determining the location of the eyes but does not describe how this equipment works. In any event, there is no mention of monitoring the position of the occupant, other that the eyes, of determining the position of the eyes relative to the passenger compartment, or of identifying any other object in the vehicle other than the driver's eyes. Also, there is no mention of the use of a trainable pattern recognition system.

U.S. Pat. No. 5,305,012 to Faris also describes a system for reducing the glare from the headlights of an oncoming vehicle. Faris locates the eyes of the occupant by the use of two spaced apart infrared cameras using passive infrared radiation from the eyes of the driver. Again, Faris is only interested in locating the driver's eyes relative to the sun or oncoming headlights and does not identify or monitor the occupant or locate the occupant, a rear facing child seat or any other object for that matter, relative to the passenger compartment or the airbag. Also, Faris does not use trainable pattern recognition techniques such as neural networks. Faris, in fact, does not even say how the eyes of the occupant are located but refers the reader to a book entitled Robot Vision (1991) by Berthold Horn, published by MIT Press, Cambridge, Mass. Also, Faris uses the passive infrared radiation rather than illuminating the occupant with ultrasonic radiation as in the instant invention.

The use of neural networks or neural-fuzzy systems as the pattern recognition technology is central to occupant sensing since it makes the monitoring system robust, reliable and practical. The resulting algorithm created by the neural network program is usually only a few dozen to a hundred or so lines of code written in the C computer language as opposed to typically several hundred or more of lines when the techniques of the above patents to Ando, Chen and Faris are implemented. As a result, the resulting systems are easy to implement at a low cost making them practical for automotive applications. The cost of the ultrasonic transducers, for example, is expected to be less than about $1 in automotive quantities. Similarly, the implementation of the techniques of the above referenced patents requires expensive microprocessors while the implementation with neural networks and similar trainable pattern recognition technologies permits the use of low cost microprocessors typically costing less than about $5 in automotive quantities of approximately 1,000,000 units per year or more.

The present invention uses sophisticated trainable pattern recognition capabilities such as neural networks. Usually the data is preprocessed, as discussed below, using various feature extraction, filtering, pruning and other mathematical techniques. A non-automotive example of such a pattern recognition system using neural networks on sonar signals is discussed in two papers by Gorman, R. P. and Sejnowski, T. J. "Analysis of Hidden Units in a Layered Network Trained to Classify Sonar Targets", Neural Networks, Vol. 1. pp. 75–89, 1988, and "Learned Classification of Sonar Targets Using a Massively Parallel Network", IEEE Transactions on Acoustics, Speech, and Signal Processing, Vol. 36, No. 7, July 1988. Examples of feature extraction techniques can be found in U.S. Pat. No. 4,906,940 entitled "Process and Apparatus for the Automatic Detection and Extraction of Features in Images and Displays" to Green et al. Examples of other more advanced and efficient pattern recognition techniques can be found in U.S. Pat. No. 5,390,136 entitled "Artificial Neuron and Method of Using Same and U.S. patent application Ser. No. 08/076,601 entitled "Neural Network and Method of Using Same" to Wang, S. T. Other examples include U.S. Pat. No. 5,235,339 (Morrison et al.), U.S. Pat. No. 5,214,744 (Schweizer et al), U.S. Pat. No. 5,181,254 (Schweizer et al), and U.S. Pat. No. 4,881,270 (Knecht et al). All of the above references are included herein by reference.

4. Ultrasonics

Ultrasonics can be used in several configurations for monitoring the interior of a passenger compartment of an automobile as described in the cross referenced patents and patent applications. In one known system, for example, two ultrasonic sensors are placed on the A-pillar and in another system, a third sensor is additionally placed in the headliner. It has been found in both of these cases that even though the proper identification is made in a high percentage of the cases, there are still a small but significant number of cases where an error in diagnosis is made based on the information received from the sensors. These systems, although a significant improvement over the other prior art, still fail to achieve the very high reliability desired by the automobile manufacturers. This shortcoming was substantially solved in Ser. No. 08/798,029 cross referenced above.

In the cases of the instant invention, and that of Ser. No. 08/798,029, as will discussed in more detail below, regardless of the number of transducers used, a trained pattern recognition system, as defined above, is used to identify and classify, and in some cases to locate, the illuminated object and its constituent parts. This invention is particularly directed toward improving the invention of Ser. No. 08/798, 029 by decreasing the sensing time, reducing the cost, improving the system response to objects which are near to the transducer mounting, and improving the ability of the system to compensate for thermal gradients and variations in the speed of sound.

5. Applications

The applications for this technology are numerous as described in the copending patent applications listed above. However, the main focus of the instant invention is for the detection of the presence of a child seat in the rear facing position or an out-of-position occupant and the detection of an occupant in a normal seating position. In the former two cases, deployment of the airbag will be suppressed and in the latter, it will be enabled.

Some examples of alternative VIMS systems follow:

In a passive infrared system one or more detectors receive infrared radiation from an object in their fields of view, in this case the vehicle occupant, and determines the temperature of the occupant based on the infrared radiation. The VIMS can then respond to the temperature of the occupant, which can either be a child in a rear facing child seat or a normally seated occupant, to control some other system. This technology could provide input data to a pattern recognition system but it has limitations related to temperature. The sensing of the child could pose a problem if the child is covered with blankets. It also might not be possible to differentiate between a rear facing child seat and a forward facing child seat. In all cases, the technology will fail to detect the occupant if the ambient temperature reaches body temperature as it does in hot climates. Nevertheless, for use in the control of the vehicle climate, for example, a passive infrared system that permits an accurate measurement of each occupant's temperature is useful.

In an optical system an infrared radiation source, frequently a light emitting diode or other laser, is used to momentarily illuminate an object, occupant or child seat in the manner as described, and illustrated in FIG. 8, of U.S. Pat. No. 5,653,462 referenced above. In some cases, a charge-coupled device (a type of TV camera also referred to as a CCD array) or a CMOS device is used to receive the reflected light. If a laser is used as the infrared light source, it can either be used in a scanning mode, or, through the use of a lens, a cone of light can be created which covers a large portion of the object. In each case, a pattern recognition system, as defined above, is used to identify and classify, and can be used to locate, the illuminated object and its constituent parts. This system provides the most information about the object and at a rapid data rate. Its main drawback is cost which is considerably above that of ultrasonic or passive infrared systems. As the cost of infrared light sources and detectors is coming down, this system is now becoming more competitive. Depending on the implementation of the system, there may be some concern for the safety of the occupant if the laser light can enter the occupant's eyes.

Radar systems have similar properties to the infrared system discussed above. The wavelength of a particular radar system can limit the ability of the pattern recognition system to detect object features smaller than a certain size. Once again, however, there is some concern about the health effects of radar on children and other occupants. This concern is expressed in various reports available from the United States Food and Drug Administration Division of Devices.

The ultrasonic system, which is the primary focus of this invention, is the least expensive and potentially provides less information than the infrared or radar systems due to the delays resulting from the speed of sound and due to the wave length which is considerably longer than the infrared systems. The wavelength limits the detail, which can be seen by the system. Additionally, ultrasonic waves are sometimes strongly affected by thermal gradients within the vehicle such as caused by flowing air from the heater or air conditioner or as caused by the sun heating the top of the vehicle resulting in the upper part of the passenger compartment having a higher temperature than the lower part. Thermal gradients cause density changes in the air, which diffract the ultrasonic signal sending in a direction away from an object or the transducer. Although this effect has been reported in the literature no solution has been proposed prior to the present invention.

In spite of these limitations, as shown below, ultrasonics can provide sufficient timely information to permit the position and velocity of an occupant to be accurately known and, when used with an appropriate pattern recognition system, it is capable of positively determining the presence of a rear facing child seat, for example. One pattern recognition system which has been used to identify a rear facing child seat, empty seat, out-of-position occupant, etc., uses neural networks and is similar to that described in the above referenced papers by Gorman et al. Alternately, a neural-fuzzy system is now showing some promise of higher accuracy than the pure neural network system. One problem with pure neural network systems is that although the system is quite good at interpolating between vehicle passenger compartment occupancy configurations which it has been trained on, it sometimes does poorly when confronted with a totally new configuration. Neural-fuzzy systems have demonstrated the ability to better handle these situations.

A focusing system, such as used on some camera systems, could be used to determine the initial position of an occupant but is too slow to monitor his position during a crash. This is a result of the mechanical motions required to operate the lens focusing system. By itself it cannot determine the presence of a rear facing child seat or of an occupant but when used with a charge-coupled device, or CMOS array, plus some infrared illumination for night vision, and an appropriate pattern recognition system, this becomes possible.

From the above discussion, it can be seen that the addition of sophisticated pattern recognition means to any of the standard illumination and/or reception technologies for use in a motor vehicle permits the development of a host of new products, systems or capabilities heretofore not available as described in more detail below.

OBJECTS AND SUMMARY OF THE INVENTION

This invention provides improvements to a system to sense the presence, position and type of an occupant in a passenger compartment of a motor vehicle in the presence of thermal gradients and more particularly, to identify and monitor occupants and their parts and other objects in the passenger compartment of a motor vehicle, such as an automobile or truck, by processing one or more signals received from the occupants and their parts and other objects using one or more of a variety of pattern recognition techniques and ultrasonic illumination technologies. The received signals are generally reflections of a transmitted signal. Information obtained by the identification and monitoring system is then used to affect the operation of some other system in the vehicle.

The principle objects and advantages include all those of the patents and patent-applications cross-referenced above including:

1. To enable the presence, position and type of occupying item in a passenger compartment to be detected even with the presence of thermal gradients.
2. To recognize the presence of a human on a particular seat of a motor vehicle and to use this information to affect the operation of another vehicle system such as the airbag system, heating and air conditioning system, or entertainment system, among others.
3. To recognize the presence of a human on a particular seat of a motor vehicle and then to determine his/her position and to use this position information to affect the operation of another vehicle system.
4. To recognize the presence of a human on a particular seat of a motor vehicle and then to determine his/her velocity relative to the passenger compartment and to use this velocity information to affect the operation of another vehicle system.
5. To determine the position of a seat in the vehicle using sensors remote from the seat and to use that information in conjunction with a memory system and appropriate actuators to position the seat to a predetermined location.

6. To determine the position, velocity or size of an occupant in a motor vehicle and to utilize this information to control the rate of gas generation, or the amount of gas generated, by an airbag inflator system or to control the amount of gas flowing into or out of the airbag.

7. To determine the fact that an occupant is not restrained by a seatbelt and therefore to modify the characteristics of the airbag system.

8. To determine the presence or position of rear seated occupants in the vehicle and to use this information to affect the operation of a rear seat protection airbag for frontal impacts.

9. To determine the presence or position of occupants relative to the side impact airbag systems and to use this information to affect the operation of a side impact protection airbag system.

10. To determine the presence of an occupant's hand or other object in the path of a closing window and to affect the window closing system.

11. To determine the position of the shoulder of a vehicle occupant and to use that information to control the seatbelt anchorage point.

12. To determine the position of the rear of an occupant's head and to use that information to control the position of the headrest.

13. To recognize the presence of a rear facing child seat on a particular seat of a motor vehicle and to use this information to affect the operation of another vehicle system such as the airbag system.

14. To determine the total number of occupants of a vehicle and in the event of an accident to transmit that information, as well as other information such as the condition of the occupants, to a receiver remote from the vehicle.

15. To affect the vehicle entertainment system based on a determination of the size or location of various occupants or other objects within the vehicle passenger compartment.

16. To affect the vehicle heating, ventilation and air conditioning system based on a determination of the number, size and location of various occupants or other objects within the vehicle passenger compartment.

17. To provide a vehicle interior monitoring system for determining the location of occupants within the vehicle and to include within the same system various electronics for controlling an airbag system.

18. To determine the approximate location of the eyes of a driver and to use that information to control the position of the rear view mirrors of the vehicle.

19. To monitor the position of the head of the vehicle driver and determine whether the driver is falling asleep or otherwise impaired and likely to lose control of the vehicle and to use that information to affect another vehicle system.

20. To determine the location of the eyes of a vehicle occupant and the direction of a light source such as the headlights of an oncoming vehicle or the sun and to cause a filter to be placed in such a manner as to reduce the intensity of the light striking the eyes of the occupant.

21. To determine the location of the eyes of a vehicle occupant and the direction of a light source such as the headlights of a rear approaching vehicle or the sun and to cause a filter to be placed in such a manner as to reduce the intensity of the light reflected from the rear view mirrors and striking the eyes of the occupant.

22. To determine the location of the ears of a vehicle occupant and to use that information to control the entertainment system so as to improve the quality of the sound reaching the occupant's ears through such methods as noise canceling sound.

23. To recognize a particular driver based on such factors as physical appearance or other attributes and to use this information to control another vehicle system such as a security system, seat adjustment, or maximum permitted vehicle velocity, among others.

These and other objects and advantages particular to the improvements of the instant invention, as further listed below, will become apparent from the description of the preferred embodiments of the vehicle interior identification and monitoring system of this invention described below.

Briefly, in a method for controlling a system in the vehicle based on the occupying item in accordance with the invention, at least a portion of the passenger compartment in which the occupying item is situated is irradiated, reflected radiation from surfaces of the occupying item are received by a plurality of sensors or transducers each arranged at a discrete location, the received radiation is processed by a processor in order to create at least one electronic signal characteristic of the occupying item based on the received radiation, each signal containing a pattern representative and/or characteristic of the occupying item and each signal is then categorized by utilizing pattern recognition means for recognizing and thus identifying the class of the occupying item. The pattern recognition means process each signal into a categorization thereof based on data corresponding to patterns of received radiation stored within or trained into the pattern recognition means and associated with possible classes of occupying items of the vehicle. Once the signal(s) is/are categorized, the operation of a system in the vehicle may be affected based on the categorization of the signal(s), and thus based on the occupying item.

If the system in the vehicle is a vehicle communication system, then an output representative of the number of occupants in the vehicle may be produced based on the categorization of the signal(s) and the vehicle communication system thus controlled based on such output. Similarly, if the system in the vehicle is a vehicle entertainment system or heating and air conditioning system, then an output representative of specific seat occupancy may be produced based on the categorization of the signal(s) and the vehicle entertainment or heating and air conditioning system thus controlled based on such output.

In one embodiment designed to ensure safe operation of the vehicle, the attentiveness of the occupying item is determined from the signal(s) if the occupying item is an occupant, and in addition to affecting the system in the vehicle based on the categorization of the signal, the system in the vehicle is affected based on the determined attentiveness of the occupant. This application requires additional apparatus.

One embodiment of the interior monitoring system in accordance with the invention comprises means for irradiating at least a portion of the passenger compartment in which an occupying item is situated, receiver means for receiving reflected radiation from the occupying item, comprising a plurality of receivers, each arranged at a discrete location, processor means coupled to the receivers for processing the received radiation from each receiver in order to create a respective electronic signal characteristic of the occupying item based on the received radiation, each signal containing a pattern representative of the occupying item, categorization means coupled to the processor means for categorizing the signals, and output means coupled to the categorization means for affecting at least one other system within the vehicle based on the categorization of the signals characteristic of the occupying item. The categorization means may comprise pattern recognition means for recognizing and thus identifying the class of the occupying item by processing the signals into a categorization thereof based on data corresponding to patterns of received radiation stored within the pattern recognition means and associated with possible classes of occupying items of the vehicle. Each signal may comprises a plurality of data, all of which is compared to the data corresponding to patterns of received radiation stored within the pattern recognition means and associated with possible classes of contents of the vehicle.

In one specific embodiment, the system includes location determining means coupled to the processor means for determining the location of the occupying item, e.g., based on the received radiation such that the output means which are coupled to the location determining means, in addition to affecting the other system based on the categorization of the signals characteristic of the occupying item, affect the system based on the determined location of the occupying item.

In another embodiment to determine the presence or absence of an occupant, the categorization means comprise pattern recognition means for recognizing the presence or absence of an occupying item in the passenger compartment by processing each signal into a categorization thereof signal based on data corresponding to patterns of received radiation stored within the pattern recognition means and associated with possible occupying items of the vehicle and the absence of such occupying items.

When a VIMS system is used primarily for the detection, identification, and location of occupants in the passenger compartment for the purposes of suppressing either the forward or side impact airbags, it is sometimes referred to as a seated state detecting system or apparatus. Frequently the seated state detecting system will comprise other types of sensors such as seat position and seatback angle sensors, seat belt buckle sensors, seatbelt payout sensors, weight sensors and other sensors that are not based on the reflections of waves from an occupying item.

In the embodiments wherein a seated-state detecting apparatus is used, the apparatus comprises: a plurality of ultrasonic sensors for transmitting ultrasonic waves toward a seat and receiving reflected waves from the seat and its contents, if any; one or more weight sensors may be present for detecting weight of an occupant in the seat or an absence of weight applied onto the seat indicative of an empty seat; and processor means or an evaluation circuit to which output of the ultrasonic sensors and the weight sensor(s) are inputted and which processes the outputs to evaluate a seated-state based on the outputs. The evaluation circuit may be implemented in hardware as an electronic circuit or in software as a computer program.

In certain embodiments, a correlation function or state between the output of the various sensors and the desired result (i.e., seat occupancy identification and categorization) is determined by a neural network, or neural-fuzzy system, that may be implemented in hardware as a neural computer or neural processor, or in software as a computer program or a combination thereof. The correlation function or state that is determined, by employing this neural network may also be contained in a microcomputer. In this case, the microcomputer can be employed as an evaluation circuit. The word circuit herein will be used to mean both an electronic circuit and the functional equivalent implemented on a microcomputer using software.

The seated-state detecting apparatus may further comprise a seat track position detecting sensor. This sensor determines the position of the seat on the seat track in the forward and aft direction. In this case, the evaluation circuit evaluates the seated-state, based on a correlation function obtained from outputs of the ultrasonic sensors, an output of the one or more weight sensors, and an output of the seat track position detecting sensor. With this structure, there is the advantage that the identification between the configuration of a detected surface in a state where a passenger is not sitting in the seat and the configuration of a detected surface which is detected when a seat is slid backwards by the amount of the thickness of a passenger, that is, of identification of whether a passenger seat is empty or occupied by a passenger, can be reliably performed.

Furthermore, the seated-state detecting apparatus may also comprise a reclining angle detecting sensor, and the evaluation circuit may also evaluate the seated-state based on a correlation function obtained from outputs of the ultrasonic sensors, an output of the weight sensor(s), and an output of the reclining angle detecting sensor. In this case, if the tilted angle information of the back portion of the seat is added as evaluation information for the seated-state, identification can be clearly performed between the configuration of a surface detected when a passenger is in a slightly slouching state and the configuration of a surface detected when the back portion of a seat is slightly tilted forward and similar difficult-to-discriminate cases. This embodiment may even be combined with the output from a seat track position detecting sensor to further enhance the evaluation circuit.

Moreover, the seated-state detecting apparatus may further comprise a comparison circuit for comparing the output of the weight sensor(s) with a reference value. In this case, the evaluation circuit identifies an adult and a child based on the reference value.

Preferably, the seated-state detecting apparatus comprises: a plurality of ultrasonic sensors for transmitting ultrasonic waves toward a seat and receiving reflected waves from the seat; one or more weight sensors for detecting weight of a passenger in the seat; a seat track position detecting sensor; a reclining angle detecting sensor; and a neural network circuit to which outputs of the ultrasonic sensors and the weight sensor(s), an output of the seat track position detecting sensor, and an output of the reclining angle detecting sensor are inputted and which evaluates several kinds of seated-states, based on a correlation function obtained from the outputs.

The kinds of seated-states that can be evaluated and categorized by the neural network include the following categories, among others, (i) a normally seated forward facing passenger and a forward facing child seat, (ii) an out-of-position passenger and a rear facing child seat, and (iii) an empty seat.

The seated-state detecting apparatus may further comprise a comparison circuit for comparing the output of the weight sensor(s) with a reference value and a gate circuit to which the evaluation signal and a comparison signal from the comparison circuit are input. This gate circuit, which may be implemented in software or hardware, outputs signals which evaluates several kinds of seated-states. These kinds of seated-states can include a (i) normally seated forward facing passenger, (ii) a forward facing child seat, (iii) an out-of-position passenger, (iv) a rear facing child seat, and (v) an empty seat. With this arrangement, the identification between a normally seated forward facing passenger and a forward facing child seat, the identification between an out-of-position seated passenger and a rear facing child seat, and the identification of an empty seat can be more reliably performed.

The outputs of the plurality of ultrasonic sensors, the output of the weight sensor(s), the outputs of the seat track position detecting sensor, and the outputs of the reclining angle detecting sensor are inputted to the neural network or other pattern recognition circuit, and the neural network determines the correlation function, based on training thereof during a training phase. The correlation function is then typically implemented in or incorporated into a microcomputer. For the purposes herein, neural network will be used to include both a single neural network, a plurality of neural networks, and other similar pattern recognition circuits or algorithms and combinations thereof, including a fuzzy logic or neural-fuzzy system.

To provide the input from the ultrasonic sensors to the neural network, it is sometimes preferable that an initial reflected wave portion and a last reflected wave portion are removed from each of the reflected waves of the ultrasonic sensors before the output data is processed. The neural network determines the correlation function by performing a weighting process, based on output data from the plurality of ultrasonic sensors, output data from the weight sensor(s), output data from the seat track position detecting sensor if present, and/or on output data from the reclining angle detecting sensor if present.

With this arrangement, the portions of the reflected ultrasonic wave that do not contain useful information are removed from the analysis and the presence and recognition of an object on the passenger seat can be more accurately performed. The improvements of the instant invention permit a reduction in the size of the initial removed reflected portion by eliminating cross-talk and reducing transducer ringing permitting data to be acquired closer to the transducer.

In one method for determining the occupancy of a seat in a passenger compartment of a vehicle in accordance with the invention, waves such as ultrasonic waves are transmitted into the passenger compartment toward the seat, reflected waves from the passenger compartment are received by a component which then generates an output representative thereof, the weight applied onto the seat is measured and an output is generated representative thereof and then the seated-state of the seat is evaluated based on the outputs from the sensors and the weight measuring means.

The evaluation of the seated-state of the seat may be accomplished by generating a function correlating the outputs representative of the received reflected waves and the measured weight and the seated-state of the seat, and incorporating the correlation function into a microcomputer. In the alternative, it is possible to generate a function correlating the outputs representative of the received reflected waves and the measured weight and the seated-state of the seat in a neural network circuit, and execute the function using the outputs representative of the received reflected waves and the measured weight as input into the neural network circuit.

To enhance the seated-state determination, the position of a seat track of the seat is measured and an output representative thereof is generated, and then the seated-state of the seat is evaluated based on the outputs representative of the received reflected waves, the measured weight and the measured seat track position. In addition to or instead of measuring the seat track position, it is possible to measure the reclining angle of the seat, i.e., the angle between the seat portion and the back portion of the seat, and generate an output representative thereof, and then evaluate the seated-state of the seat based on the outputs representative of the received reflected waves, the measured weight and the measured reclining angle of the seat (and seat track position, if measured).

Furthermore, the output representative of the measured weight may be compared with a reference value, and the occupying object of the seat identified, e.g., as an adult or a child, based on the comparison of the measured weight with the reference value.

The above discussion relates mainly to the identification of static objects in the passenger compartment of a vehicle.

This invention, thus, is for improvements to apparatus for use in a system to identify, locate and monitor occupants, including their parts, and other objects in the passenger compartment and in particular a child seat in the rear facing position or an out-of-position occupant, by illuminating the contents of the vehicle with ultrasonic radiation, e.g., by transmitting ultrasonic radiation waves from an ultrasonic wave generating apparatus, and receiving reflected ultrasonic radiation using at least one ultrasonic transducer properly located in the vehicle passenger compartment, and in specific predetermined optimum locations. More particularly, this invention relates to apparatus for enabling a single ultrasonic transducer to be used for both sending and receiving ultrasonic waves, to provide temperature compensation, to reduce the effects of thermal gradients, for enabling all transducers to send and receive data simultaneously, for enabling precise control of the radiated pattern of ultrasound waves, in order to achieve a speed, cost and accuracy of recognition heretofore not possible. Outputs from the ultrasonic receivers, are analyzed by appropriate computational means employing trained pattern recognition technologies, to classify, identify and/or locate the contents, and/or determine the orientation of a rear facing child seat, for example. In general, the information obtained by the identification and monitoring system is used to affect the operation of some other system in the vehicle and particularly the passenger and/or driver airbag systems, which may include a front airbag, a side airbag, a knee bolster, or combinations of the same. However, the information obtained can be used for a multitude of other vehicle systems.

When the vehicle interior monitoring system of this invention is installed in the passenger compartment of an automotive vehicle equipped with a occupant protective device, such as an inflatable airbag, and the vehicle is subjected to a crash of sufficient severity that the crash sensor has determined that the protective device is to be deployed, the system, in accordance with the invention, has previously determined, (i.e., prior to the deployment) whether a child placed in the rear facing position in the child seat is present and if so, a signal has been sent to the control circuitry that the airbag should be disabled, that is, not deployed in the crash. The system of this invention also determines the dynamic position of the vehicle occupant relative to the airbag and disables deployment of the airbag if the occupant is positioned so that he/she is likely to be injured by the deployment of the airbag and does so at a speed and accuracy heretofore not possible.

It is yet another broad object of the present invention to provide a method for accurately detecting the presence of an out-of-position occupant, and particularly one who becomes out-of-position during a high speed crash, in order to prevent one or more airbags from deploying, which airbag(s) would impact against the head or chest of the occupant during its initial deployment phase causing injury or possible death to the occupant.

Further principle objects and advantages of the apparatus and methods in accordance with the particular improvements of the invention are:

1. To provide a method for reducing the effects of thermal gradients that occur when the sun beats down on a closed vehicle or from the operation of the heater or air conditioner, such gradients causing the ultrasonic waves to be diffracted and thereby changing the received wave pattern.
2. To provide a reliable method using a single transducer for both sending and receiving ultrasonic waves while permitting objects to be detected that are less than 4 inches from the transducer.
3. To provide a reliable method for dynamically determining the location of a vehicle occupant who is moving toward the airbag module due to vehicle decelerations caused by, for example, pre-crash braking and to use this information to control another vehicle system such as the airbag system.
4. To provide a reliable method for compensating for the effects of the change in the speed of sound due to temperature changes within the vehicle, such method based on the variation of a measurable property of the transducer such as its capacitance, inductance or natural frequency with temperature.
5. To provide a reliable method for determining in a timely manner, such as every 10–20 milliseconds, that an occupant is out of position, or will become out of position, and likely to be injured by a deploying airbag and to then output a signal to suppress the deployment of the airbag and to do so in sufficient time that the airbag deployment can be suppressed even in the case of a poorly designed or malfunctioning crash sensor which triggers late on a short duration crash.
6. To provide a method of controlling the wave pattern emitted from the transducer assembly so as to more precisely illuminate the area of interest.
7. To provide apparatus which permits speed of sound compensation to be achieved even when each transducer in the system operates at a different tuned frequency.
8. To provide apparatus which permits detecting objects that are very close to the transducer assembly.

To further improve the operation of the ultrasonic portion of the system, especially when thermal gradients are present, the received signal is processed using a pseudo logarithmic compression circuit. This circuit compresses high amplitude reflections in comparison to low amplitude reflections and thereby diminishes the effects of diffraction cause by thermal gradients.

These and other objects and advantages particular to the improvements of this invention will become apparent from the following description of the preferred embodiments of the vehicle identification and monitoring system of this invention.

BRIEF DESCRIPTION OF THE DRAWINGS

The invention will be described with reference to the following non-limiting drawings.

FIG. 11 is a side view with parts cutaway and removed of a subject vehicle and an oncoming vehicle, showing the headlights of the oncoming vehicle and the passenger compartment of the subject vehicle, containing detectors of the driver's eyes and detectors for the headlights of the oncoming vehicle and the selective filtering of the light of the approaching vehicle's headlights through the use of electrochromic glass or a liquid crystal system in the windshield.

FIG. 11A is an enlarged view of the section designated 11A in FIG. 11.

FIG. 12 is a side view with parts cutaway and removed of a vehicle and a following vehicle showing the headlights of the following vehicle and the passenger compartment of the leading vehicle containing a driver and a preferred mounting location for driver eyes and following vehicle headlight detectors and the selective filtering of the light of the following vehicle's headlights through the use of electrochromic glass or liquid crystal system in the rear view mirror.

FIG. 12A is an enlarged view of the section designated 12A in FIG. 12.

FIGS. 23($b$) and 23($c$) are each a diagram showing the configuration of the reflected wave of an ultrasonic wave transmitted from each transmitter of the ultrasonic sensors toward the passenger seat, obtained within the time that the reflected wave arrives at a receiver, showing an example of the reflected waves obtained when a passenger is in an out-of-position seated-state (where the passenger is seated too close to the instrument panel), and FIG. 23($c$) showing an example of the reflected waves obtained when a passenger is in a normal seated-state;

FIG. 26($b$) is a diagram similar to FIG. 26($a$) showing a step of extracting data based on the normalized reflected waves and a step of weighting the extracted data by employing the data of the seat track position detecting sensor, the data of the reclining angle detecting sensor, and the data of the weight sensor.

FIGS. 32A–F illustrate a variety of examples of a transducer in a tube design. A straight tube with an exponential horn is illustrated in FIG. 32A. FIGS. 32B and 32C illustrate the bending of the tube through 40 degrees and 90 degrees respectively. FIG. 32D illustrates the incorporation of a single loop and FIG. 32E of multiple loops. FIG. 32F illustrates the use of a small diameter tube.

DESCRIPTION OF THE PREFERRED EMBODIMENTS

Figure 1:
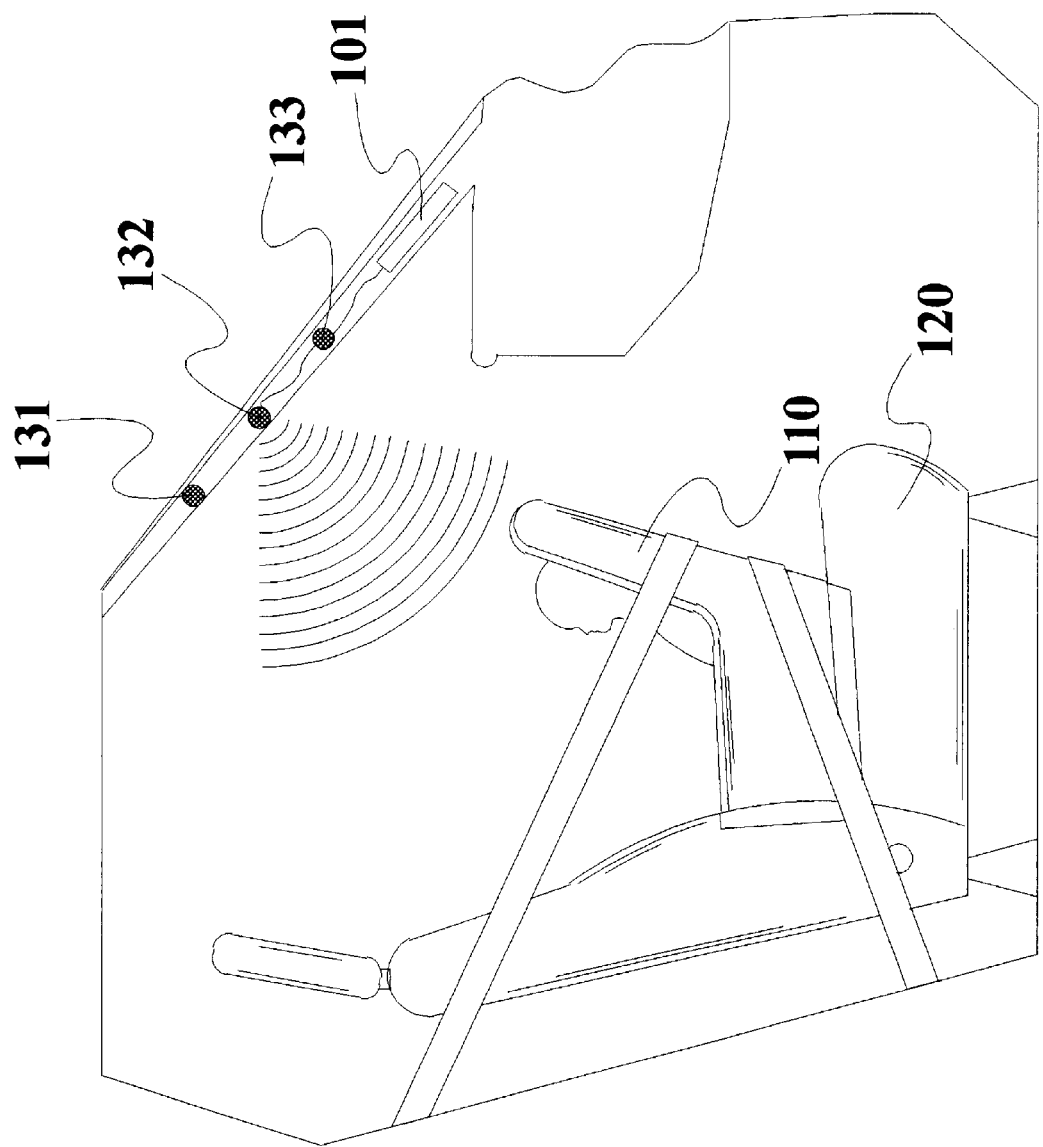
FIG. 1 is a side view with parts cutaway and removed of a vehicle showing the passenger compartment containing a rear facing child seat on the front passenger seat and a preferred mounting location for an occupant and rear facing child seat presence detector.

Referring to the accompanying drawings wherein the same reference numerals refer to the same or similar elements, in FIG. 1, a side view, with parts cutaway and removed, of a vehicle showing the passenger compartment containing a rear facing child seat 110 on a front passenger seat 120 and a previously disclosed mounting location for an occupant and rear facing child seat presence detector in accordance with the invention is illustrated. In this implementation, three ultrasonic transducers 131, 132 and 133 are used in the presence detector in accordance with the invention, although any number of wave-transmitting transducers or radiation-receiving receivers may be used. Such transducers or receivers may be of the type which emit or receive a modulated continuous signal, a time varying signal or a spatial varying signal such as in a scanning system. The preferred case is where each transducer emits periodic bursts of a few waves of radiation. Transducer 132 transmits ultrasonic energy toward the front passenger seat, which is reflected, in this case by the occupying item of the passenger seat, i.e., the rear facing child seat 110, and the reflected waves are received by the transducers 131 and 133. The waves received by transducers 131 and 133 vary with time depending on the shape of the object occupying the passenger seat, in this case the rear facing child seat 110. Each object will reflect back a signal having a different pattern. Also, the pattern received by transducer 131 will differ slightly from the pattern received by transducer 133 in view of its different mounting location. In some systems, this difference permits the determination of location of the reflecting surface through triangulation. Through the use of two transducers 131,133, a sort of stereo-graphic image is received by the two transducers and recorded for analysis by processor 101, which is coupled to the transducers 131,132, 133. This image will differ for each object that is placed on the vehicle seat and it will also change for each position of a particular object and for each position of the vehicle seat.

The "image" recorded from each ultrasonic transducer/receiver, for ultrasonic systems, is actually a time series of digitized data of the amplitude of the received signal versus time. Since there are two receivers, two time series are obtained which are processed by the processor 101. When different objects are placed on the front passenger seat the two images are different but there are also similarities between all images of rear facing child seats, for example, regardless of where on the vehicle seat it is placed and regardless of what company manufactured the child seat. Alternately, there will be similarities between all images of people sitting on the seat regardless of what they are wearing, their age or size. The problem is to find the "rules" which differentiate the occupant images from the rear facing child seat images, for example. The similarities of these images for various child seats are frequently not obvious to a person looking at plots of the time series and thus computer algorithms are developed to sort out the various patterns.

The determination of these rules is central to the pattern recognition techniques used in this invention. In general, three approaches have been useful, artificial intelligence, fuzzy logic and artificial neural networks plus the combination of fuzz logic and neural networks—a neural-fuzzy system. In some implementations of this invention, such as the determination that there is an object in the path of a closing window as described below, the rules are sufficiently obvious that a trained researcher can look at the returned acoustic signals and devise a simple algorithm to make the required determinations. In others, such as the determination of the presence of a rear facing child seat or of an occupant, artificial neural networks are used to determine the rules. One such set of neural network software for determining the pattern recognition rules is available from the NeuralWare Corporation of Pittsburgh, Pa.

The system used in a preferred implementation of this invention for the determination of the presence of a rear facing child seat, of an occupant or of an empty seat was the artificial neural network. In this case, the network operates on the two returned signals as sensed by transducers 131 and 133. Through a training session, the system is taught to differentiate between the three cases. This is done by conducting a large number of experiments where a large variety of child seats are placed in a large variety of orientations on the front passenger seat. Similarly a sufficiently large number of experiments are run with human occupants and with boxes, bags of groceries and other objects. Sometimes as many as 1,000,000 such experiments are run before the neural network is sufficiently trained so that it can differentiate among the three cases and output the correct decision with a very high probability. Naturally, although two transducers were used in this example, in general the greater the number of transducers and the greater the separation in their mounting positions around the vehicle seat the higher the accuracy of the resulting system. Typically four transducers are mounted high in the vehicle on the corners of an approximate rectangle or rhombus surrounding the seat volume to be monitored.

Once the network is determined, it is possible to examine the result using tools supplied by NeuralWare, for example, or by examining the resulting algorithm, to determine the rules that were finally arrived at by the trial and error techniques. In that case, the rules can then be programmed into a microprocessor resulting in a static rule based system. Alternately, a neural computer can be used to implement the net directly. In either case, the implementation can be carried out by those skilled in the art of pattern recognition. If a microprocessor is used, a memory device is also required to store the data from the analog to digital converters that digitize the data from the receiving transducers. On the other hand, if a neural network computer is used, the analog signal can be fed directly from the transducers to the neural network input nodes and an intermediate memory is not required. Memory of some type is needed to store the computer programs in the case of the microprocessor system and if the neural computer is used for more than one task, a memory is needed to store the network specific values associated with each task.

Figure 2:
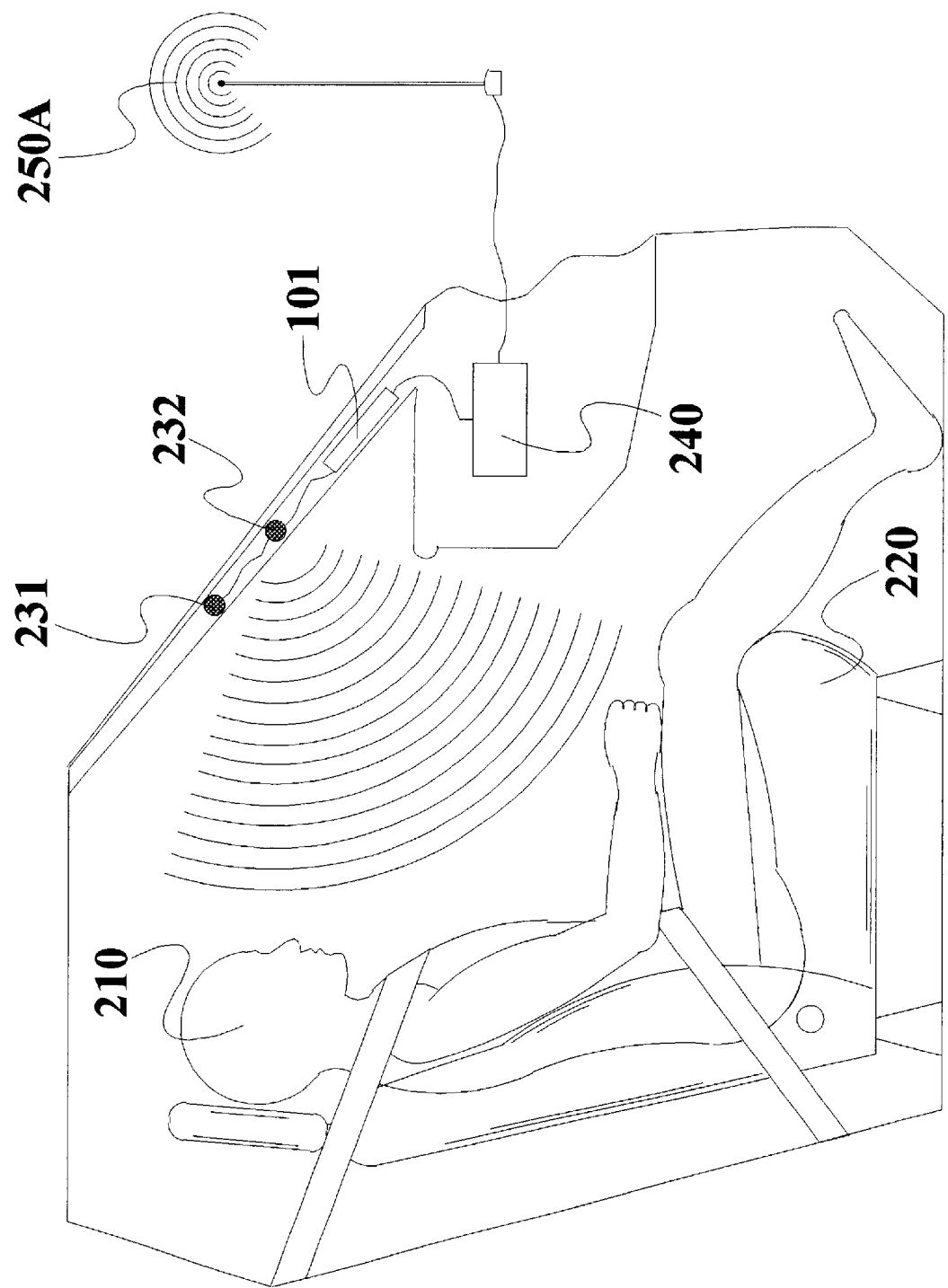
FIG. 2 is a side view with parts cutaway and removed showing schematically the interface between the vehicle interior monitoring system of this invention and the vehicle cellular communication system.

An alternate system is shown in FIG. 2, which is a side view showing schematically the interface between the vehicle interior monitoring system of this invention and the vehicle cellular communication system. In this view, an adult occupant 210 is shown sitting on the front passenger seat 220 and two ultrasonic transducers 231 and 232 are used to determine the presence (or absence) of the occupant on that seat 220. One of the transducers 232 in this case acts as both a transmitter and receiver while transducer 231 acts only as a receiver. Alternately, transducer 231 could serve as both a transmitter and receiver or the transmitting function could be alternated between the two devices. Also, in many cases more that two transmitters and receivers are used and in still other cases other types of sensors, such as weight, seatbelt buckle, seatbelt payout and seat and seatback position sensors, are also used in combination with the radiation sensors. As was also the case in FIG. 1, the transducers 231 and 232 are attached to the vehicle buried in the A-pillar trim, where their presence is disguised, and are connected to processor 101 that is also hidden in the trim. The A-pillar is the roof support pillar that is closest to the front of the vehicle and which, in addition to supporting the roof, also supports the front windshield and the front door. Naturally, other mounting locations can also be used.

The interface between the monitoring system and the cellular phone system is shown schematically by box 240 that outputs to an antenna 250A. The transducers 231 and 232 in conjunction with the pattern recognition hardware and software, which is implemented in processor 101 and is packaged on a printed circuit board or flex circuit along with the transducers 231 and 232, determine the presence of an occupant within a few seconds after the vehicle is started. Similar systems located to monitor the remaining seats in the vehicle, also determine the presence of occupants at the other seating locations and this result is stored in the computer memory which is part of each monitoring system processor 101. In the event of an accident, the electronic system associated with the cellular phone system interrogates the various interior monitoring system memories and arrives at a count of the number of occupants in the vehicle, and in more sophisticated systems, even makes a determination as to whether each occupant was wearing a seatbelt and if he or she is moving after the accident. The phone system then automatically dials the EMS operator (such as 911) and the information obtained from the interior monitoring systems is forwarded so that a determination can be made as to the number of ambulances and other equipment to send to the accident site. Vehicles having this capability are now in service. Such vehicles also have a global positioning system, which permits the vehicle to determine its exact location and to forward this information to the EMS operator. Other systems can be implemented in conjunction with the communication with the emergency services operator. For example, a microphone and speaker can be activated to permit the operator to attempt to communicate with vehicle occupants and thereby learn directly of the status and seriousness of the condition of the occupants after the accident.

The control of the heating, ventilating, and air conditioning (HVAC) system alone would probably not justify the implementation of an interior monitoring system at least until the time comes when electronic heating and cooling systems replace the conventional systems now used. Nevertheless, if the monitoring system is present, it can be used to control the HVAC for a small increment in cost. The advantage of such a system is that since most vehicles contain only a single occupant, there is no need to direct heat or air conditioning to unoccupied seats. This permits the most rapid heating or cooling for the driver when the vehicle is first started and he or she is alone without heating or cooling unoccupied seats. Since the HVAC system does consume energy, an energy saving also results by only heating and cooling the driver when he or she is alone.

Figure 3:
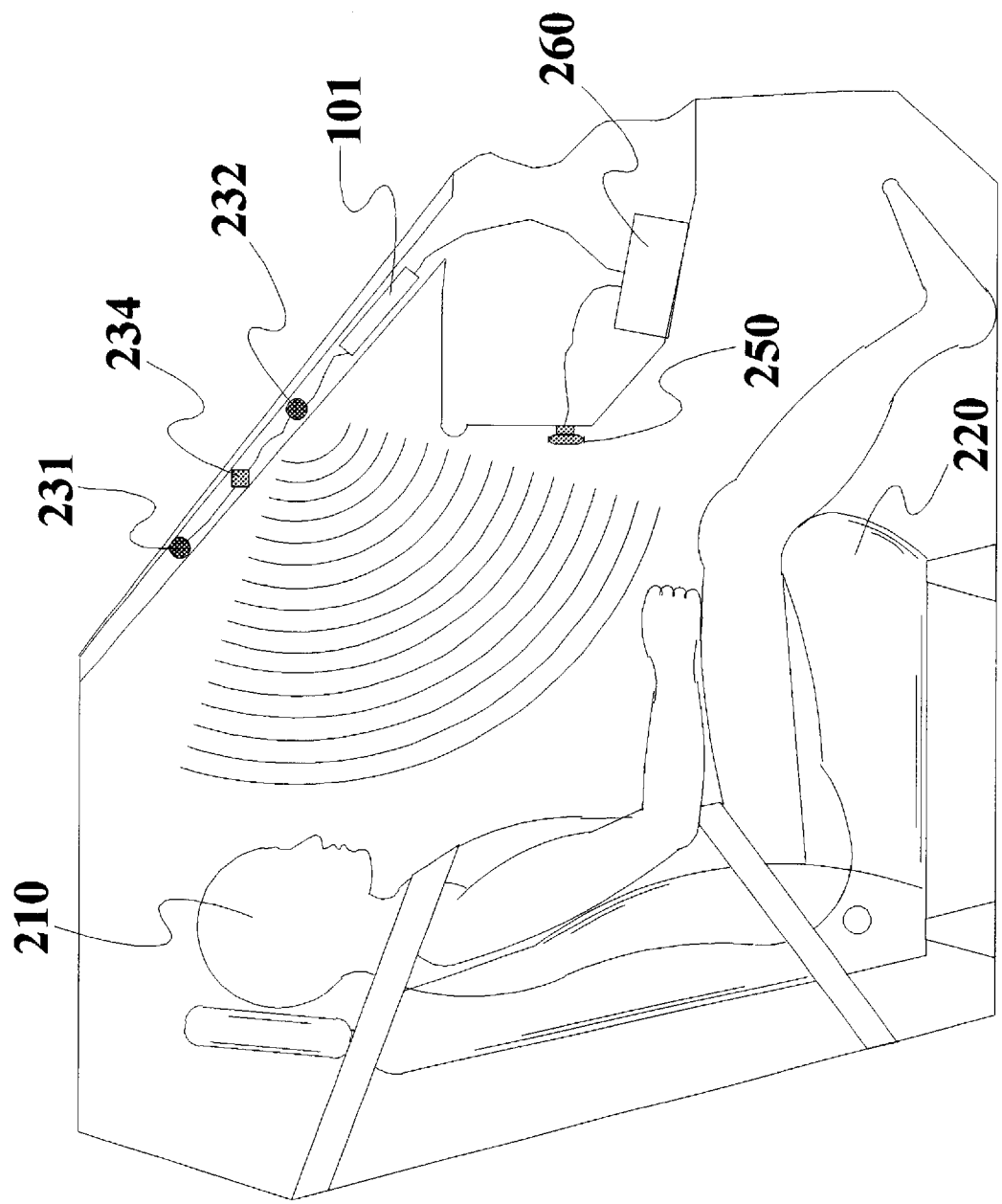
FIG. 3 is a side view with parts cutaway and removed showing schematically the interface between the vehicle interior monitoring system of this invention and the vehicle heating and air conditioning system.

FIG. 3 shows a side view of a vehicle passenger compartment showing schematically an interface 260 between the vehicle interior monitoring system of this invention and the vehicle heating and air conditioning system. In addition to the transducers 231 and 232, which at least in this embodiment are preferably acoustic (ultrasonic) transducers, an infrared sensor 234 is also shown mounted in the A-pillar and which monitors the temperature of the occupant. The output from each of the transducers is fed into processor 101 that is in turn connected to interface 260. In this manner, the HVAC control is based on the occupant's temperature rather than that of the ambient air in the vehicle, as well as the determined presence of the occupant via transducers 231,232 as described above. This also permits each vehicle occupant to be independently monitored and the HVAC system to be adjusted for each occupant either based on a set temperature for all occupants or, alternately, each occupant could be permitted to set his own preferred temperature through adjusting a control knob shown schematically as 250 in FIG. 3. Since the monitoring system is already installed in the vehicle with its own associated electronics including processor 101, the infrared sensor can be added with little additional cost and can share the processing unit. Not only can this system be used for directing hot and cold air, but developments in the field of directing sound using hyper-sound now make it possible to accurately direct sound to the vicinity of the ears of an occupant so that only that occupant can hear the sound. The system of this invention can thus be used to find the proximate direction of the ears of the occupant for this purpose.

Figure 4:
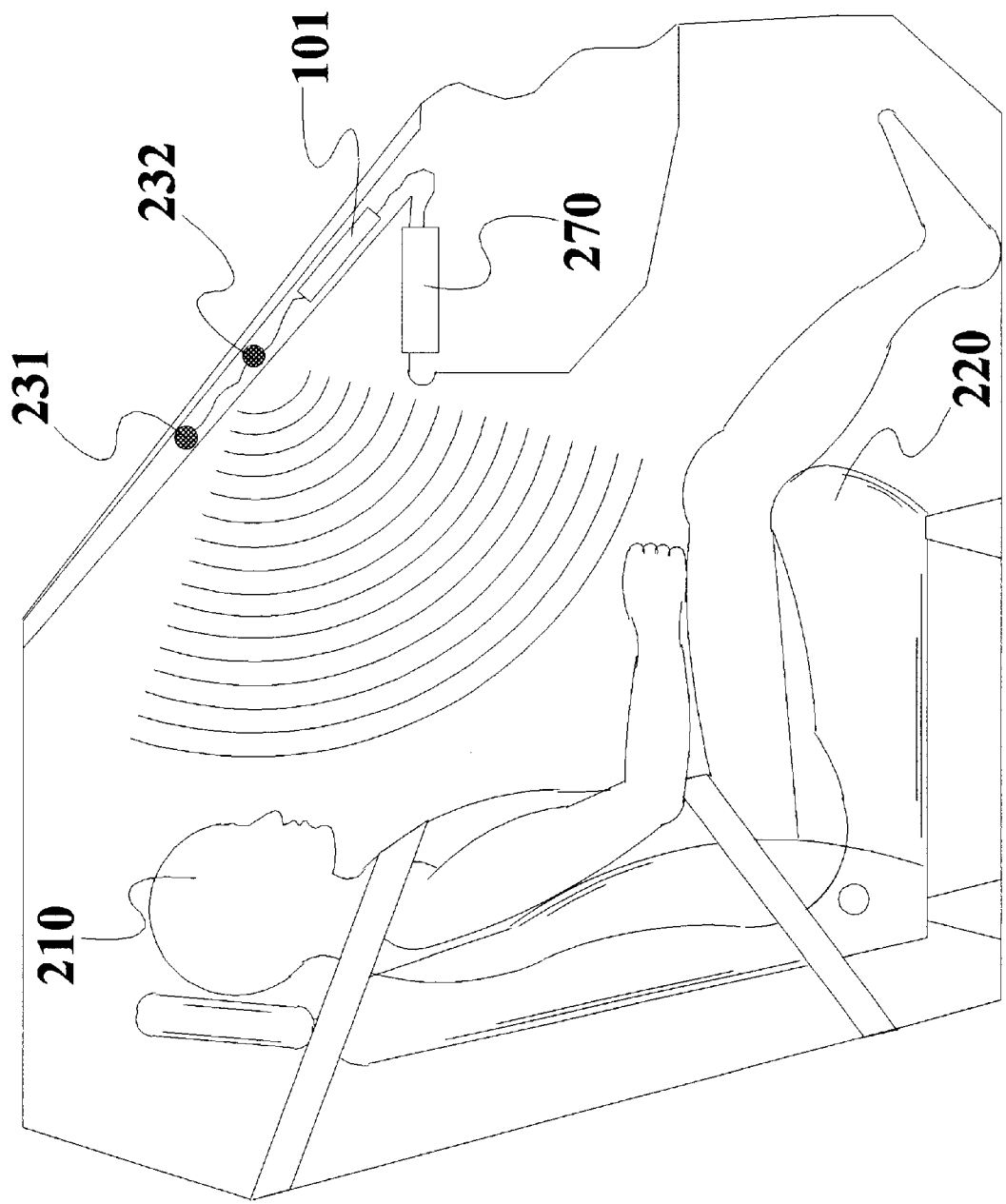
FIG. 4 is a side view with parts cutaway and removed showing schematically the interface between the vehicle interior monitoring system of this invention and the vehicle airbag system.

The use of the vehicle interior monitoring system to control the deployment of an airbag is discussed in detail in U.S. Pat. No. 5,653,462 cross referenced above. In that case, the control is based on the use of a simple pattern recognition system to differentiate between the occupant and his extremities in order to provide an accurate determination of the position of the occupant relative to the airbag. If the occupant is sufficiently close to the airbag module that he or she is more likely to be injured by the deployment itself than by the accident, the deployment of the airbag is suppressed. This process is carried further by the interior monitoring system described herein in that the nature or identity of the object occupying the vehicle seat is used to contribute to the airbag deployment decision. FIG. 4 shows a side view illustrating schematically the interface between the vehicle interior monitoring system of this invention and the vehicle airbag system electronics 270.

In this embodiment, an ultrasonic transducer 232 transmits a burst of ultrasonic waves that travel to the occupant where they are reflected back to transducers or receptors/receivers 231 and 232. The time period required for the waves to travel from the generator and return is used to determine the distance from the occupant to the airbag as described in the aforementioned U.S. Pat. No. 5,653,462, i.e., and thus may also be used to determine the position or location of the occupant. In the case of this invention, however, the portion of the return signal, which represents the occupants' head or chest, has been determined based on pattern recognition techniques such as a neural network. The relative velocity of the occupant toward the airbag can then be determined, from successive position measurements, which permits a sufficiently accurate prediction of the time when the occupant would become proximate to the airbag. By comparing the occupant's relative velocity to the integral of the crash deceleration pulse, a determination as to whether the occupant is being restrained by a seatbelt can also be made which then can affect the airbag deployment initiation decision. Alternately, the mere knowledge that the occupant has moved a distance which would not be possible if he were wearing a seatbelt gives information that he is not wearing one.

Another method of providing a significant improvement to the problem of determining the position of the occupant during vehicle deceleration is to input the vehicle deceleration directly into the occupant sensing system. This can be done through the use of the airbag crash sensor accelerometer or a dedicated accelerometer can be used. This deceleration can be entered directly into the neural network or, preferably, can be integrated with the predictions of the neural network through an additional post-processing algorithm. Post processing in general is discussed below. One significant advantage of neural networks is their ability to efficiently use information from any source. It is the ultimate "sensor fusion" system.

A more detailed discussion of this process and of the advantages of the various technologies, such s acoustic or electromagnetic, can be found in SAE paper 940527, "Vehicle Occupant Position Sensing" by Breed et al, which is included herein by reference. In this paper, it is demonstrated that the time delay required for acoustic waves to travel to the occupant and return does not prevent the use of acoustics for position measurement of occupants during the crash event. The Appendix to this specification also contains an analysis of the timing required for dynamic out-of-position measurements. For position measurement and for many pattern recognition applications, ultrasonics is the preferred technology due to the lack of adverse health effects and the low cost of ultrasonic systems compared with either laser or radar. The main limiting feature of ultrasonics is the wavelength, which is similar to that of radar and which places a limitation on the size of features that can be discerned. Optical systems, for example, are required when the identification of particular individuals is required.

Figure 5:
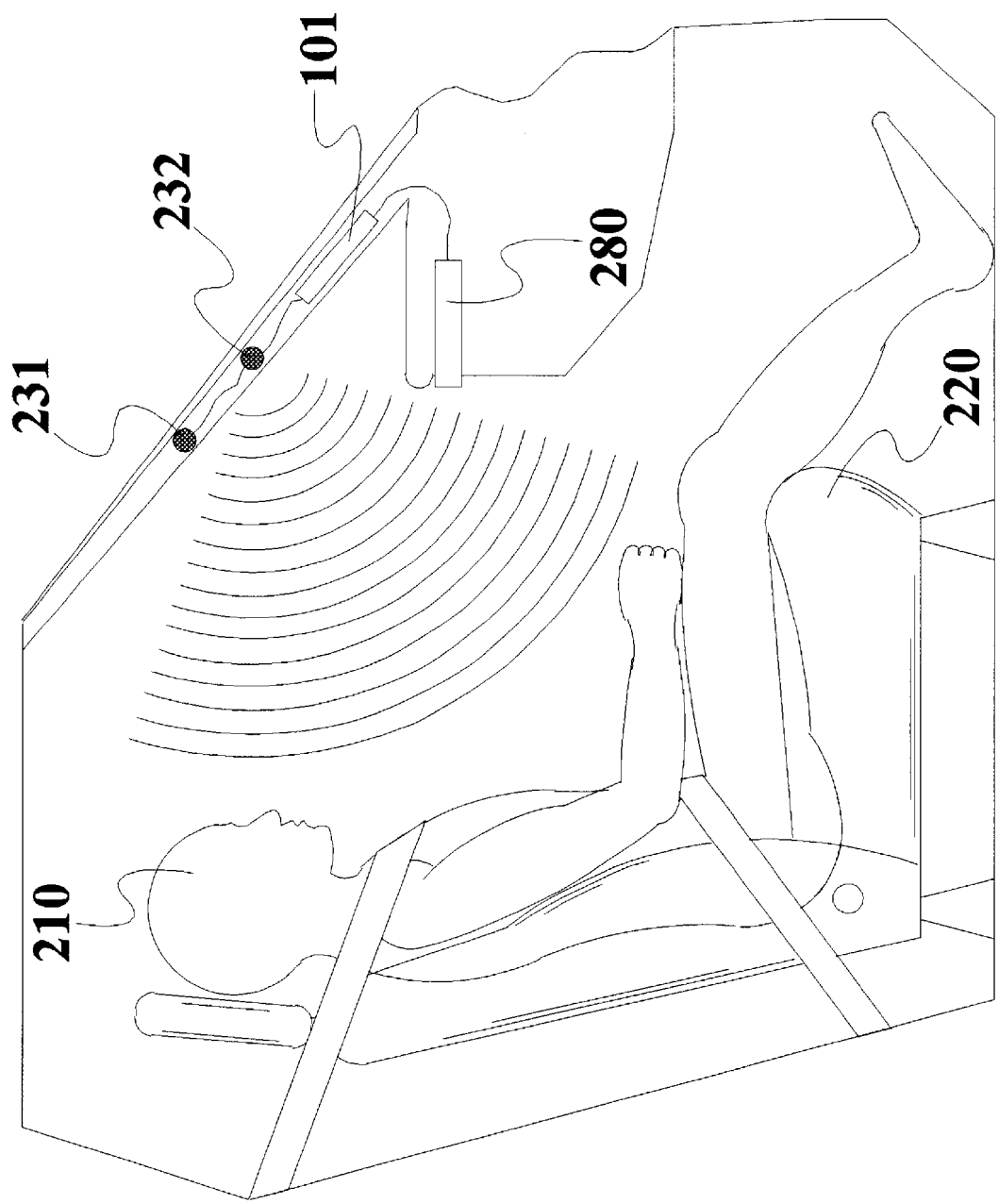
FIG. 5 is a side view with parts cutaway and removed showing schematically the interface between the vehicle interior monitoring system of this invention and the vehicle entertainment system.

It is well known among acoustics engineers that the quality of sound coming from an entertainment system can be substantially affected by the characteristics and contents of the space in which it operates and the surfaces surrounding that space. When an engineer is designing a system for an automobile he or she has a great deal of knowledge about that space and of the vehicle surfaces surrounding it. He or she has little knowledge of how many occupants are likely to be in the vehicle on a particular day, however, and therefore the system is a compromise. If the system knew the number and position of the vehicle occupants, and maybe even their size, then adjustments could be made in the system output and the sound quality improved. FIG. 5, therefore, illustrates schematically the interface between the vehicle interior monitoring system of this invention, i.e., transducers 231,232 and processor 101 which operate as set forth above, and the vehicle entertainment system 280. The particular design of the entertainment system that uses the information provided by the monitoring system can be determined by those skilled in the appropriate art. Perhaps alone or in combination with this system, the quality of the sound system can be measured by the audio system itself either by using the speakers as receiving units also or through the use of special microphones. The quality of the sound can then be adjusted according to the vehicle occupancy and the reflectivity of the vehicle occupants. If, for example, certain frequencies are being reflected more that others, the audio amplifier can be adjusted to amplify those frequencies to a lesser amount that others.

Figure 6:
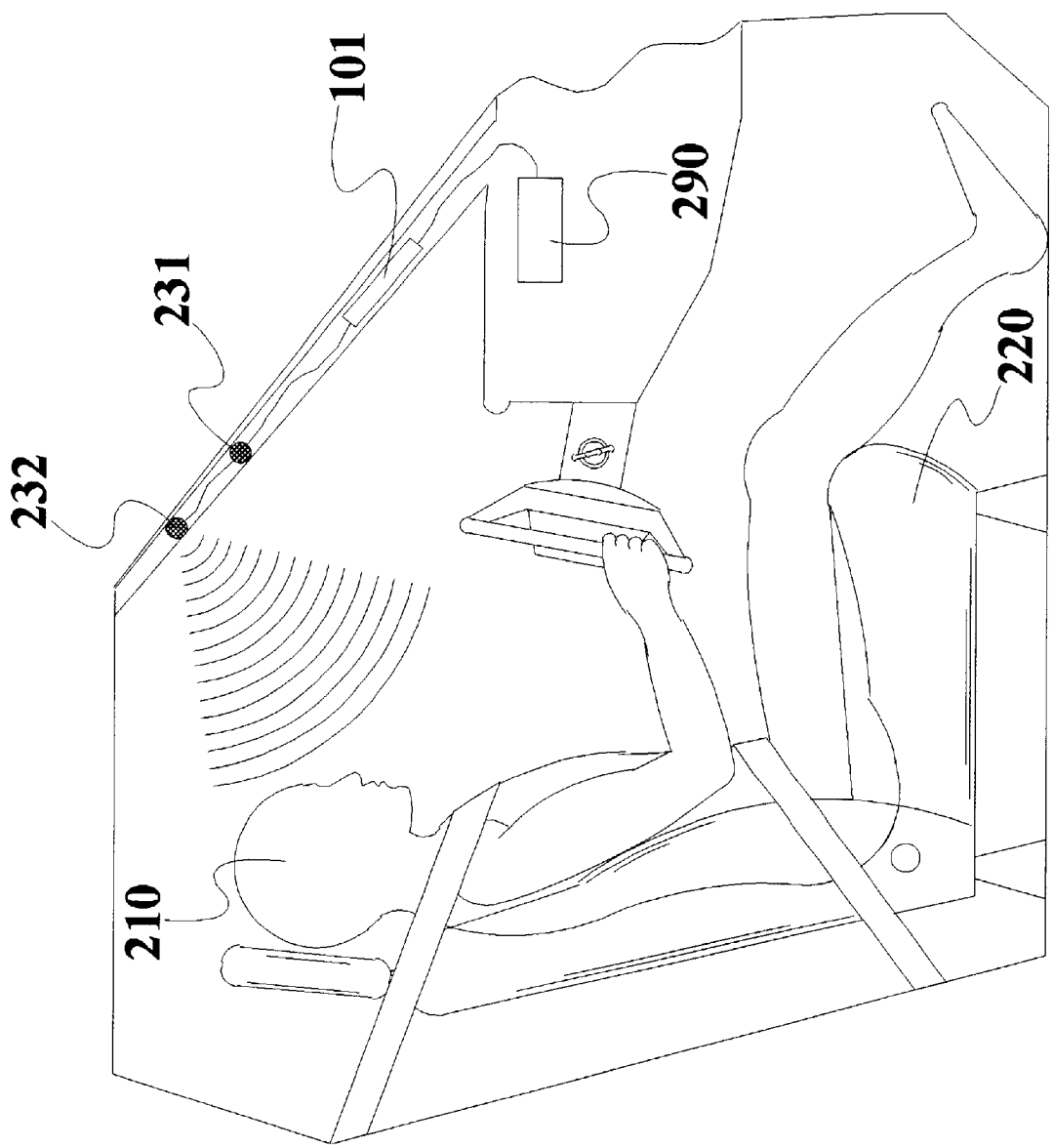
FIG. 6 is a side view with parts cutaway and removed of a vehicle showing the passenger compartment containing a driver and a preferred mounting location for an occupant identification system.

The acoustic frequencies that are practical to use for acoustic imaging in the systems are between 40 to 160 kilohertz (kHz). The wavelength of a 50 kHz acoustic wave is about 0.6 cm which is too coarse to determine the fine features of a person's face, for example. It is well understood by those skilled in the art that features which are smaller than the wavelength of the illuminating radiation cannot be distinguished. Similarly the wave length of common radar systems varies from about 0.9 cm (for 33,000 MHz K band) to 133 cm (for 225 MHz P band) which is also too coarse for person identification systems. In FIG. 6, therefore, the ultrasonic transducers of the previous designs are replaced by laser transducers 231 and 232 which are connected to a microprocessor 101. In all other manners, the system operates similarly. The design of the electronic circuits for this laser system is described in some detail in the U.S. Pat. No. 5,653,462 cross-referenced above and in particular FIG. 8 thereof and the corresponding description. In this case, a pattern recognition system such as a neural network system is employed and uses the demodulated signals from the receptors 231 and 232.

The output of processor 101 of the monitoring system is shown connected schematically to a general interface 290 which can be the vehicle ignition enabling system; the entertainment system; the seat, mirror, suspension or other adjustment systems; or any other appropriate vehicle system.

Figure 7A:
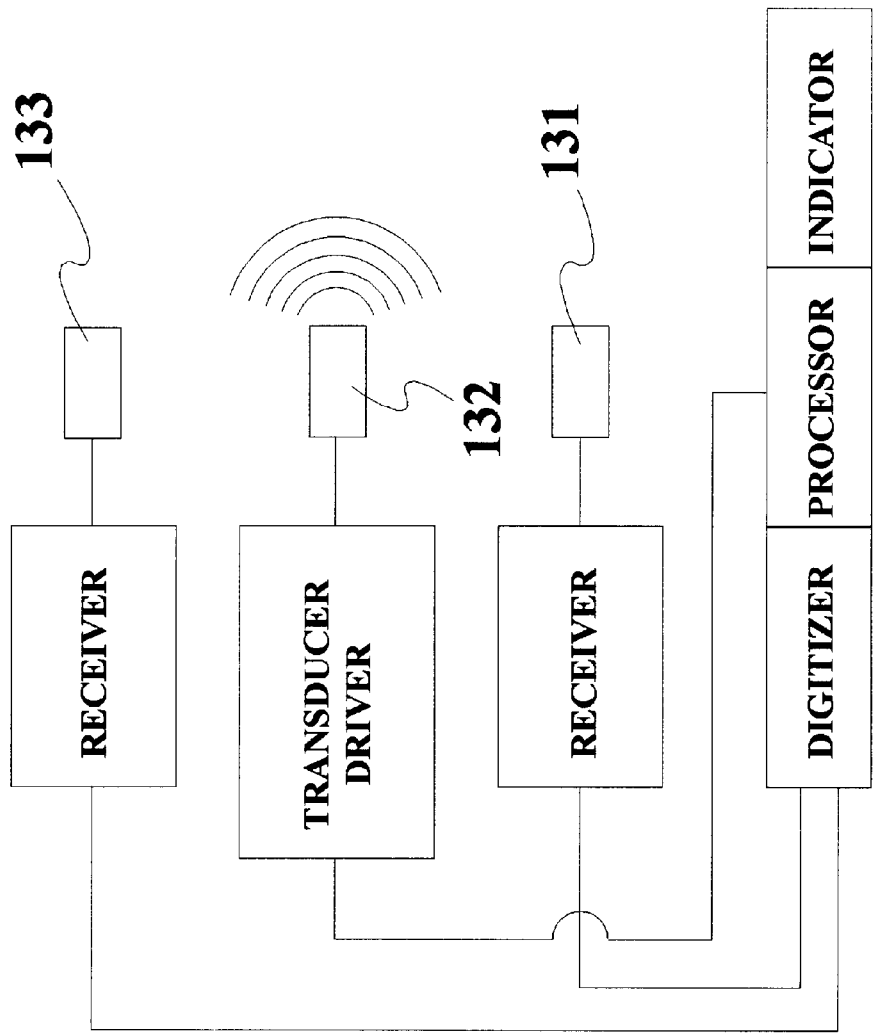
FIG. 7A is a functional block diagram of the ultrasonic imaging system illustrated in FIG. 1 using a microprocessor.
Figure 7B:
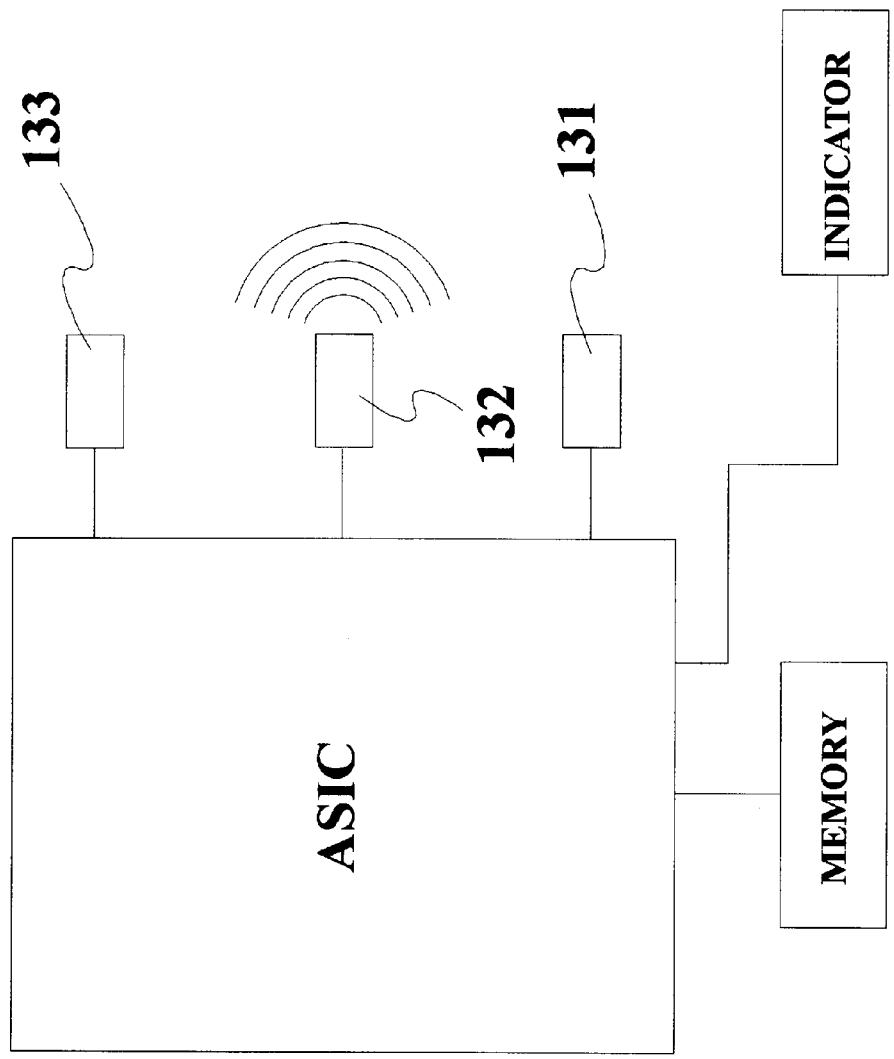
FIG. 7B is a functional block diagram of the ultrasonic imaging system illustrated in FIG. 1 using an application specific integrated circuit (ASIC).

There are at least two preferred methods of implementing the electronics of the vehicle interior monitoring system of this invention, a microprocessor system and an application specific integrated circuit system (ASIC) (or equivalently a "system on an chip" using today's technology). Both of these systems are represented schematically as either 101 or 601 herein. A block diagram illustrating the microprocessor system is shown in FIG. 7A which shows the implementation of the system of FIG. 1. An alternate implementation of the FIG. 1 system using an ASIC is shown in FIG. 7B. In both cases the target, which may be a rear facing child seat, is shown schematically as 110 and the three transducers as 131, 132, and 133. In the embodiment of FIG. 7A, there is a digitizer coupled to the receivers 131,133 and the processor, and an indicator coupled to the processor. In the embodiment of FIG. 7B, there is a memory unit associated with the ASIC and also an indicator coupled to the ASIC.

Figure 8:
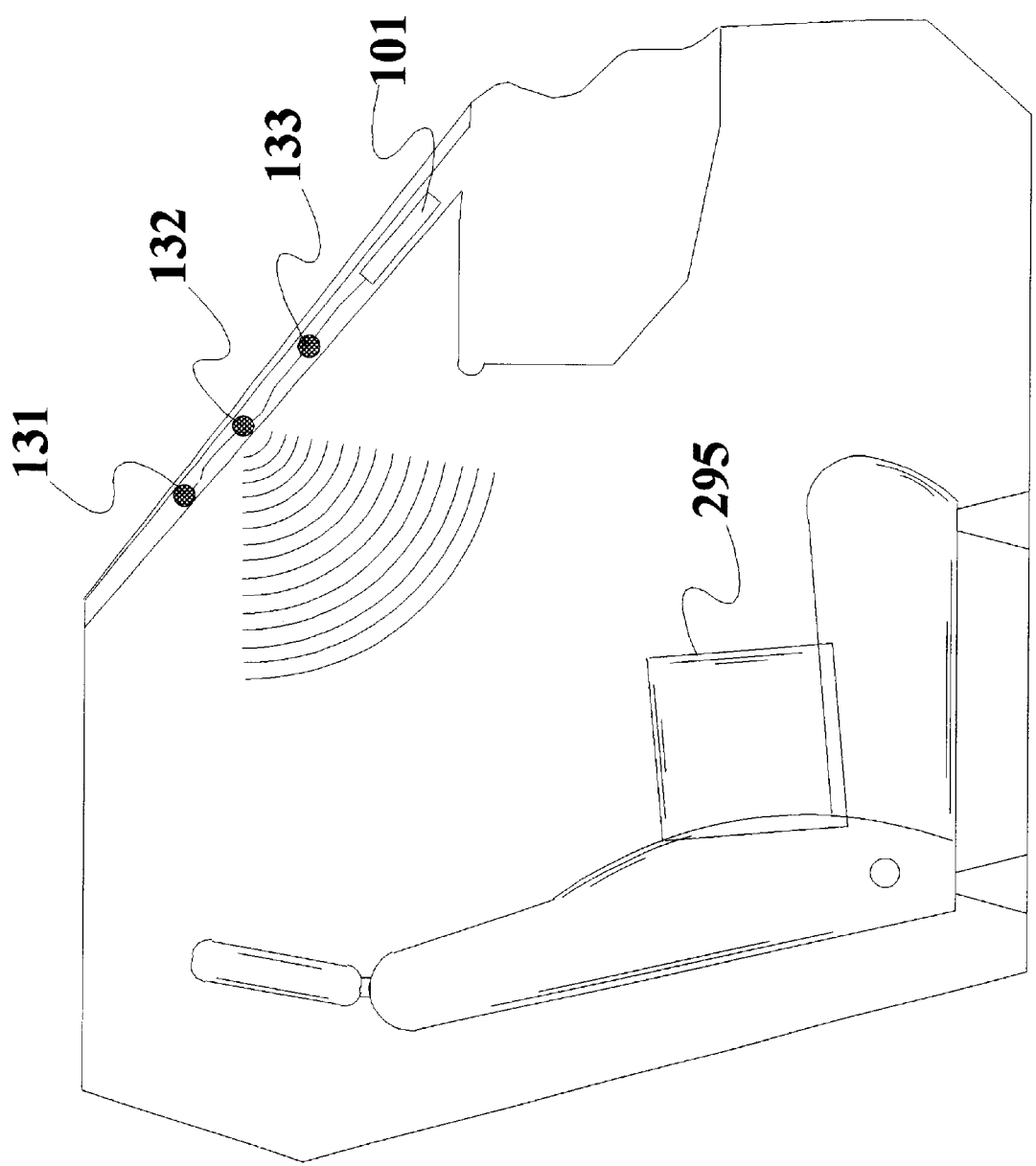
FIG. 8 is a side view with parts cutaway and removed of a vehicle showing the passenger compartment containing a box on the front passenger seat and a preferred mounting location for an occupant and rear facing child seat presence detector.

In FIG. 8, a view of the system of FIG. 1 is illustrated with a box 295 shown on the front passenger seat in place of the rear facing child seat. The vehicle interior monitoring system of this invention is trained to recognize that this box 295 is neither a rear facing child seat nor an occupant and therefore it is treated as an empty seat and the deployment of the airbag is suppressed. This training is accomplished using a neural network with the commercially available software disclosed above and provided by NeuralWare of Pittsburgh. The system assesses the probability that the box is a person, however, and if there is even the remotest chance that it is a person, the airbag deployment is not suppressed. The system is thus typically biased toward airbag deployment.

In cases where different levels of airbag inflation are possible, and there are different levels of injury associated with an out of position occupant being subjected to varying levels of airbag deployment, it is sometimes possible to permit a low level airbag deployment in cases of uncertainty. If, for example, the neural network has a problem distinguishing whether a box or a forward facing child seat is present on the vehicle seat, the decision can be made to deploy the airbag in a depowered or low level deployment state. Other situations where such a decision could be made would be when there is confusion as to whether a forward facing human is in position or out-of-position. Neural networks systems frequently have problems in accurately discriminating the exact location of an occupant especially when different sized occupants are considered. This results in a gray zone around the border of the keep out zone where the system provides a weak fire or weak no fire decision. For those cases deployment of the airbag in a depowered state can resolve the situation since an occupant in a gray zone around the keep out zone boundary would be unlikely to be injured by such a depowered deployment while significant airbag protection is still being supplied.

Figure 9:
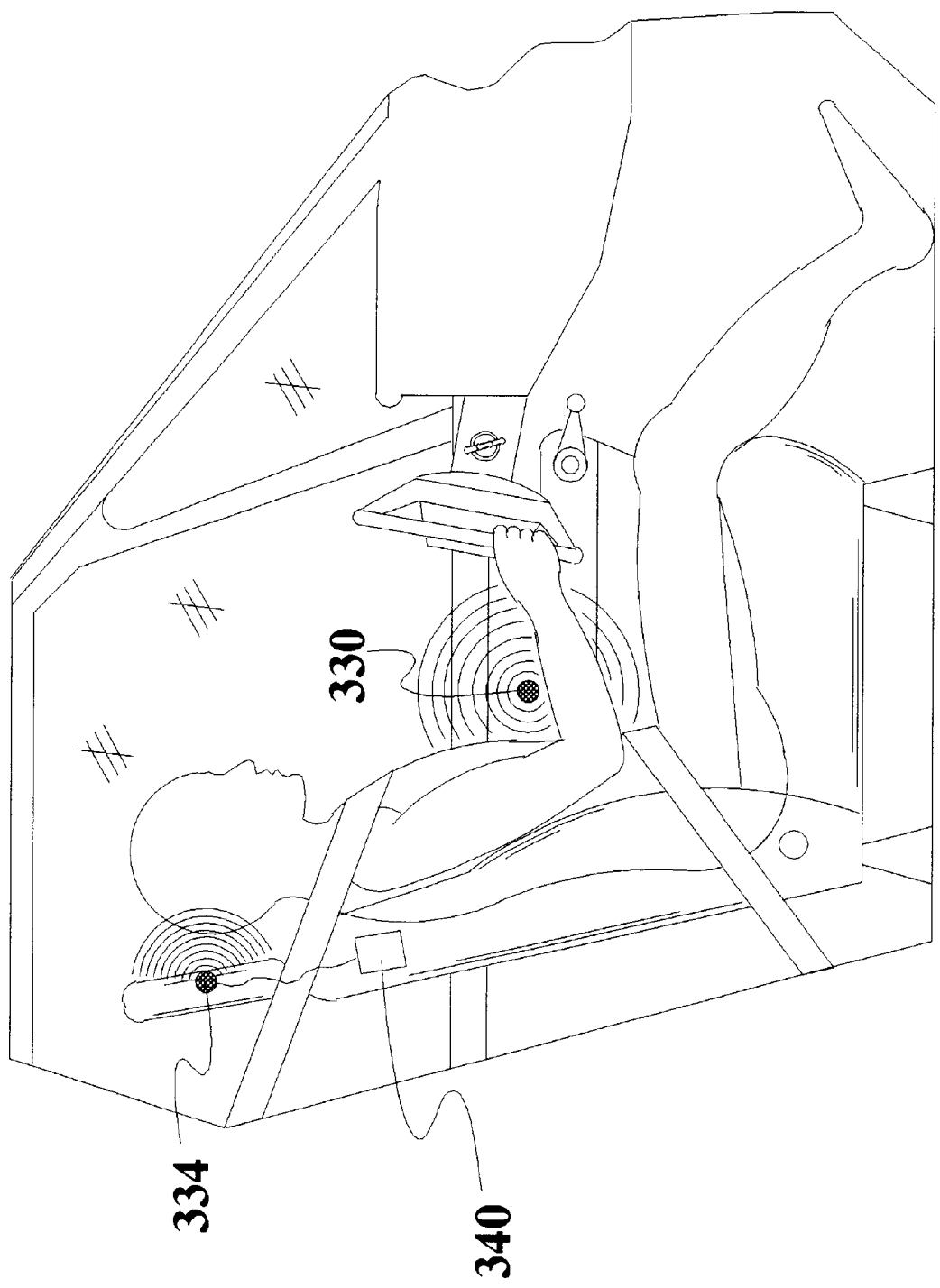
FIG. 9 is a side view with parts cutaway and removed of a vehicle showing the passenger compartment containing a driver and a preferred mounting location for an occupant position sensor for use in side impacts and also of a rear of occupant's head locator for use with a headrest adjustment system to reduce whiplash injuries in rear impact crashes.

Side impact airbags are now beginning to be used on some vehicles. These initial airbags are quite small compared to the driver or passenger airbags used for frontal impact protection. Nevertheless, a small child could be injured if he or she is sleeping with his or her head against the airbag when it deploys and a vehicle interior monitoring system is needed to prevent such a deployment in that event. In FIG. 9, a single ultrasonic transducer 330 is shown mounted in the vehicle door adjacent to the airbag system. This device is not used to identify the object that is adjacent the airbag but merely to measure the position of the object.

A rear-of-head detector 334 is also illustrated in FIG. 9. This detector 334 is used to determine the distance from the headrest to the rear most position of the occupant's head and to therefore control the position of the headrest so that it is properly positioned behind the occupant's head to offer optimum support in the event of a rear impact. Although the headrest of most vehicles is adjustable, it is rare for an occupant to position it properly if at all. Each year there are in excess of 400,000 whiplash injuries in vehicle impacts approximately 90,000 of which are from rear impacts (source: National Highway Traffic Safety Administration, (NHTSA)). A properly positioned headrest could substantially reduce the frequency of such injuries, which can be accomplished by the head detector of this invention. The head detector 334 is shown connected schematically to the headrest control mechanism and circuitry 340. This mechanism is capable of moving the headrest up and down and, in some cases, rotating it fore and aft.

Figure 10:
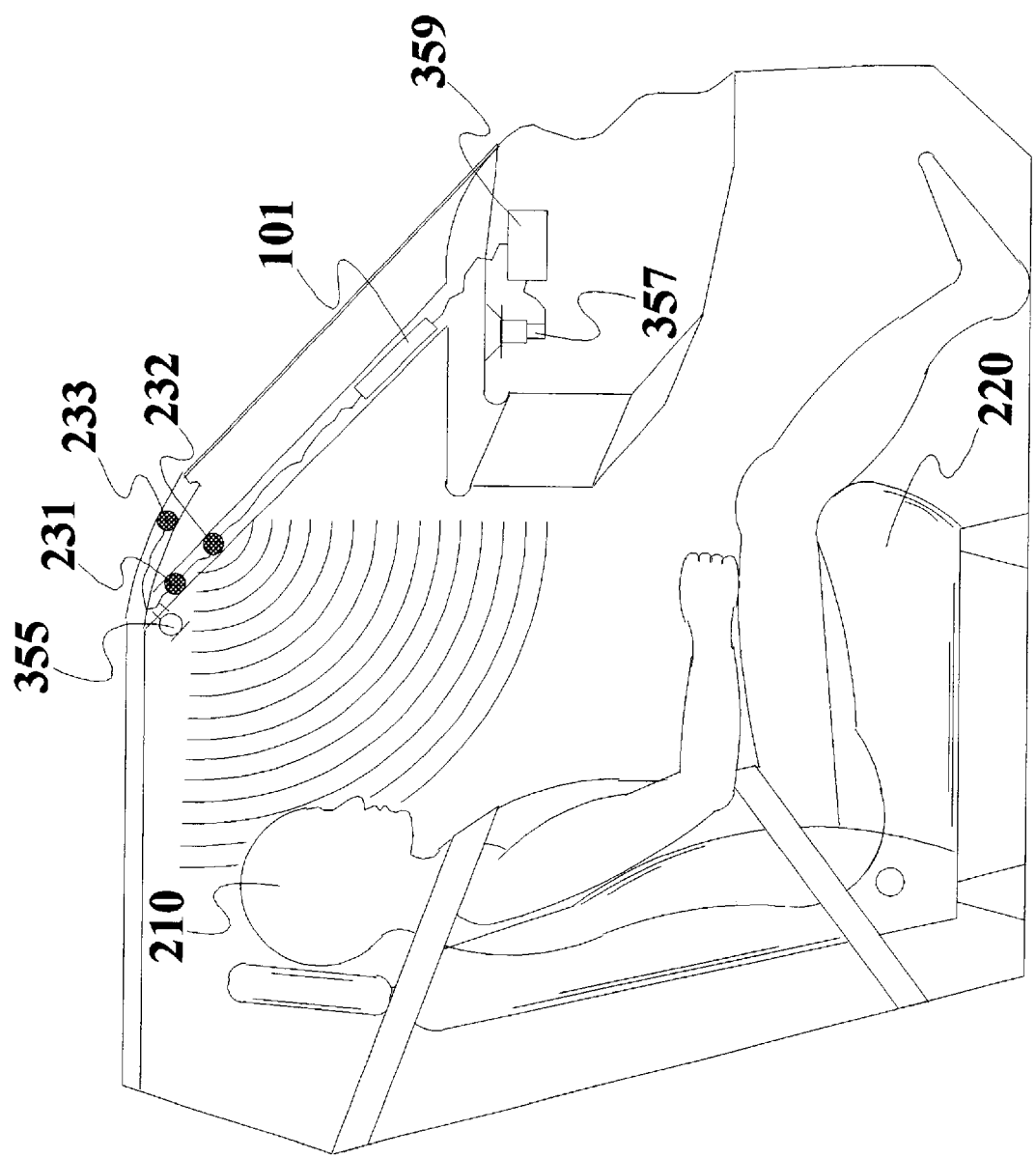
FIG. 10 is a side view with parts cutaway and removed of a vehicle showing the passenger compartment containing a front passenger and a preferred mounting location for an occupant head detector and a preferred mounting location of an adjustable microphone and speakers.

When the driver of a vehicle is using a cellular phone, the phone microphone frequently picks up other noise in the vehicle making it difficult for the other party to hear what is being said. This noise can be reduced if a directional microphone is used and directed toward the mouth of the driver. This is difficult to do since position of drivers' mouths varies significantly depending on such things as the size and seating position of the driver. By using the vehicle interior identification and monitoring system of this invention, and through appropriate pattern recognition techniques, the location of the driver's head can be determined with sufficient accuracy even with ultrasonics to permit a directional microphone having a 15 degree cone angle to be aimed at the mouth of the driver resulting in a clear reception of his voice. The use of directional speakers or even a hypersonic sound system in a similar manner also improves the telephone system performance. Such a system can also be used to permit effortless conversations between occupants of the front and rear seats. Such a system is shown in FIG. 10 which is a system similar to that of FIG. 2 only using three ultrasonic transducers 231, 232 and 233 to determine the location of the driver's head and control the pointing direction of a microphone 355. Speaker 357 is shown connected schematically to the phone system 359 completing the system.

The transducers 231 and 232 are placed high in the A-pillar and the third transducer 233 is placed in the headliner and displaced horizontally from transducers 231 and 232. The two transducers 231 and 232 provide information to permit the determination of the locus of the head in the vertical direction and the combination of one of transducers 231 and 232 in conjunction with transducer 233 is used to determine the horizontal location of the head. The three transducers are placed high in the vehicle passenger compartment so that the first returned signal is from the head. Temporal filtering is used to eliminate signals which are reflections from beyond the head and the determination of the head center location is then found by the approximate centroid of the head returned signal. That is, once the location of the return signal centroid is found from each of the three received signals from transducers 231, 232 and 233, the distance to that point is known for each of the transducers based on the time it takes the signal to travel from the head to each transducer. In this manner, by using the three transducers plus an algorithm for finding the coordinates of the head center, using processor 101, and through the use of known relationships between the location of the mouth and the head center, an estimate of the mouth location, and the ear locations, can be determined within a circle having a diameter of about five inches (13 cm). This is sufficiently accurate for a directional microphone to cover the mouth while excluding the majority of unwanted noise.

The headlights of oncoming vehicles frequently make it difficult for the driver of a vehicle to see the road and safely operate the vehicle. This is a significant cause of accidents and much discomfort. The problem is especially severe during bad weather where rain can cause multiple reflections. Visors are now used to partially solve this problem but they do so by completely blocking the view through a large portion of the window and therefore cannot be used to cover the entire windshield. Similar problems happen when the sun is setting or rising and the driver is operating the vehicle in the direction of the sun. The vehicle interior monitoring system of this invention can contribute to the solution of this problem by determining the position of the driver's eyes. If separate sensors are used to sense the direction of the light from the on-coming vehicle or the sun, and through the use of electro-chromic glass or a liquid crystal assembly for example, a portion of the windshield can be darkened to impose a filter between the eyes of the driver and the light source. Electro-chromic glass is a material where the color of the glass can be changed through the application of an electric current. By dividing the windshield into a controlled grid or matrix of contiguous areas and through feeding the current into the windshield from orthogonal directions, selective portions of the windshield can be darkened as desired. Other systems for selectively imposing a filter between the eyes of an occupant and the light source are currently under development.

FIG. 11 illustrates how such a system operates. A sensor 410 located on vehicle 402 determines the direction of the light 412 from the headlights of oncoming vehicle 404. Sensor 410 is comprised of a lens and a charge-coupled device (CCD), or CMOS light sensing or similar device, with appropriate electronic circuitry which determines which elements of the CCD are being most brightly illuminated. An algorithm stored in processor 101 then calculates the direction of the light from the oncoming headlights based on the information from the CCD, or CMOS device. Transducers 231, 232 and 233 determine the probable location of the eyes of the operator 210 of vehicle 402 in a manner such as described above in conjunction with the determination of the location of the driver's mouth in the discussion of FIG. 10. In this case, however, the determination of the probable locus of the driver's eyes is made with an accuracy of a diameter for each eye of about 3 inches (7.5 cm). This calculation sometimes will be in error and provision is made for the driver to make an adjustment to correct for this error as described below.

The windshield 416 of vehicle 402 is made from electro-chromic glass or comprises a liquid crystal assembly or similar system, and is selectively darkened at area 418 due to the application of a current along perpendicular directions 422 and 424 of windshield 416 or other appropriate means. The particular portion of the windshield to be darkened is determined by processor 101. Once the direction of the light from the oncoming vehicle is known and the locations of the driver's eyes are known, it is a matter of simple trigonometry to determine which areas of the windshield matrix should be darkened to impose a filter between the headlights and the driver's eyes. This is accomplished by processor 101. A separate control system, not shown, located on the instrument panel, or at some other convenient location, allows the driver to select the amount of darkening accomplished by the system from no darkening to maximum darkening. In this manner, the driver can select the amount of light that is filtered to suit his particular physiology. The sensor 410 can either be designed to respond to a single light source or to multiple light sources to be sensed and thus multiple portions of the vehicle windshield to be darkened.

As mentioned above, the calculations of the location of the driver's eyes using acoustic systems may be in error and therefore provision must be made to correct for this error. One such system permits the driver to adjust the center of the darkened portion of the windshield to correct for such errors through a knob on the instrument panel, steering wheel or other convenient location. Another solution permits the driver to make the adjustment by slightly moving his head. Once a calculation as to the location of the driver's eyes has been made, that calculation is not changed even though the driver moves his head slightly. It is assumed that the driver will only move his head to center the darkened portion of the windshield to optimally filter the light from the oncoming vehicle. The monitoring system will detect this initial head motion and make the correction automatically for future calculations.

Electro-chromic glass is currently used in rear view mirrors to darken the entire mirror in response to the amount of light striking an associated sensor. This substantially reduces the ability of the driver to see objects coming from behind his vehicle. If one rear-approaching vehicle, for example, has failed to dim his lights, the mirror will be darkened to respond to the light from that vehicle making it difficult for the driver to see other vehicles that are also approaching from the rear. If the rear view mirror is selectively darkened on only those portions which cover the lights from the offending vehicle, the driver is able to see all of the light coming from the rear whether the source is bright or dim. This permits the driver to see all of the approaching vehicles not just the one with bright lights.

Such a system is illustrated in FIG. 12 where rear view mirror 460 is equipped with electro-chromic glass, or comprises a liquid crystal or similar assembly, having the capability of being selectively darkened, e.g., at area 419. Associated with mirror 460 is a light sensor 462 that determines the direction of light 412 from the headlights of rear approaching vehicle 405. In the same manner as above, transducers 231, 232 and 233 determine the location of the eyes of the driver 210. The signals from both sensor systems, 231, 232 plus 233 and 462, are combined in processor 101, where a determination is made as to what portions of the mirror should be darkened, e.g., area 419. Appropriate currents are then sent to the mirror in a manner similar to the windshield system described above.

Figure 13:
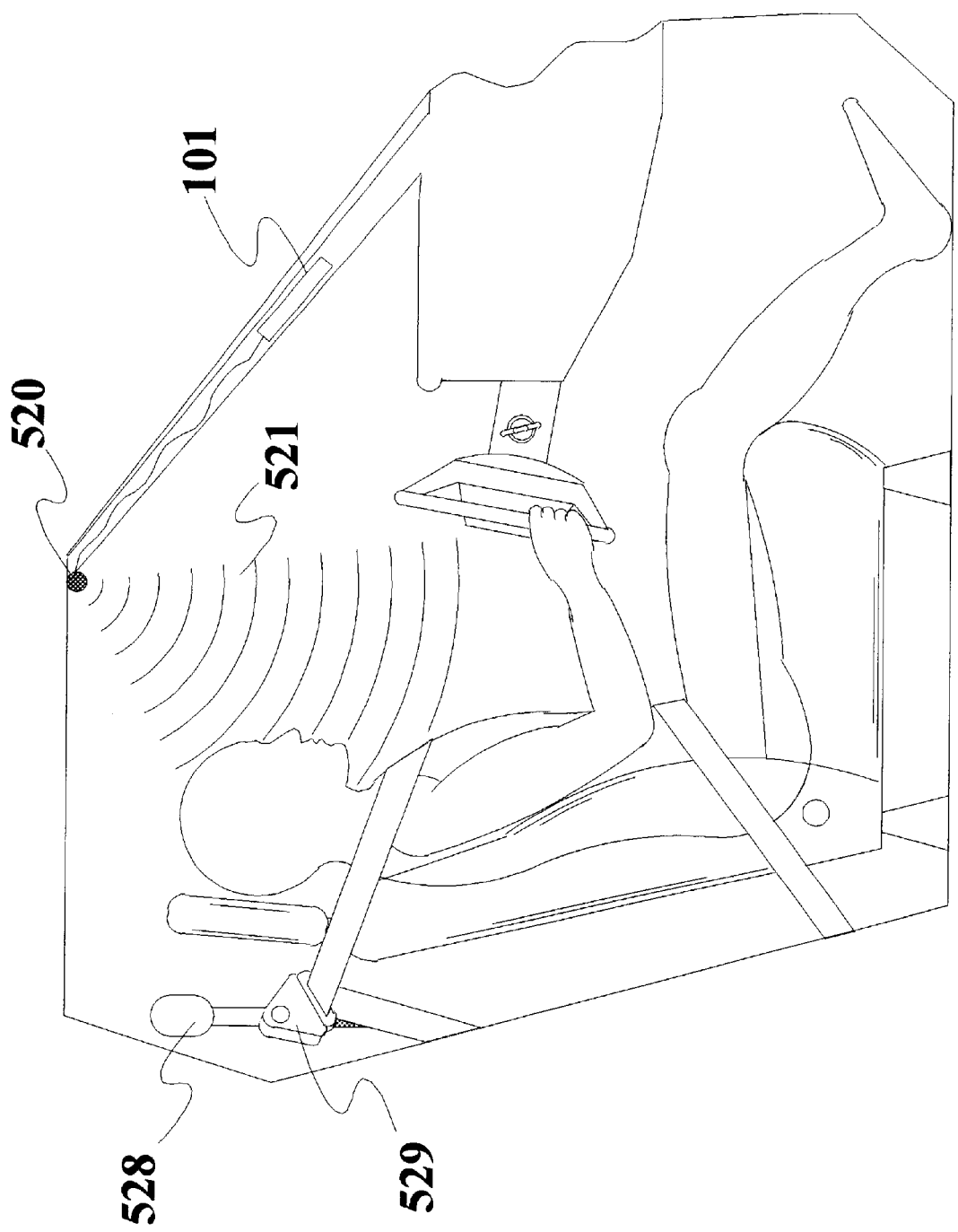
FIG. 13 is a side view with parts cutaway and removed of a vehicle showing the passenger compartment containing a driver, a shoulder height sensor and a seatbelt anchorage adjustment system.

Seatbelts are most effective when the upper attachment point to the vehicle is positioned vertically close to the shoulder of the occupant being restrained. If the attachment point is too low the occupant experiences discomfort from the rubbing of the belt on his shoulder. If it is too high, the occupant may experience discomfort due to the rubbing of the belt against his neck and the occupant will move forward by a greater amount during a crash which may result in his head striking the steering wheel. Women in particular experience discomfort from an improperly adjusted seatbelt anchorage point. For these reasons, it is desirable to have the upper seatbelt attachment point located slightly above the occupant's shoulder. To accomplish this for various sized occupants, the location of the occupant's shoulder must be known which can be accomplished by the vehicle interior monitoring system described herein. Such a system is illustrated in FIG. 13 that is a side view of a seatbelt anchorage adjustment system. In this system, a transmitter and receiver (transducer) 520 is positioned in a convenient location, such as the headliner, located above and to the outside of the occupant's shoulder. A narrow elliptical beam 521 of energy is transmitted from transducer 520 in a manner such that it illuminates the occupant's shoulder and headrest. An appropriate pattern recognition system as described above is then used to determine the location and position of the shoulder. This information is fed to the seatbelt anchorage height adjustment system 528, shown schematically, which moves the attachment point 529 to the optimum vertical location.

Figure 14:
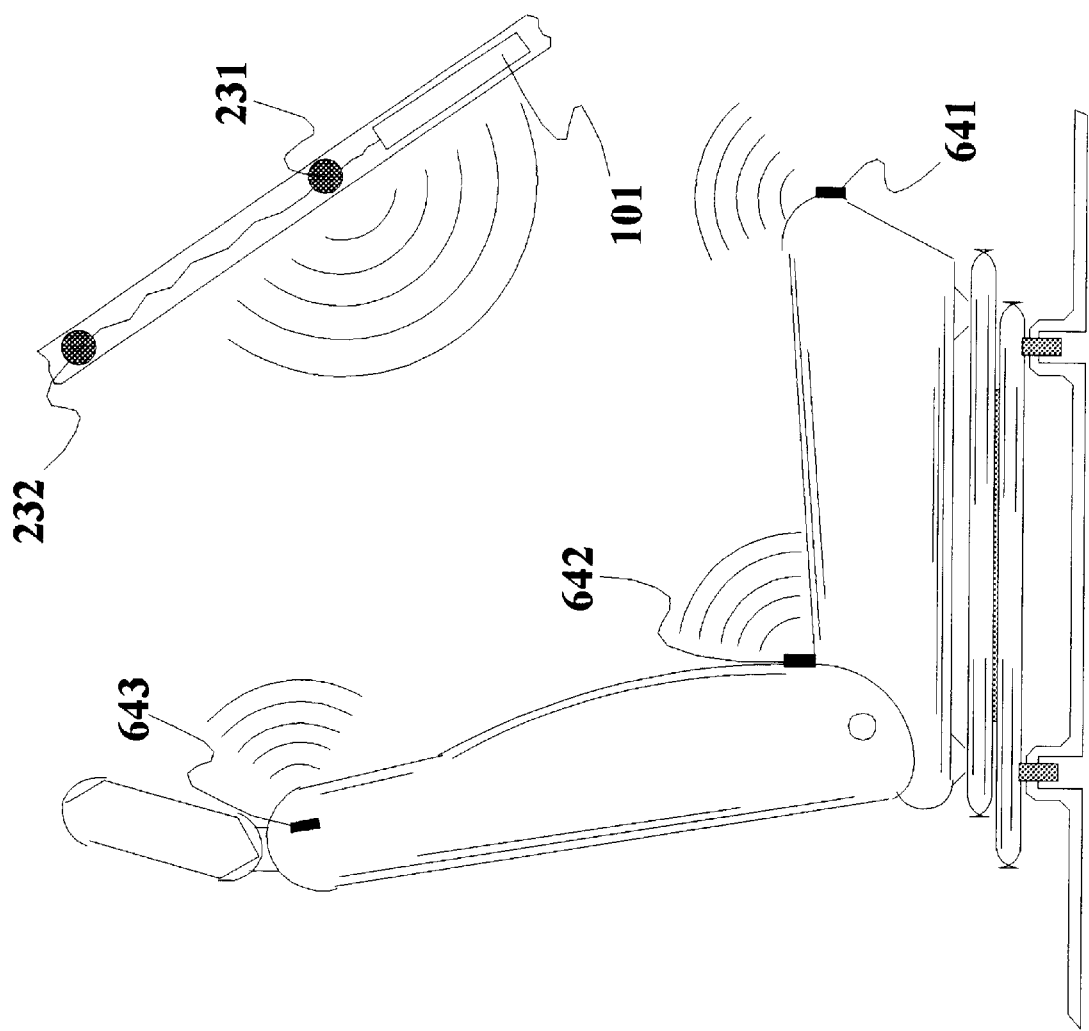
FIG. 14 is a side view with parts cutaway and removed of a seat in the passenger compartment of a vehicle showing the use of ultrasonic resonators or reflectors to determine the position of the seat.

Acoustic resonators are active or passive devices that resonate at a preset frequency when excited at that frequency. If such a device, which has been tuned to 40 kHz, is subjected to ultrasonic radiation at 40 kHz, for example, it can return a signal that is much stronger than the reflected radiation and the vibrations persist for a longer time period. If such a device is placed at a particular point in the passenger compartment of a vehicle, the returned signal can be easily identified as a high magnitude narrow signal at a particular point in time which is proportional to the distance from the resonator to the receiver. Since this device can be easily identified, it provides a particularly effective method of determining the distance to a particular point in the vehicle passenger compartment. Alternately, a device having a highly reflecting surface can be used in place of a resonator. If several such resonators or reflectors are used they can be tuned to slightly different frequencies and therefore separated and identified by the circuitry. Using such resonators or reflectors the positions of various objects in the vehicle can be determined. In FIG. 14 for example, three such resonators or reflectors are placed on the vehicle seat and used to determine the location of the front and back of the seat and the top of the seat back. In this case, transducers 231 and 232, mounted in the A-pillar 662, are used in conjunction with resonators 641, 642 and 643 to determine the position of the seat. This information is then fed to the seat memory and adjustment system, not shown, eliminating the currently used sensors that are placed typically beneath the seat adjacent the seat adjustment motors. In the conventional system, the seat sensors must be wired into the seat adjustment system and are prone to being damaged. By using the vehicle interior monitoring system alone with inexpensive active or passive resonators or reflectors, the conventional seat sensors can be eliminated resulting in a cost saving to the vehicle manufacturer. An efficient reflector, such as a parabolic shaped reflector, can be used in a similar manner as the resonator.

Resonators or reflectors, of the type described above can be used for making a variety of position measurements in the vehicle. These resonators are made to resonate at a particular frequency. If the number of resonators increases beyond a reasonable number, dual frequency resonators can be used. A pair of frequencies is then used to identify a particular location. Alternately, resonators tuned to a particular frequency can be used in combination with special transmitters, which transmit at the tuned frequency, which are designed to work with a particular resonator or group of resonators. The cost of the transducers is sufficiently low to permit special transducers to be used for special purposes. The use of resonators which resonate at different frequencies requires that they be illuminated by radiation containing those frequencies.

Figure 1A:
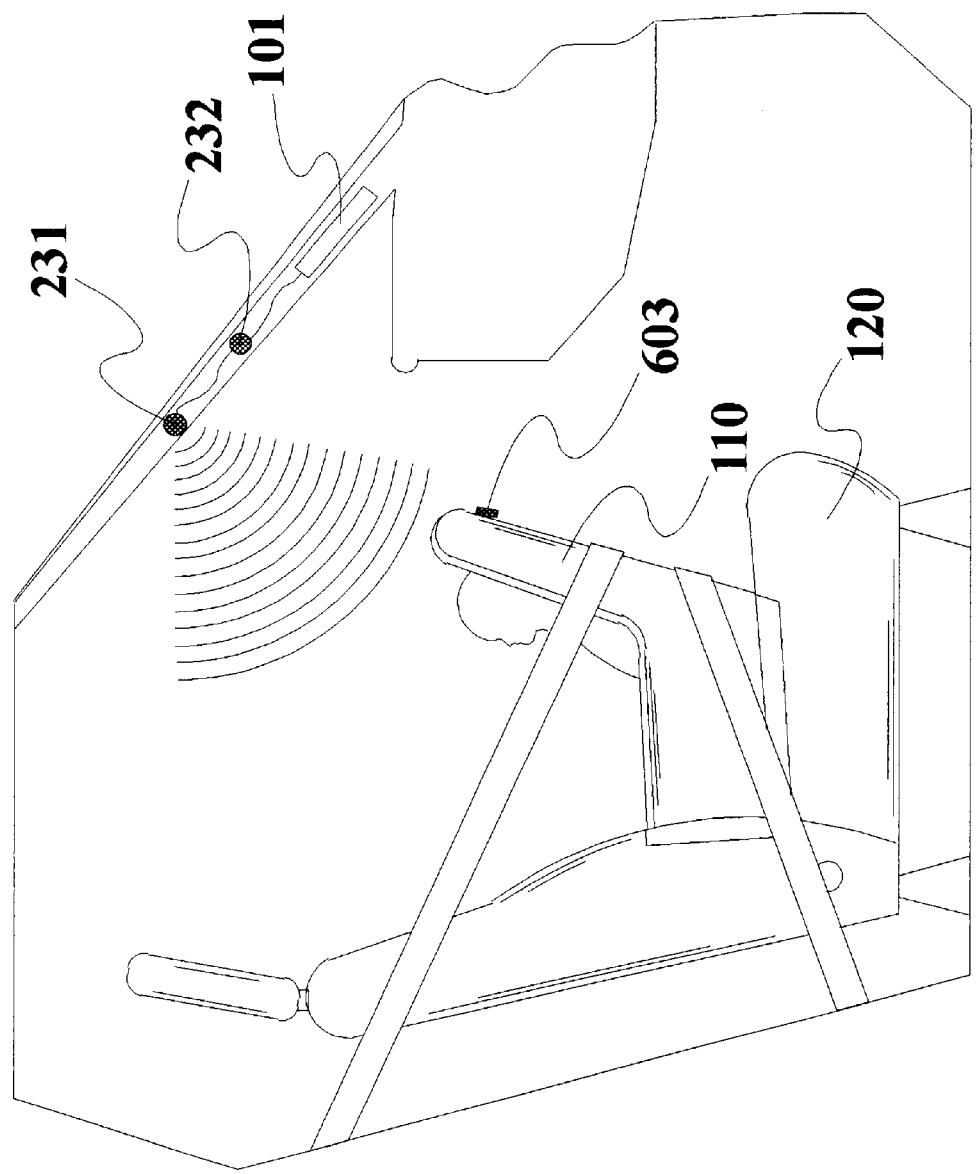
FIG. 1A is a side view of the passenger compartment of a vehicle with parts cutaway and removed showing the use of a resonator to determine the presence of a rear-facing child seat.
Figure 15:
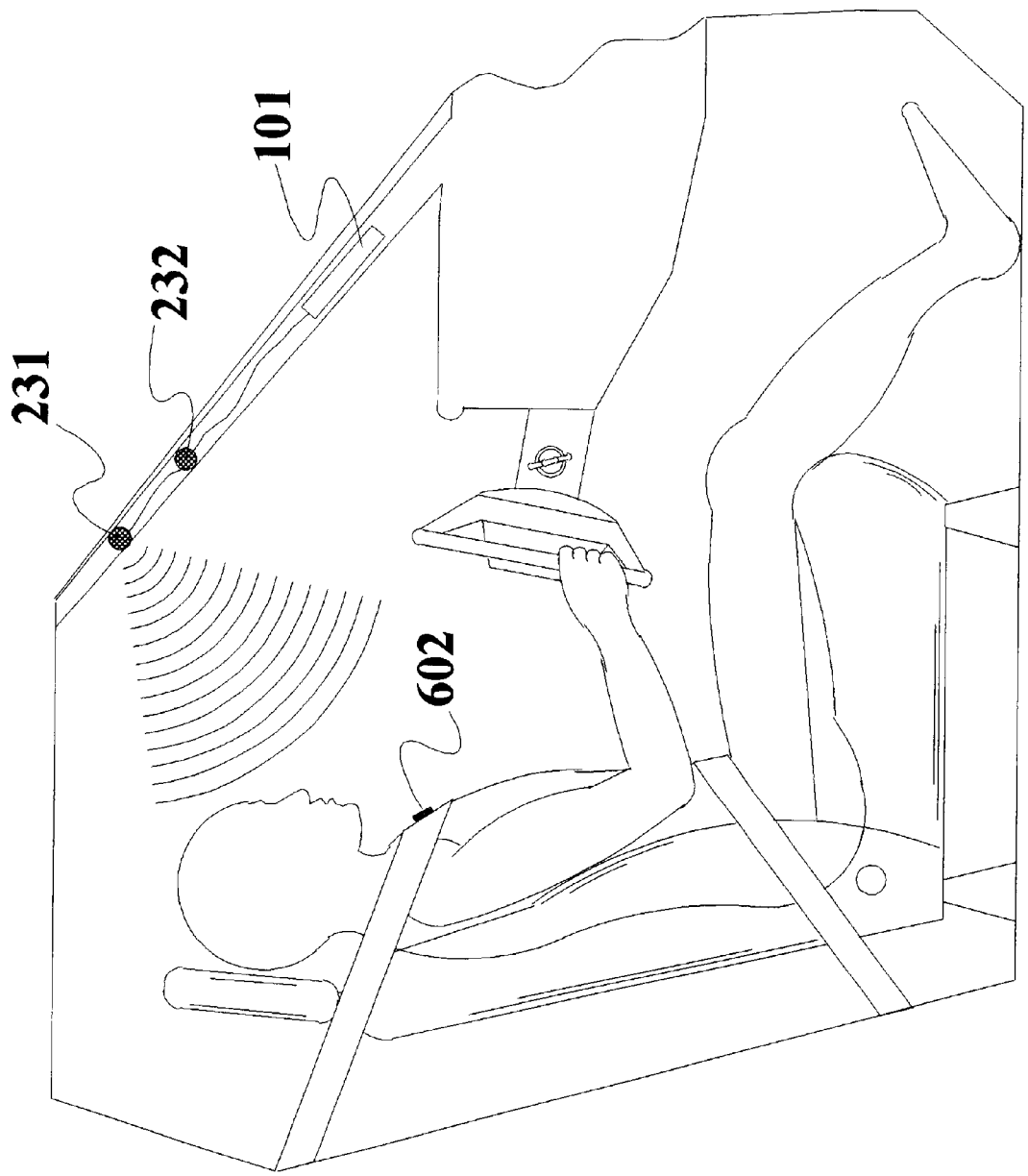
FIG. 15 is a side view with parts cutaway and removed of the passenger compartment of a vehicle showing the use of ultrasonic resonators or reflectors to determine the position of the driver seatbelt.

Another application for a resonator of the type described is to determine the location of the seatbelt and therefore determine whether it is in use. If it is known that the occupants are wearing seatbelts, the airbag deployment threshold can be increased since the airbag is not needed in low velocity accidents if the occupants are already restrained by seatbelts. This will reduce the number of deployments for cases where the airbag provides little or no improvement in safety over the seatbelt. FIG. 15, for example, shows the placement of a resonator 602 onto the front surface of the seatbelt where it can be sensed by the transducers 231 and 232. Such a system can also be used to positively identify the presence of a rear facing child seat in the vehicle. For example, FIG. 1A shows the placement of a resonator 603 on the back of a rear-facing child seat 110.

Other uses for such resonators include placing them on doors and windows in order to determine whether either is open or closed. In FIG. 16A, for example, such a resonator 604 is placed onto the top of the window and is sensed by transducers 611 and 612. In this case, transducers 611 and 612 also monitor the space between the edge of the window glass and the top of the window opening. Many vehicles now have systems which permit the rapid opening of the window, called "express open", by a momentary push of a button. For example, when a vehicle approaches a tollbooth, the driver needs only touch the window control button and the window opens rapidly. Some automobile manufacturers do not wish to use such systems for closing the window, called "express close", because of the fear that the hand of the driver, or of a child leaning forward from the rear seat, or some other object, could get caught between the window and window frame. If the space between the edge of the window and the window frame were monitored with an interior monitoring system, this problem can be solved. The presence of the resonator or reflector 604 on the top of the window glass also gives a positive indication of where the top surface is and reflections from below that point can be ignored.

Various design variations of the window monitoring system are possible and the particular choice will depend on the requirements of the vehicle manufacturer and the characteristics of the vehicle. Two systems will be briefly described here.

Figure 16:
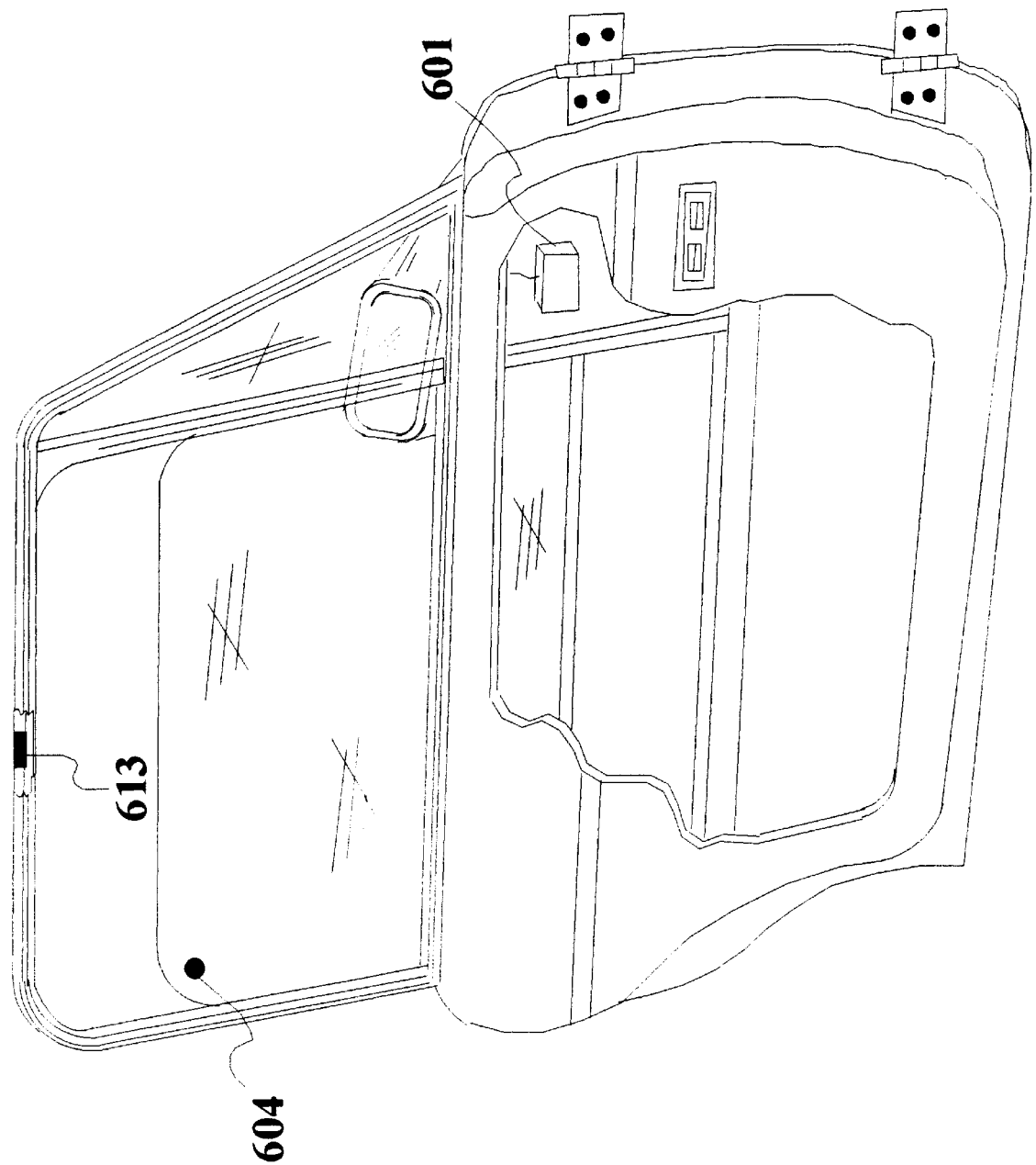
FIG. 16 is a side view with parts cutaway and removed of the passenger compartment of a vehicle showing the use of an ultrasonic resonator or reflector to determine the extent of opening of the driver window and of a system for determining the presence of an object, such as the hand of an occupant, in the window opening.
Figure 16A:
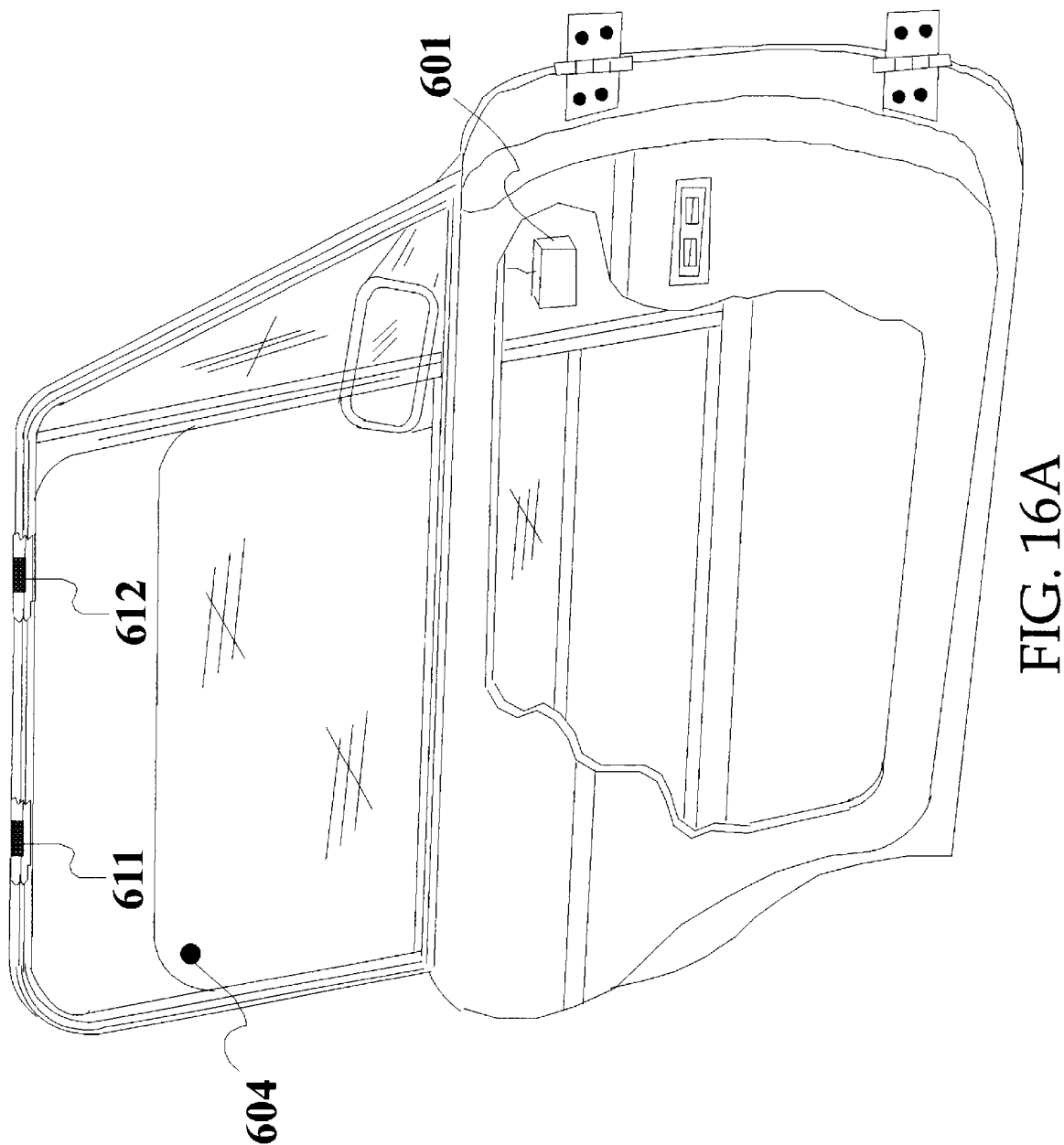
FIG. 16A is a side view with parts cutaway and removed of the passenger compartment of a vehicle showing the use of an ultrasonic resonator or reflector to determine the extent of opening of the driver window and of another system for determining the presence of an object, such as the hand of an occupant, in the window opening.

In the first example shown in FIG. 16, a single transmitter/receiver (transducer) 613 is used in place of and located centrally midway between the transducers 611 and 612 shown in FIG. 16A. A recording of the output of transducer 613 is made of the open window without an object in the space between the window edge and the top of the window frame. When in operation, the transducer 613 receives the return signal from the space it is monitoring and compares that signal with the stored signal referenced above. This is done by processor 601. If the difference between the test signal and the stored signal indicates that there is a reflecting object in the monitored space, the window is prevented from closing in the express close mode. If the window is part way up, a reflection will be received from the edge of the window glass which, in most cases, is easily identifiable from the reflection of a hand for example. A simple algorithm based on the intensity of the reflection in most cases is sufficient to determine that an object rather than the window edge is in the monitored space. In other cases, the algorithm is used to identify the window edge and ignore that reflection and all other reflections which are lower (i.e. later in time) than the window edge. In all cases, the system will default in not permitting the express close if there is any doubt. The operator can still close the window by holding the switch in the window closing position and the window will then close slowly as it now does in vehicles without the express close feature.

In the second system, two transducers 611 and 612 are used as shown in FIG. 16A and the processor 601 comprises a neural network. In this example the system is trained for all cases where the window is down and at intermediate locations. In operation, the transducers monitor the window space and feed the received signals to processor 601. As long as the signals are similar to one of the signals for which the network was trained, the express close system is enabled. As before, the default is to suppress the express close.

Figure 17:
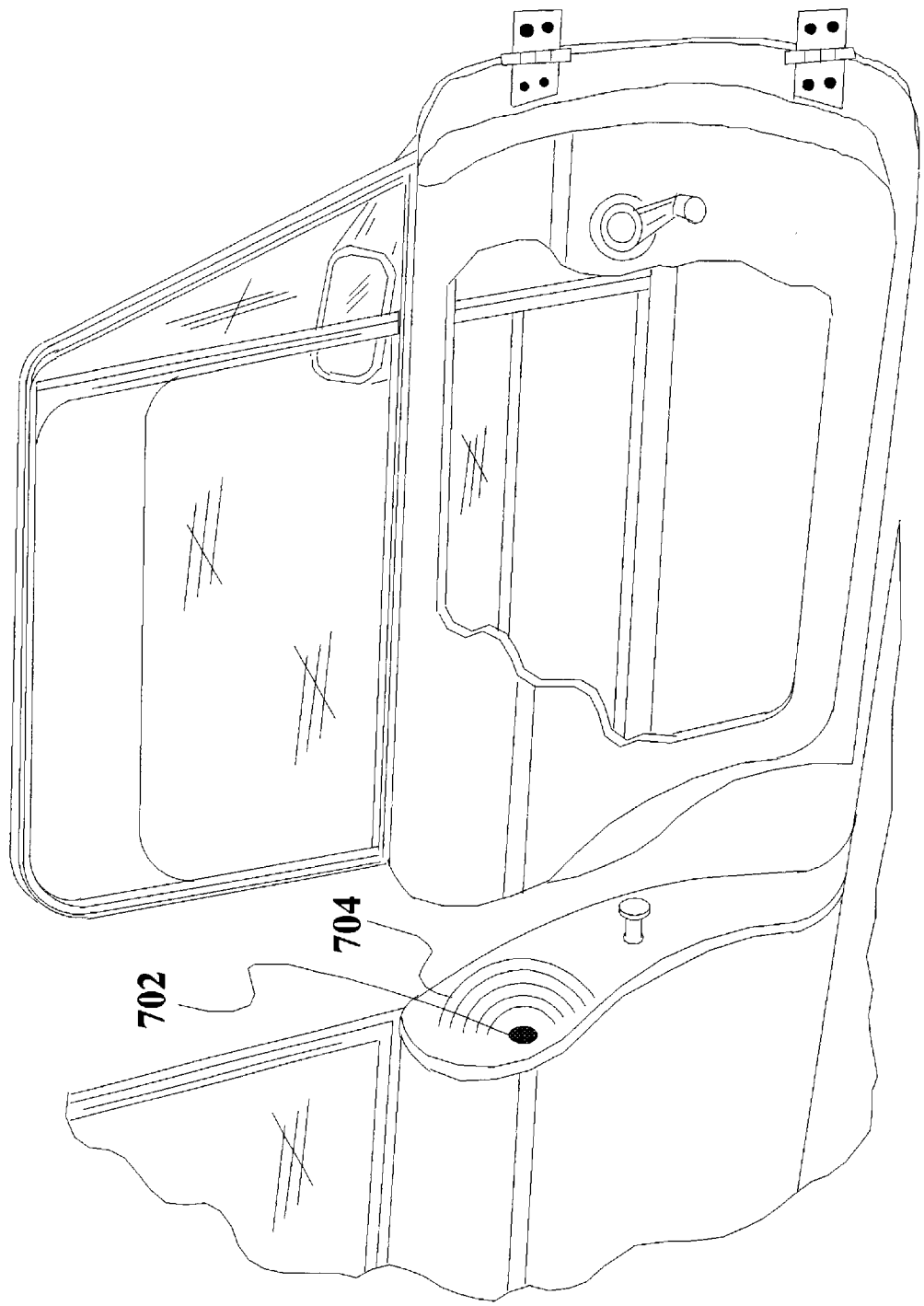
FIG. 17 is a side view with parts cutaway and removed of the passenger compartment of a vehicle showing the use of an ultrasonic resonator or reflector to determine the extent of opening of the driver side door.

The use of a resonator, or reflector, to determine whether the vehicle door is properly shut is illustrated in FIG. 17. In this case, the resonator 702 is placed in the B-pillar in such a manner that it is shielded by the door, or by a cover or other inhibiting mechanism (not shown) engaged by the door, and prevented from resonating when the door is closed. Resonator 702 provides waves 704. If transducers such as 231 and 232 in FIG. 3 are used in this system, the closed-door condition would be determined by the absence of a return signal from the B-pillar resonator 702. This system permits the substitution of an inexpensive resonator for a more expensive and less reliable electrical switch.

Figure 18:
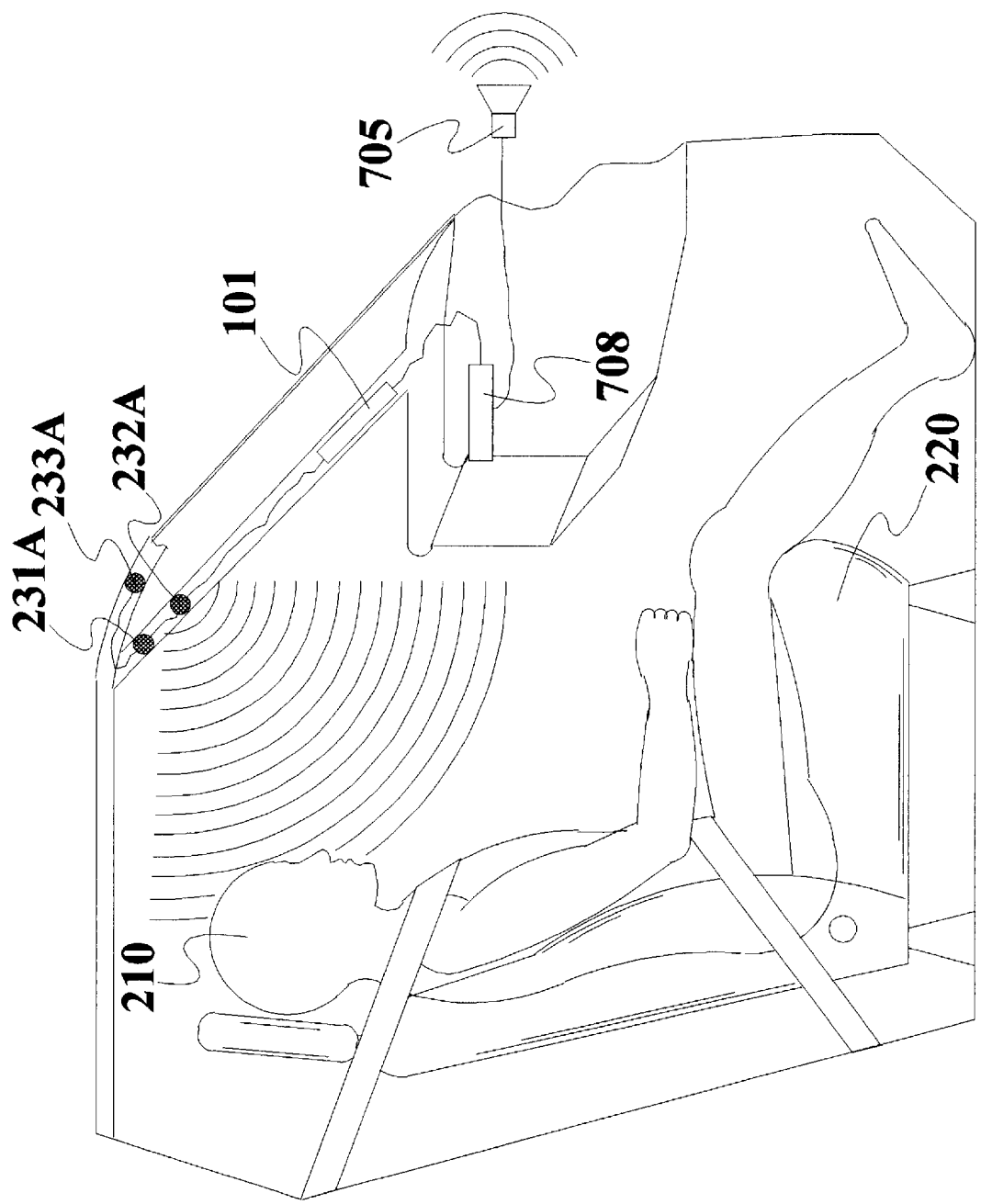
FIG. 18 is a side view with parts cutaway and removed showing schematically the interface between the vehicle interior monitoring system of this invention and the vehicle security system.

A neural network, or other pattern recognition system, can be trained to recognize certain people as permitted operators of a vehicle. In this case, if a non-recognized person attempts to operate the vehicle, the system can disable the vehicle and/or sound an alarm as illustrated in FIG. 18. In this figure the sensing transducers are shown as before as 231A, 232A and 233A, the alarm system schematically as 708 and the alarm as 705. Since it is unlikely that an unauthorized operator will resemble the authorized operator, the neural network system can be quite tolerant of differences in appearance of the operator. The system defaults to where a key must be used in the case that the system doesn't recognize the driver or the owner wishes to allow another person to operate the vehicle. The transducers 231A, 232A and 233A are sensitive to infrared radiation and the operator is illuminated with infrared waves from transducer 231A. This is necessary due to the small size of the features which need to be recognized for high accuracy of recognition. An alternate system uses an infrared laser, which can be 231A in FIG. 18, to illuminate the operator and a CCD or CMOS device, which can be represented as 232A in FIG. 18, to receive the reflected image. In this case the recognition of the operator is accomplished using a pattern recognition system such as described in Popesco, V. and Vincent, J. M. "Location of Facial Features Using a Boltzmann Machine to Implement Geometric Constraints", Chapter 14 of Lisboa, P. J. G. and Taylor, M. J. Editors, *Techniques and Applications of Neural Networks,* Ellis Horwood Publishers, New York, 1993. In the present case a larger CCD element array containing 100,000 or more elements would in many cases be used instead of the 16 by 16 or 256 element CCD array used by Popesco and Vincent.

Figure 19:
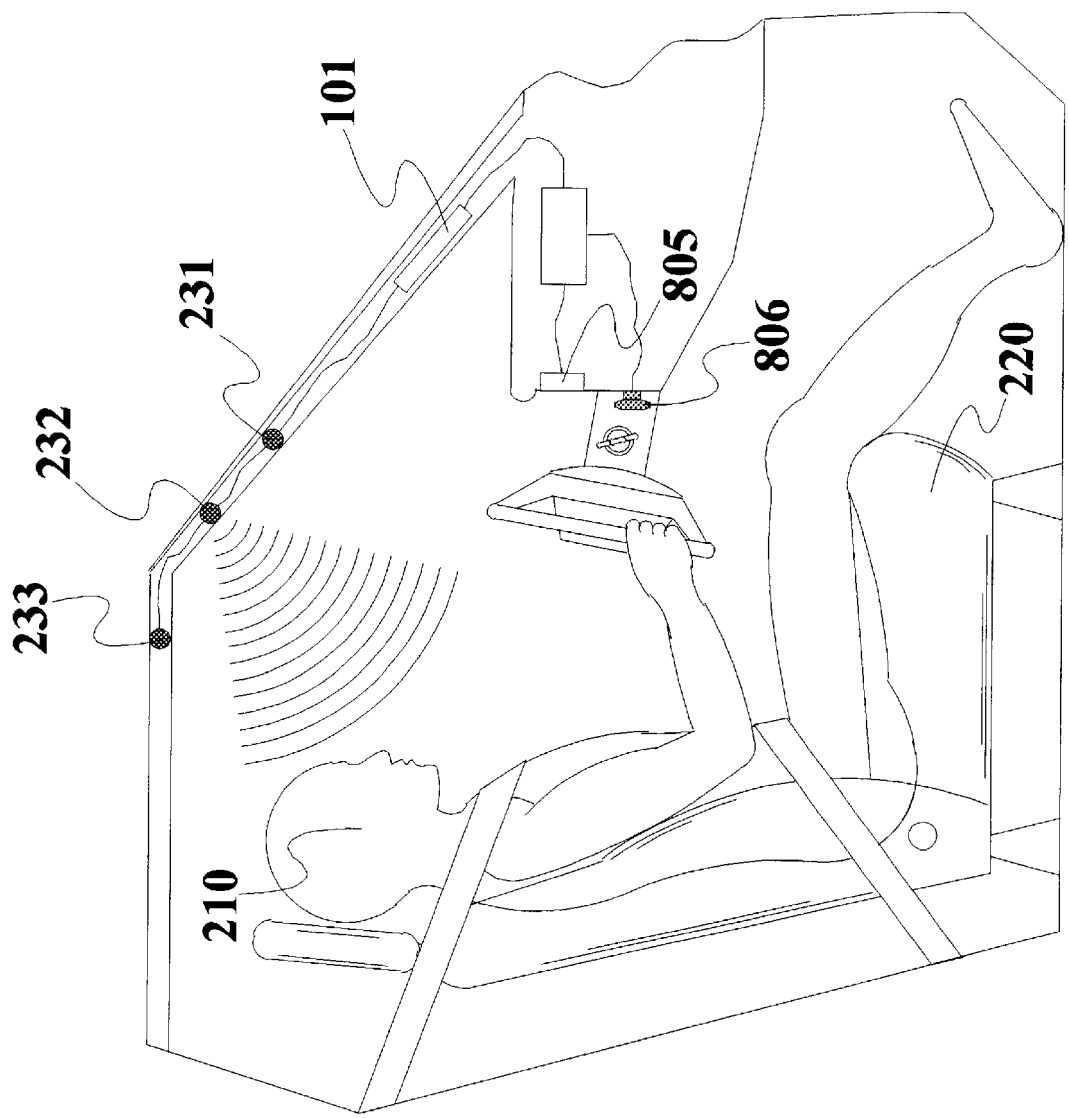
FIG. 19 is a side view with parts cutaway and removed showing schematically the interface between the vehicle interior monitoring system of this invention and an instrument panel mounted inattentiveness warning light or buzzer and reset button.

Once a vehicle interior monitoring system employing a sophisticated pattern recognition system, such as a neural network or fuzzy logic system, is in place, it is possible to monitor the motions of the driver over time and determine if he is falling asleep or has otherwise become incapacitated. In such an event, the vehicle can be caused to respond in a number of different ways. One such system is illustrated in FIG. 19 and consists of a monitoring system having transducers 231, 232 and 233 plus microprocessor 101, such as shown in FIG. 7A, programmed to compare the motions of the driver over time and trained to recognize changes in behavior representative of becoming incapacitated. If the system determines that there is a reasonable probability that the driver has fallen asleep, for example, then it can turn on a warning light shown here as 805 or send a warning sound. If the driver fails to respond to the warning by pushing a button 806, for example, then the horn and lights can be operated in a manner to warn other vehicles and the vehicle brought to a stop. One novel approach, not shown, would be to use the horn as the button 806. For a momentary depression of the horn, for this case, the horn would not sound. Naturally other responses can also be programmed.

An even more sophisticated system of monitoring the behavior of the driver is to track his eye motions using such techniques as are described in: Freidman et al, U.S. Pat. No. 4,648,052 "Eye Tracker Communication System"; Heyner et al, U.S. Pat. No. 4,720,189 "Eye Position Sensor"; Hutchinson U.S. Pat. No. 4,836,670 "Eye Movement Detector"; and, Hutchinson U.S. Pat. No. 4,950,069 "Eye Movement Detector With Improved Calibration and Speed", all of which are included herein by reference. The detection of the impaired driver in particular can be best determined by these techniques. Also, in a similar manner as described in these patents, the motion of the driver's eyes can be used to control various systems in the vehicle permitting hands off control of the entertainment system, heating and air conditioning system or all of the other systems described above. Although some of these systems have been described in the patents mentioned above, none have made use of neural networks for interpreting the eye movements.

Figure 20:
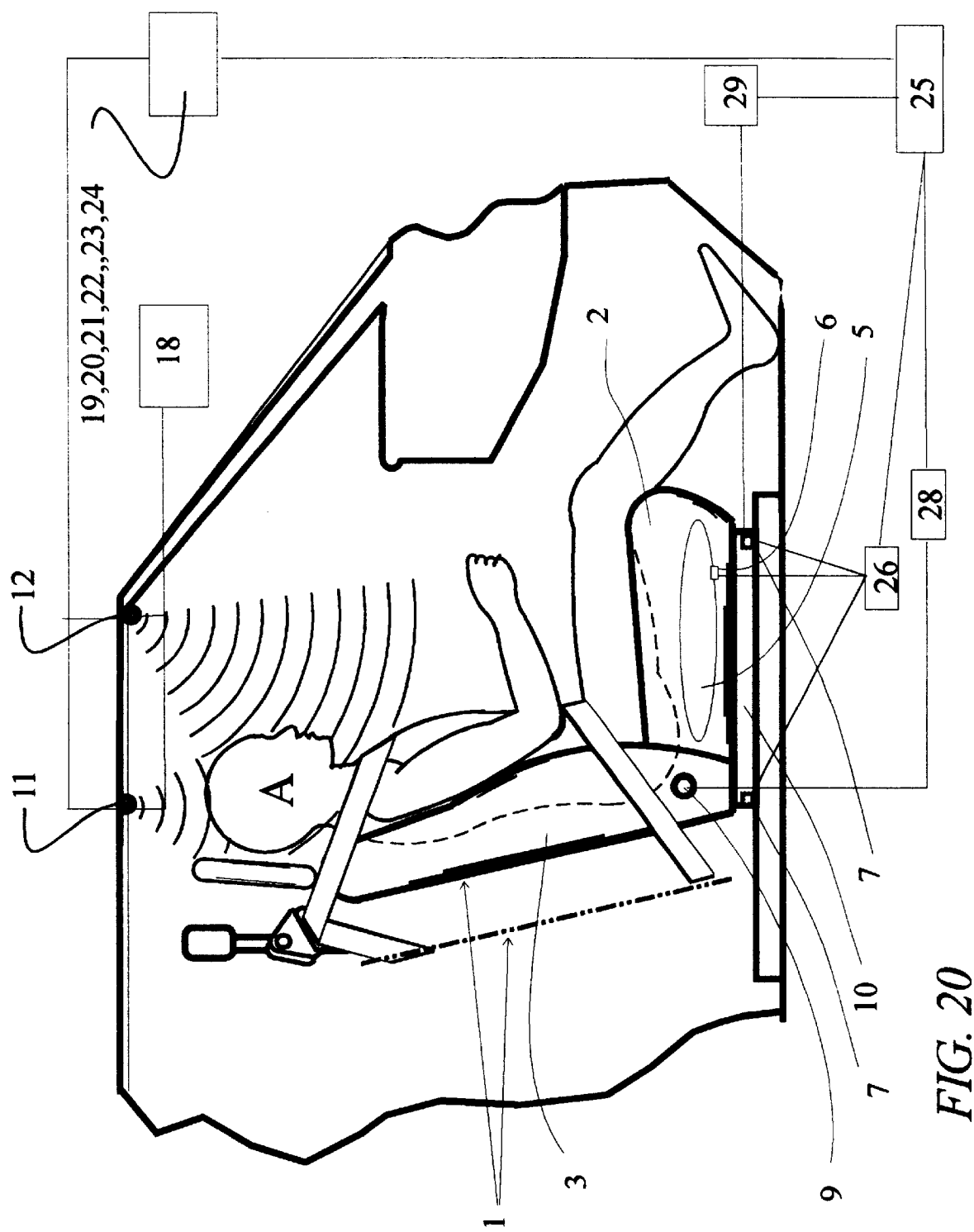
FIG. 20 shows a seated-state detecting unit in accordance with the present invention and the connections between ultrasonic sensors, a weight sensor, a reclining angle detecting sensor, a seat track position detecting sensor, a neural network circuit, and an airbag system installed within a vehicle compartment.

FIG. 20 shows a passenger seat 1 to which a seated-state detecting unit according to the present invention may be applied. The passenger seat 1 includes a horizontally situated seat portion 2 and a vertically oriented back portion 3. The seat portion 2 is provided with one or more weight sensors 6 and 7 which determine the weight of a passenger or object occupying the passenger seat. The coupled portion between the seated portion 2 and the back portion 3 is provided with a reclining angle detecting sensor 9, which detects the tilted angle of the back portion 3 relative to the seat portion 2. The seat portion 2 is provided with a seat track position detecting sensor 10. The seat track position detecting sensor 10 fulfills a role of detecting the quantity of movement of the seat 1 which is moved from a back reference position, indicated by the dotted chain line.

Weight measuring means such as the sensors 6 and 7 are associated with the seat, e.g., mounted into or below the seat portion 2, for measuring the weight applied onto the seat. The weight may be zero indicating that there is no occupant is present. Sensors 6 and 7 may represent a plurality of different sensors which measure the weight applied onto the seat at different portions thereof or for redundancy purposes, for example, such as by means of an airbag 5 in the seat portion 2. Such sensors may be in the form of force or pressure sensors which measure the force or pressure on the seat or seat back, displacement measuring sensors which measure the displacement of the seat surface or the entire seat such as through the use of strain gages mounted on the seat structural members or other appropriate locations, or systems which convert displacement into a pressure wherein a pressure sensor can be used as a measure of weight.

Figure 21:
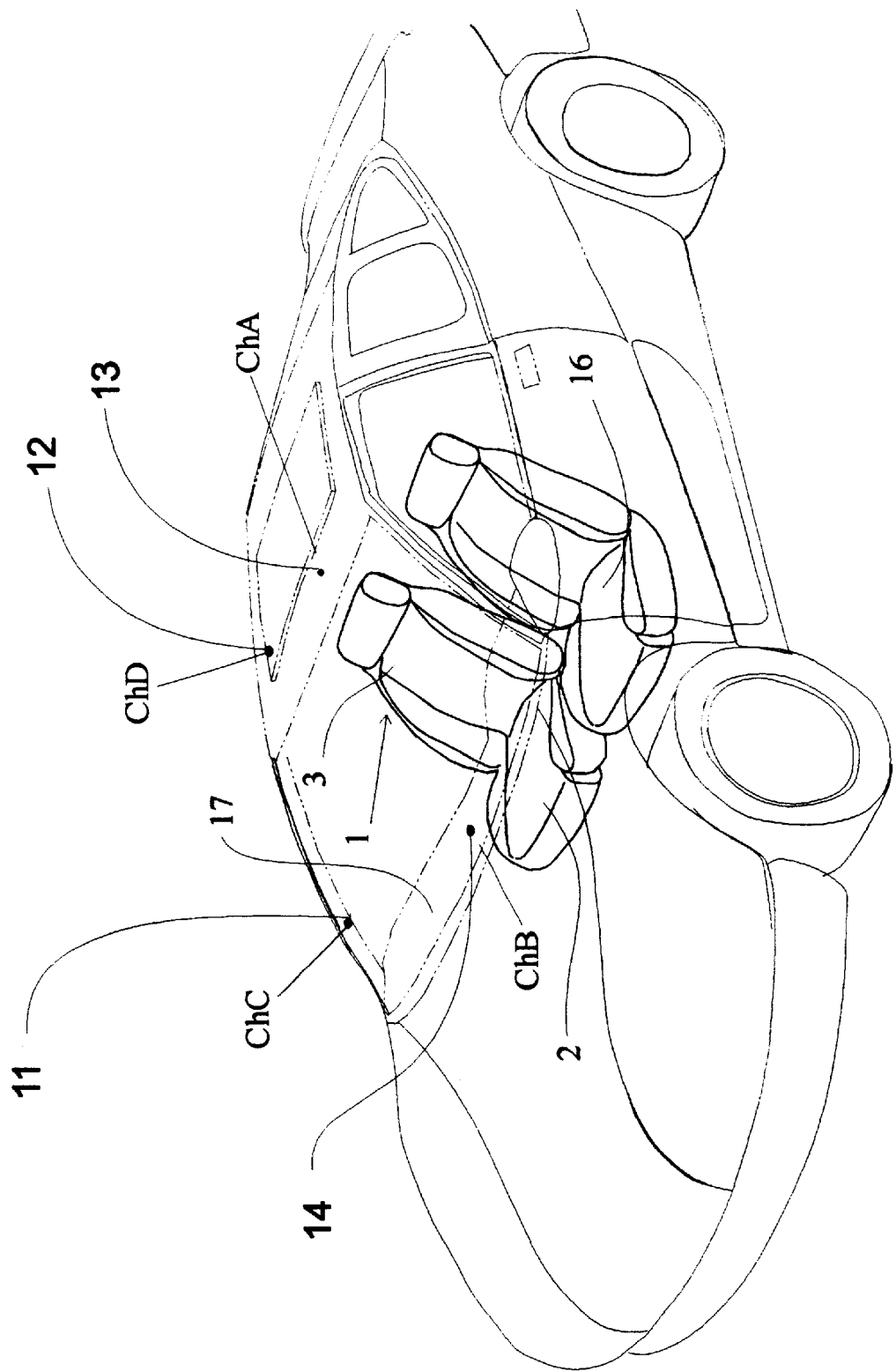
FIG. 21 is a view of a passenger seat in the compartment showing the relative layout of the ultrasonic sensors.

As shown in FIG. 21, there are provided four sets of ultrasonic sensors 11–14 mounted at preferred locations within the passenger compartment. Each set of ultrasonic sensors 11–14 comprises a transmitter and a receiver, which may be integrated into a single unit or used as individual components separated from one another. In this embodiment, the ultrasonic sensor 11 is mounted on the upper portion of the front pillar, A-Pillar, of the vehicle. The ultrasonic sensor 12 is mounted on the upper portion of the intermediate pillar, B-Pillar. The ultrasonic sensor 13 is mounted on the ceiling in the headliner. The ultrasonic sensor 14 is mounted near the middle of an instrument panel 17 in front of the driver's seat 16. Although sensors 11–14 are described as being ultrasonic sensors, the invention is equally applicable for other types of sensors which emit waves (other than ultrasonic waves) which will reflect from an object, or are modified by interacting with an object, and can be received by appropriate receivers and the received waves processed as described below. The methodology leading to the placement of these transducers is central to the instant invention as explained in detail in U.S. patent application Ser. No. 08/798,029 cross-referenced above.

Deployment of the airbag is enabled in the event that the vehicle experiences a crash if the occupant is in position and the child seat is facing forward. Sensor 1,4 and 12,13 are placed with their separation axis parallel to the separation axis of the head, shoulder and rear facing child seat volumes of an automotive passenger seat and in view of this specific positioning, are capable of distinguishing the different configurations.

Figure 22:
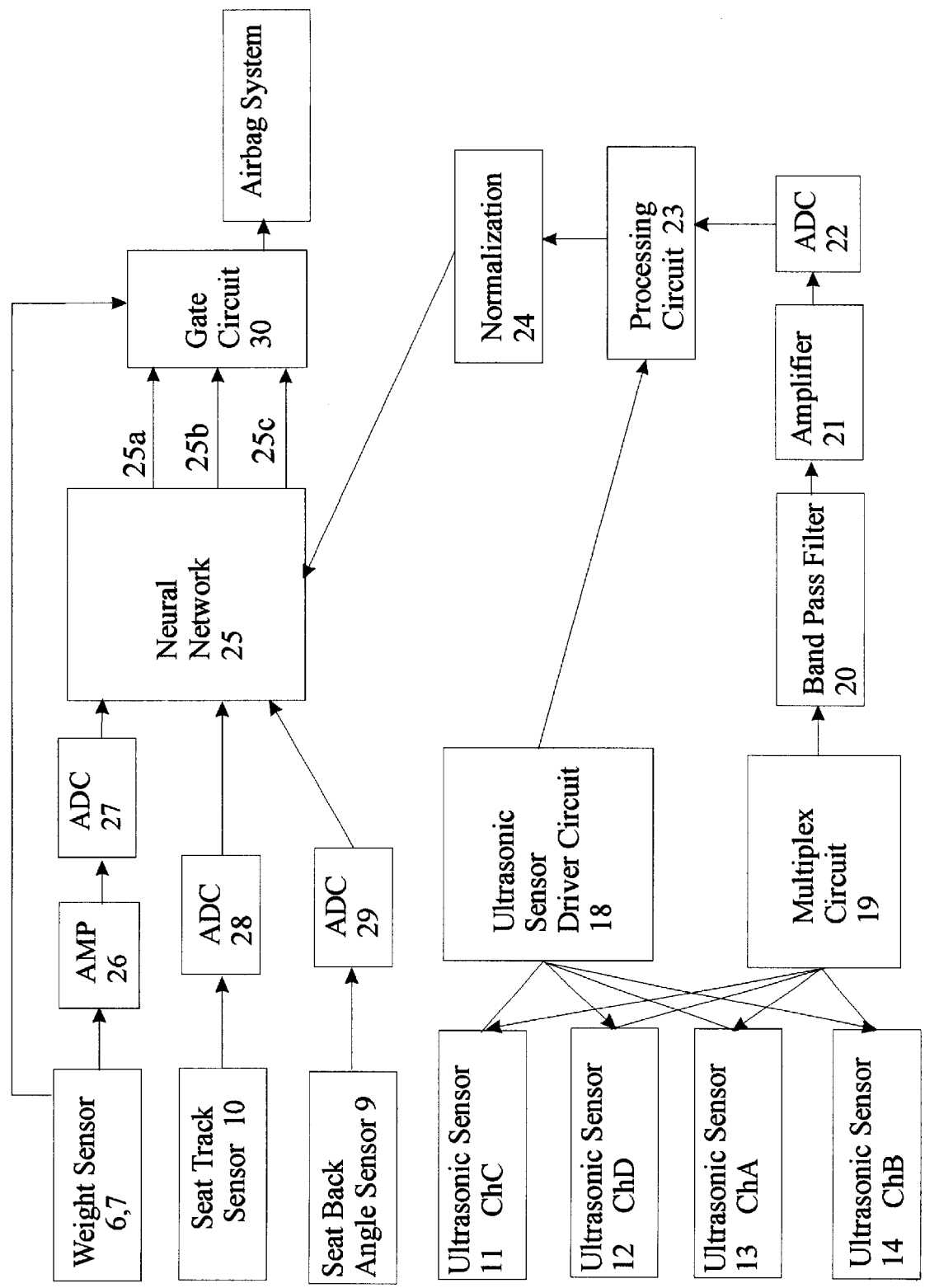
FIG. 22 is a circuit diagram of the seated-state detecting unit of the present invention.

The ultrasonic sensors 11–14 are controlled or driven, one at a time or simultaneously, by an appropriate driver circuit such as ultrasonic sensor driver circuit 18 shown in FIG. 22. The transmitters of the ultrasonic sensors 11–14 transmit respective ultrasonic waves toward the passenger seat 1 and transmit pulses (see FIG. 23($a$)) in sequence at times t1, t2, t3 and t4 (t4>t3>t2>t1). The reflected waves of the ultrasonic waves are received by the receivers ChA–ChD of the ultrasonic sensors 11–14. The receiver ChA is associated with the ultrasonic sensor 13, the receiver ChB is associated with the ultrasonic sensor 14, the receiver ChC is associated with the ultrasonic sensor 11, and the receiver ChD is associated with the ultrasonic sensor 12. The receivers and transmitters can be implemented using pairs of devices or, alternately, each device can be both a transmitter and a receiver.

FIGS. 23($b$) and 23($c$) show examples of the reflected ultrasonic waves USRW that are received by receivers ChA–ChD. FIG. 23($c$) shows an example of the reflected wave USRW that is obtained when an adult passenger sits in a normally seated space on the passenger seat 1, while FIG. 23($b$) shows an example of the reflected wave USRW that are obtained when an adult passenger sits in a slouching state (one of the abnormal seated-states) in the passenger seat 1.

In the case of a normally seated passenger, as shown in FIG. 21, the location of the ultrasonic sensor 12 is closest to the passenger A (shown in FIG. 20). Therefore, the reflected wave pulse P1 is received earliest after transmission by the receiver ChD as shown in FIG. 23($c$), and the width of the reflected wave pulse P1 is larger. Next, the distance from the ultrasonic sensor 13 is closer to the passenger A, so a reflected wave pulse P2 is received earlier by the receiver ChA compared with the remaining reflected wave pulses P3 and P4. Since the reflected wave pauses P3 and P4 take more time than the reflected wave pulses P1 and P2 to arrive at the receivers ChC and ChB, the reflected wave pulses P3 and P4 are received as the timings shown in FIG. 23($c$). More specifically, since it is believed that the distance from the ultrasonic sensor 11 to the passenger A is slightly shorter than the distance from the ultrasonic sensor 14 to the passenger A, the reflected wave pulse P3 is received slightly earlier by the receiver ChC than the reflected wave pulse P4 is received by the receiver ChB.

In the case where the passenger A is sitting in a slouching state in the passenger seat 1, the distance between the ultrasonic sensor 11 and the passenger A is shortest. Therefore, the time from transmission at time t3 to reception is shortest, and the reflected wave pulse P3 is received by the receiver ChC, as shown in FIG. 23($b$). Next, the distances between the ultrasonic sensor 14 and the passenger A becomes shorter, so the reflected wave pulse P4 is received earlier by the receiver ChB than the remaining reflected wave pulses P2 and P1. When the distance from the ultrasonic sensor 13 to the passenger A is compared with that from the ultrasonic sensor 12 to the passenger A, the distance from the ultrasonic sensor 13 to the passenger A becomes shorter, so the reflected wave pulse P2 is received by the receiver ChA first and the reflected wave pulse P1 is thus received last by the receiver ChD.

Figures 23A, 23B, 23C:
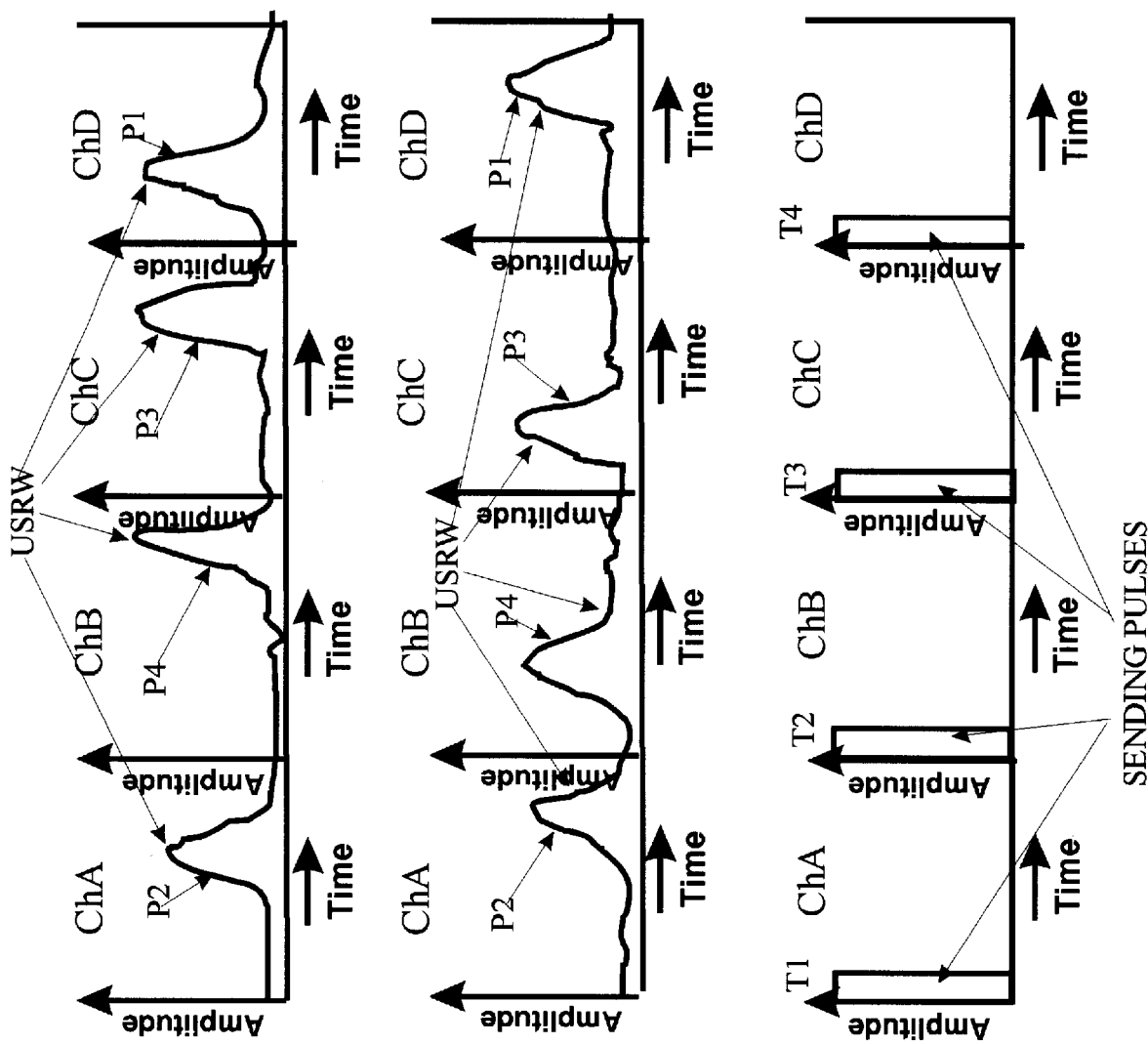
FIG. 23($a$) is a diagram showing the transit pulse of a respective ultrasonic wave from four ultrasonic sensors toward the passenger seat.

The configurations of the reflected wave pulses P1–P4, the times that the reflected wave pulses P1–P4 are received, the sizes of the reflected wave pulses P1–P4 are varied depending upon the configuration and position of an object such as a passenger situated on the front passenger seat 1. FIGS. 23(b) and (c) merely show examples for the purpose of description and therefore it is a matter of course that the present invention is not limited to these examples.

The outputs of the receivers ChA–ChD, as shown in FIG. 22, are input to a band pass filter 20 through a multiplex circuit 19 which is switched in synchronization with a timing signal from the ultrasonic sensor drive circuit 18. The band pass filter 20 removes a low frequency wave component from the output signal based on each of the reflected wave USRW and also removes some of the noise. The output signal based on each of the reflected wave USRW is passed through the band pass filter 20, then is amplified by an amplifier 21. The amplifier also removes the high frequency carrier wave component in each of the reflected USRW and generates an envelope wave signal. This envelope wave signal is input to an analog/digital converter (ADC) 22 and digitized as measured data. The measured data is input to a processing circuit 28, which is controlled by the timing signal which is in turn output from the ultrasonic sensor drive circuit 18.

Figure 24:
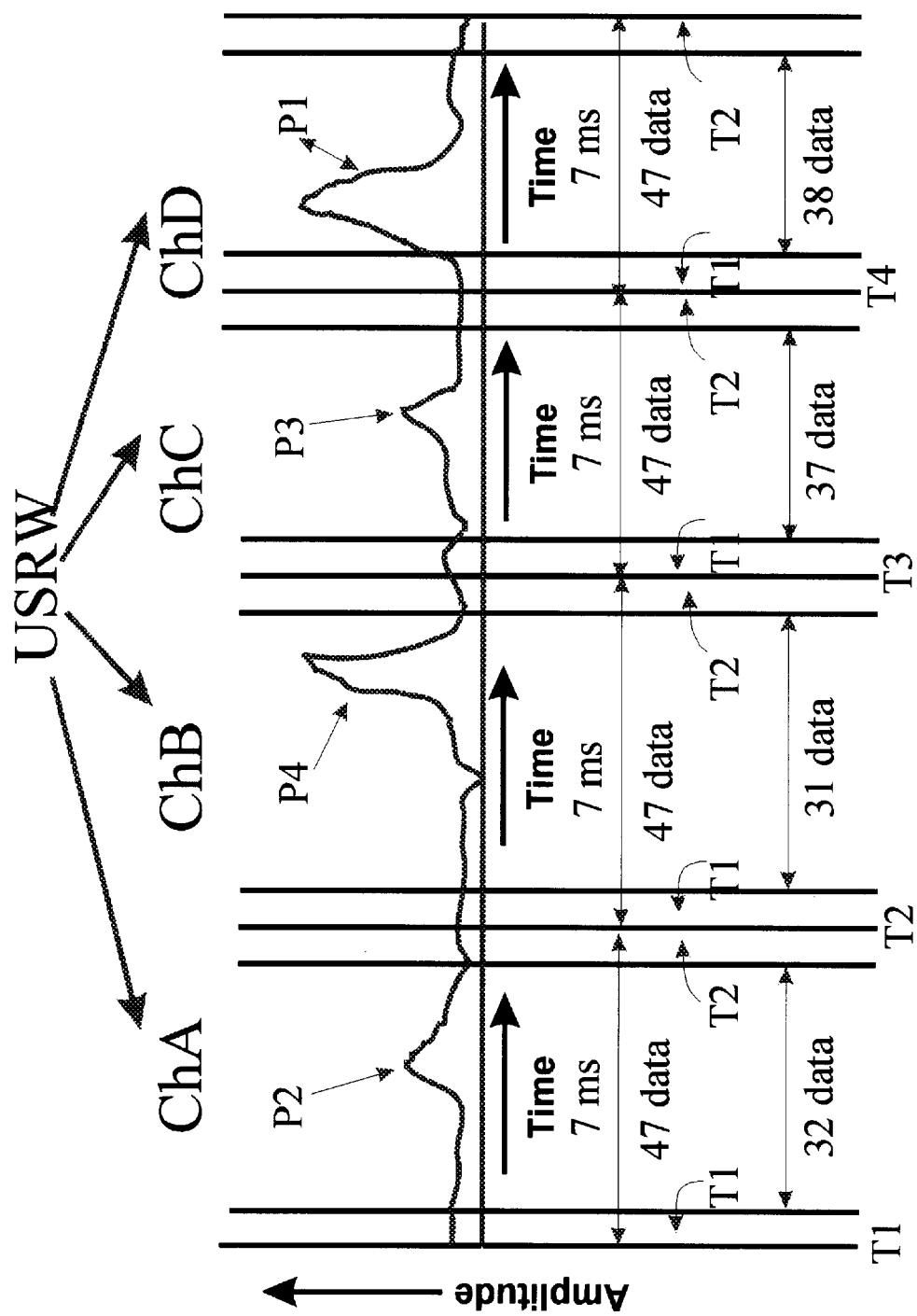
FIG. 24 is a diagram of the data processing of the reflected wave of the ultrasonic wave.

With reference to FIG. 24, the processing circuit 23 collects measured data at intervals of 7 ms, and 47 data points are generated for each of the ultrasonic sensors 11–14. For each of these reflected waves USRW, the initial reflected wave portion T1 and the last reflected wave portion T2 are cut off. The reason for this will be described when the training procedure of a neural network circuit is described later, and the description is omitted for now. With this, 32 data points, 31 data points, 37 data points, and 38 data points will be sampled by the ultrasonic sensors 11, 12, 13 and 14, respectively. The reason why the number of data points differs for each of the ultrasonic sensors 11–14 is that the distance from the passenger seat 1 to the ultrasonic sensors 11–14 differ from one another.

Each of the measured data is input to a normalization circuit 24 and normalized. The normalized measured data is input to the neural network circuit 25 as wave data.

The output of the weight sensors 6 or 7 is amplified by an amplifier 26 coupled to the weight sensors 6 or 7 and the amplified output is input to the analog/digital converter 27.

The reclining angle detecting sensor 9 and the seat track position detecting sensor 10, which each may comprise a variable resistor, are connected to constant-current circuits, respectively. A constant-current is supplied from the constant-current circuit to the reclining angle detecting sensor 9, and the reclining angle detecting sensor 9 converts a change in the resistance value on the tilt of the back portion 3 to a specific voltage. This output voltage is input to an analog/digital converter 28 as angle data, i.e., representative of the angle between the back portion 3 and the seat portion 2. Similarly, a constant current is supplied from the constant-current circuit to the seat track position detecting sensor 10 and the seat track position detecting sensor 10 converts a change in the resistance value based on the track position of the seat portion 2 to a specific voltage. This output voltage is input to an analog/digital converter 29 as seat track data. Thus, the outputs of the reclining angle detecting sensor 9 and the seat track position detecting sensor 10 are input to the analog/digital converters 28 and 29, respectively. Each digital data value from the ADCs 28,29 is input to the neural network circuit 25. Although the digitized data of the weight sensors 6 or 7 is input to the neural network circuit 25, the output of the amplifier 26 is also input to a comparison circuit. The comparison circuit, which is incorporated in the gate circuit algorithm, determines whether or not the weight of an object on the passenger seat 1 is more than a predetermined weight, such as 60 lbs., for example. When the weight is more than 60 lbs., the comparison circuit outputs a logic 1 to the gate circuit to be described later. When the weight of the object is less than 60 lbs., a logic 0 is output to the gate circuit.

The neural network circuit 25 recognizes the seated-state of a passenger A by training as described in several books on Neural Networks referenced in the above referenced patents and patent applications. Then, after training the seated-state of the passenger A and developing the neural network weights, the system is tested. The training procedure and the test procedure of the neural network circuit 25 well hereafter be described with a flowchart shown in FIG. 25.

Figure 25:
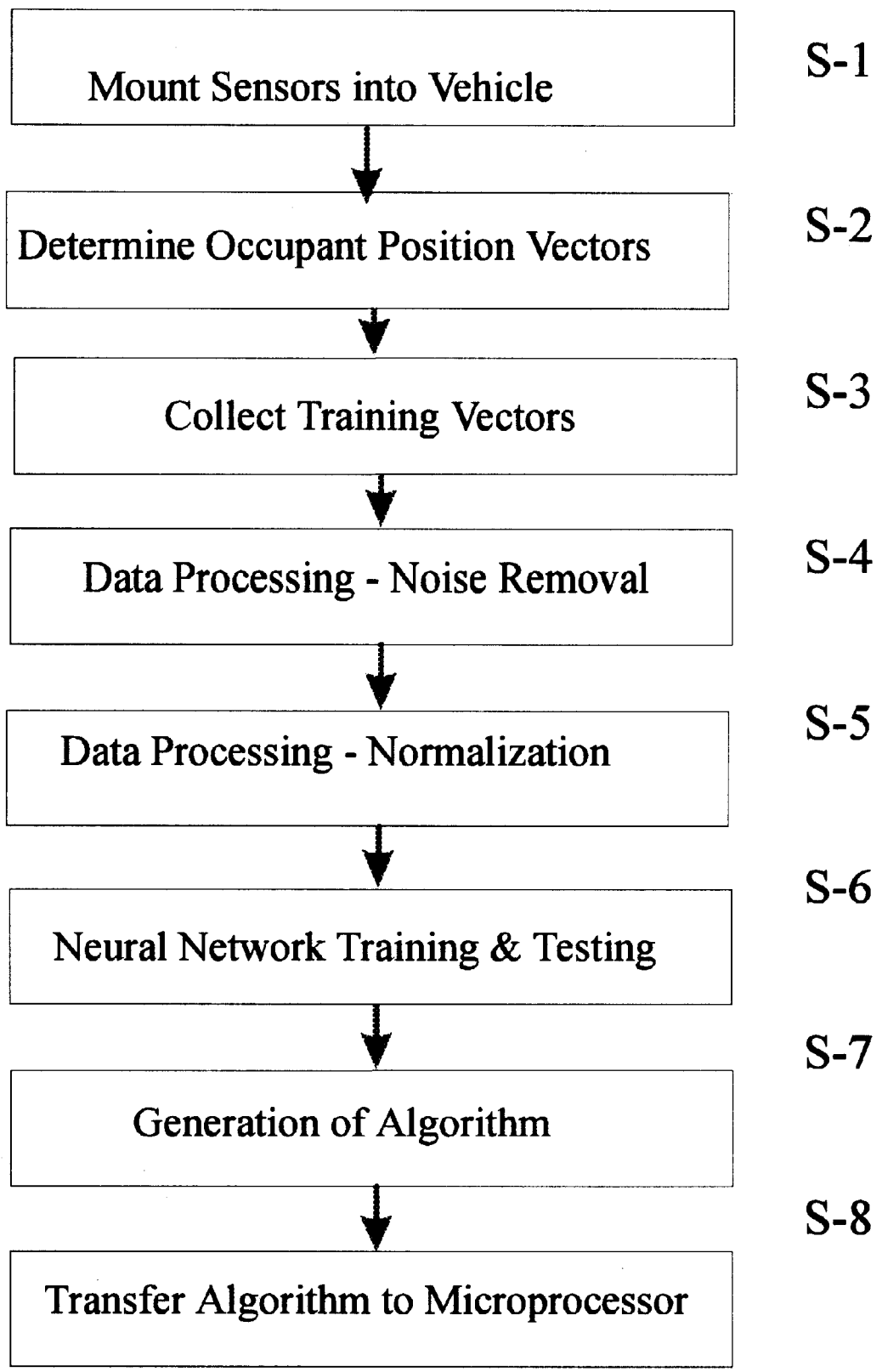
FIG. 25 is a flowchart showing the training steps of a neural network circuit.

As diagrammed in FIG. 25, the first step is to mount the four sets of ultrasonic sensors 11–14, the weight sensors 6 or 7, the reclining angle detecting sensor 9, and the seat track position detecting sensor into a vehicle (step S 1). Next, in order to provide data for the neural network circuit 25 to learn the patterns of seated states, data is recorded for patterns of all possible seated states and a list is maintained recording the seated states for which data was acquired. The data from the sensors/transducers 9–14, for a particular occupancy of the passenger seat is called a vector (step S 2).

For the vectors of data, adults and children each with different postures, states of windows etc. within the passenger compartment, and child seats were selected. The selected adults include people with a variety of different physiques such as fat, lean, small, large, tall, short, and glasses wearing persons. The selected children ranged from an infant to a large child (for example, about 14 year old). In addition, the selected postures include, for example, a sitting state with legs crossed on a seat, a sitting state with legs on an instrument panel, a sitting state while reading a newspaper, a book, or a map, a sitting state while holding a cup of coffee, a cellular telephone or a dictation machine, and a slouching state. Furthermore, the selected compartment states include variations in the seat track position, the window opening amount, headrest position, and varying positions of a sun-visor. Moreover, a multitude of different models of child seats are used in the forward facing position and, where appropriate, in a rear facing position. The range of weights and the corresponding normalized values are as follows:

| Class | Weight Range | Normalized Value |
| --- | --- | --- |
| Empty seat | 0 to 2.2 lbs | 0 to 0.01 |
| Rear Facing Child Seat | 2.2 to 60 lbs | 0.01 to 0.27 |
| Forward facing Child Seat | 2.2 to 60 lbs | 0.01 to 0.27 |
| Forward Facing Adult (FFH) | 60 lbs and greater | .27 to 1 |

Obviously, other weight ranges may also be used in accordance with the invention and each weight range may be tailored to specific conditions, such as different vehicles.

Various vehicle setups were prepared by a combination of these variations and, for in this embodiment, almost 500,000 or more vectors should be prepared for the patterns to be used as data for the neural network training.

Next, based on the training data from the reflected waves obtained by the recievers CHA–ChD of the ultrasonic sensors 11–14 and from the other sensors, the vector data is collected (step S 3). Next, the reflected waves P1–P4 are modified by removing the initial reflected waves with a short reflection time from an object (period T1 in FIG. 24) and the last portion of the reflected waves with a long reflection time from an object (period T2 in FIG. 24) (step S 4). It is believed that the reflected waves with a short reflection time from an object is a due to either cross-talk or transducer ringing depending on whether separate send and receive transducers or a single send and receive transducer is used. In the dual transducer case, as discussed in more detail below, waves from the transmitter travel directly to the receivers ChA–ChD without reflecting off of an object through a variety of possible paths. It is also believed that the reflected waves with a long reflection time are reflected waves from an object far away from the passenger seat. If these two reflected wave portions are used as data, they will add noise to the training process. Therefore, these reflected wave portions are eliminated from the data.

Figure 26A:
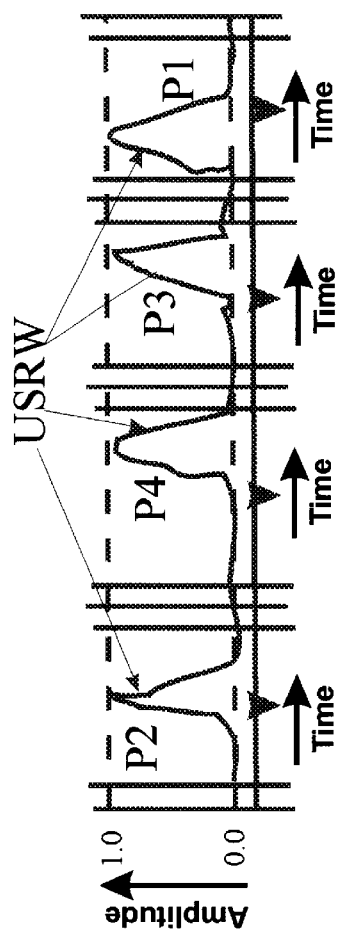
FIG. 26($a$) is an explanatory diagram of a process for normalizing the reflected wave and shows normalized reflected waves.

As shown in FIG. 26(a), measured data is normalized by making the peaks of the reflected wave pulses P1–P4 equal (step S 5). This eliminates the effects of different reflectivities of different objects and people depending on the characteristics of their surfaces such as their clothing Data from the weight sensor, seat track position sensor and seat reclining angle sensor are also normalized based typically on fixed normalization parameters.

Therefore, the normalized data from the ChA–ChD of the ultrasonic sensors 11–14, the seat track position detecting sensor 10, the reclining angle detecting sensor 9, and from the weight sensors 6 or 7 are input to the neural network circuit 25, and the neural network circuit 25 is then trained on this data. More specifically, the neural network circuit 25 adds up the normalized data from the ChA–ChD of the ultrasonic sensors 11–14, from the seat track position detecting sensor 10, from the reclining angle detecting sensor 9, and from the weight sensors 6 and 7, with each data point multiplied by a associated weight according to the conventional neural network process to determine correlation function (step S 6).

In this embodiment, 141 data points are appropriately interconnected at 25 connecting points of layer 1, and each data point is mutually correlated through the neural network training and weight determination process. The 141 data points consist of 138 measured data points from the ultrasonic transducers, the data (139th) from the seat track position detecting sensor 10, the data (140th) from the reclining angle detecting sensor 9, and the data (141st) from the weight sensor(s) 6. Each of the connecting points of the layer 1 has an appropriate threshold value, and if the sum of measured data exceeds the threshold value, each of the connecting points will output a signal to the connecting points of layer 2.

The connecting points of the layer 2 comprises 20 points, and the 25 connecting points of the layer 1 are appropriately interconnected as the connecting points of the layer 2. Similarly, each data is mutually correlated through the training process and weight determination as described above and in the above referenced neural network texts. Each of the 20 connecting points of the layer 2 has an appropriate threshold value, and if the sum of measured data exceeds the threshold value, each of the connecting points will output a signal to the connecting points of layer 3.

The connecting points of the layer 3 comprises 3 points, and the connecting points of the layer 2 are interconnected at the connecting points of the layer 3 so that each data is mutually correlated as described above. If the sum of the outputs of the connecting points of layer 2 exceeds a threshold value, the connecting points of the latter 3 will output Logic values (100), (010), and (001) respectively.

The threshold value of each connecting point is determined by multiplying weight coefficients and summing up the results in sequence, and the aforementioned training process is to determine a weight coefficient Wj so that the threshold value (ai) is a previously determined output.

$$ai = \Sigma Wj \cdot Xj (j=1 \text{ to } N)$$

wherein

Wj is the weight coefficient,

Xj is the data and

N is the number of samples.

Based on this result of the training, the neural network circuit 25 generates the weights for the coefficients of the correlation function or the algorithm (step S 7).

At the time the neural network circuit 25 has learned a suitable number of patterns of the training data, the result of the training is tested by the independent test data. In the case where the rate of correct answers of the seated-state detecting unit based on this test data is unsatisfactory, the neural network circuit is further trained and the test is repeated. In this embodiment, the test was performed based on about 200,000 independent test patterns. When the rate of correct test result answers was at about 98%, the training was ended.

The NeuralWare neural network software operates as follows. The training data is used to determine the weights which multiply the values at the various nodes at the lower level when they are combined at nodes at a higher level. Once a sufficient number of iterations has been accomplished, the independent data is used to check the network. If the accuracy of the network using the independent data is lower than the last time that it was checked using the independent data then the previous weights are substituted for the new weights and training of the network continues on a different path. Thus, although the independent data is not used to train the network, it does strongly affect the weights. It is therefore not really independent. Also, both the training data and the independent data are created so that all occupancy states are roughly equally represented. As a result, a third set of data is used which is structured to more closely represent the real world of vehicle occupancy. This third data set, the "real world" data, is then used to arrive at a figure as to the real accuracy of the system.

The neural network circuit 25 has outputs 25a, 25b and 25c. Each of the outputs 25a, 25b and 25c outputs a signal of logic 0 or 1 to a gate circuit or algorithm 30. Based on the signals from the outputs 25a, 25b and 25c, any one of these combination (100), (010) and (001) is obtained. In another preferred embodiment, all data for the empty seat was removed from the training set and the empty seat case was determined based on the output of the weight sensor alone. This simplifies the neural network and improves its accuracy.

In this embodiment, the output (001) correspond to an empty seat (ES), the output (010) corresponds to a rear facing child seat (RFCS) or an out-of-position passenger (OOP), and the output (100) corresponds to a normally seated forward facing human (FFH) or a forward facing child seat (FFCS).

The gate circuit (seated-state evaluation circuit) 30 can be implemented by an electronic circuit or by a computer algorithm by those skilled in the art and the details will not be presented here. The function of the gate circuit 30 is to remove the ambiguity that sometimes results when ultrasonic sensors and seat position sensors alone are used. This ambiguity is that it is sometimes difficult to differentiate between a rear facing child seat (RFCS) and an out-of-position passenger (OOP), or between a forward facing human (FFH) or a forward facing child seat (FFCS). By the addition of one or more weight sensors in the function of acting as a switch when the weight is above or below 60 lbs, it has been found that this ambiguity can be eliminated. The gate circuit therefore takes into account the output of the neural network and also the weight from the weight sensor (s) as being above or below 60 lbs and thereby separates the two cases just described and results in five discrete outputs.

The use of weight data must be heavily filtered since during driving conditions, especially on rough roads or during an accident, the weight sensors will give highly varying output. The weight sensors, therefore, are of little value during the period of time leading up to and including a crash and their influence must be minimized during this time period. One way of doing this is to average the data over a long period of time such as from 5 seconds to a minute or more.

Thus, the gate circuit 30 fulfills a role of outputting five kinds of seated-state evaluation signals, based on a combination of three kinds of evaluation signals from the neural network 25 and superimposed information from the weight sensor(s). The five seated-state evaluation signals are input to an airbag deployment determining circuit that is part of the airbag system and will not be described here. Naturally, as disclosed in the above reference patents and patent applications, the output of this system can also be used to activate a variety of lights or alarms to indicate to the operator of the vehicle the seated state of the passenger. Naturally, the system that has been here described for the passenger side is also applicable for the most part for the driver side.

In this embodiment, although the neural network circuit 25 has been employed as an evaluation circuit, the mapping data of the coefficients of a correlation function may also be implemented or transferred to a microcomputer to constitute the valuation circuit (see Step S 8 in FIG. 25).

According to the seated-state detecting unit of the present invention, the identification of an empty seat (ES), a rear facing child seat(RFCS), a forward facing child seat (FFCS), a forward facing human (FFH), an out-of-position adult passenger (OOP), can be reliably performed.

Figure 27:
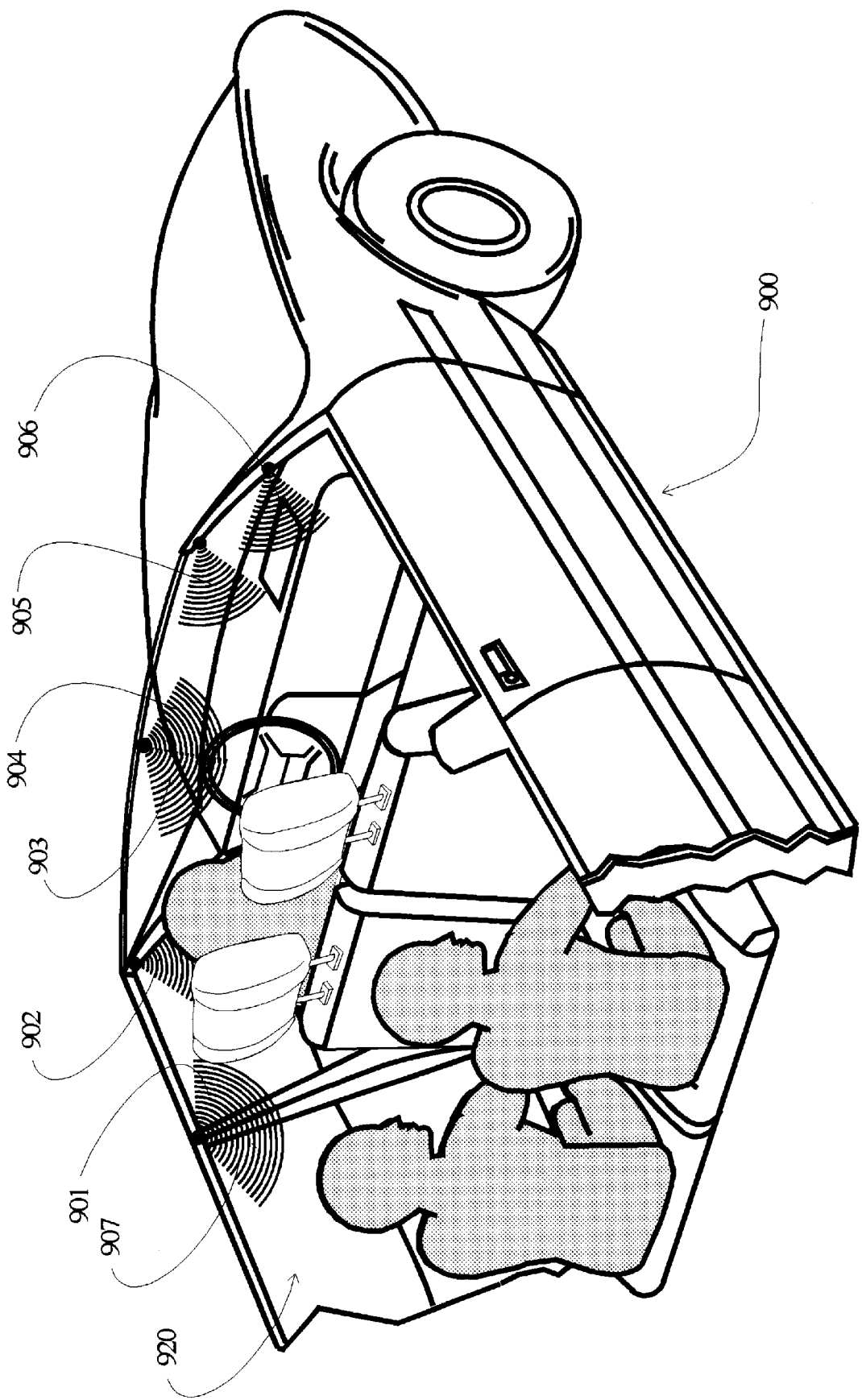
FIG. 27 is a perspective view of the interior of the passenger compartment of an automobile, with parts cut away and removed, showing a variety of transducers.

A section of the passenger compartment of an automobile is shown generally as 900 in FIG. 27 which is a perspective view of the interior of the passenger compartment showing a variety of transmitters and receivers, 901–907, which illustrate general transducer mounting locations. Seven transmitter and receiver assemblies 901 through 907, also referred to herein as transducers, are positioned in the passenger compartment 920. This figure illustrates some of the preferred locations for such transducers. Since the ceiling and headliner have been removed from this figure, it was not possible to show other preferred mounting locations in the headliner.

The discussion above has centered on determining whether the two target volumes, that adjacent the airbag and that adjacent the upper portion of the vehicle seat, are occupied. Other systems have been described in the above referenced patents using a sensor mounted on or adjacent the airbag module and a sensor mounted high in the vehicle to monitor the space near the vehicle seat. Such systems use the sensors as independent devices and do not use the combination of the two sensors to locate where the object is located. In fact, the location of such sensors is usually poorly chosen so that it is easy blind either or both with a newspaper, for example. Furthermore, no system has heretofore been disclosed, except in patent applications assigned to the assignee of this invention, which uses two or more transducers in such a manner that one or more can be blocked without causing serious deterioration of the system. Again, the examples here have been for the purpose of suppressing the deployment of the airbag when it is necessary to prevent injury. The sensor system disclosed can be used for many other purposes such as disclosed above. The ability to use the sensors for these other applications is generally lacking in the systems disclosed in the other referenced patents not assigned to the same company as the instant invention.

More detail on the operation of the transducers and control circuitry as well as the neural network is provided in the above referenced patent applications and is included herein as if the entire text of those patents were reproduced here. One particular example of a successful neural network had 78 input nodes, 6 hidden nodes and one output node. The weights of the network were determined by supervised training as described in the referenced patent applications and in more detail in the references cited therein.

In most of the applications described above, a single ultrasonic frequency was used to illuminate various occupying items of the passenger compartment. This was for illustrative purposes only and this invention is not limited to single frequency illumination. In many applications, it is useful to use several discrete frequencies or a band of frequencies. In this manner considerably greater information is received from the reflected illumination permitting greater discrimination between different classes of objects. In general each object will have somewhat different reflectivities at each frequency, although in many cases the effect may be small.

Improvements to Ultrasonic VIMS Systems

The illustrations presented so far have been similar to those presented in the above referenced patent applications. Some of the key differences will now be discussed.

Thermal Gradients

Thermal gradients can affect the propagation of sound within a vehicle interior in at least two general ways. These have been termed "long-term" and "short-term" thermal instability. When ultrasound waves travel through a region of varying air density, the direction the waves travel can be bent in much the same way that light waves are bent when going through the waves of a swimming pool resulting in varying reflection patterns off of the bottom.

Long-term instability is caused when a stable thermal gradient occurs in the vehicle as happens, for example, when the sun beats down on the vehicle's roof and the windows are closed. This effect can be reproduced in vehicles in laboratory tests using a heat lamp within the vehicle. The effect has been largely eliminated through training the neural network with data taken when the gradient is present. Additionally, changes in the electronics hardware including greater signal strength and a log amplifier, as discussed below, has eliminated the effect.

Short-term instability results when there is a flow of hot or cold air within the vehicle, such as caused by operating the heater when the vehicle is cold, or the air conditioner when the vehicle is hot. Bench tests have demonstrated that a combination of greater signal strength and a logarithmic amplification of the return signal can substantially reduce the variability of the reflected ultrasound signal from a target caused by short term instability. As with the long-term instability, it is important to train the neural network with this effect present. When the combination of these hardware changes and training is used, the short-term thermal instability is substantially reduced. If the data from five or more consecutive vectors is averaged the effect becomes insignificant, see pre and post-processing descriptions below. A vector is the combined digitized data from the four transducers, which is imputed into the neural network as described above. Different techniques for compensating for thermal gradients are listed below.

1. Logarithmic Compression Amplifier

Figure 28:
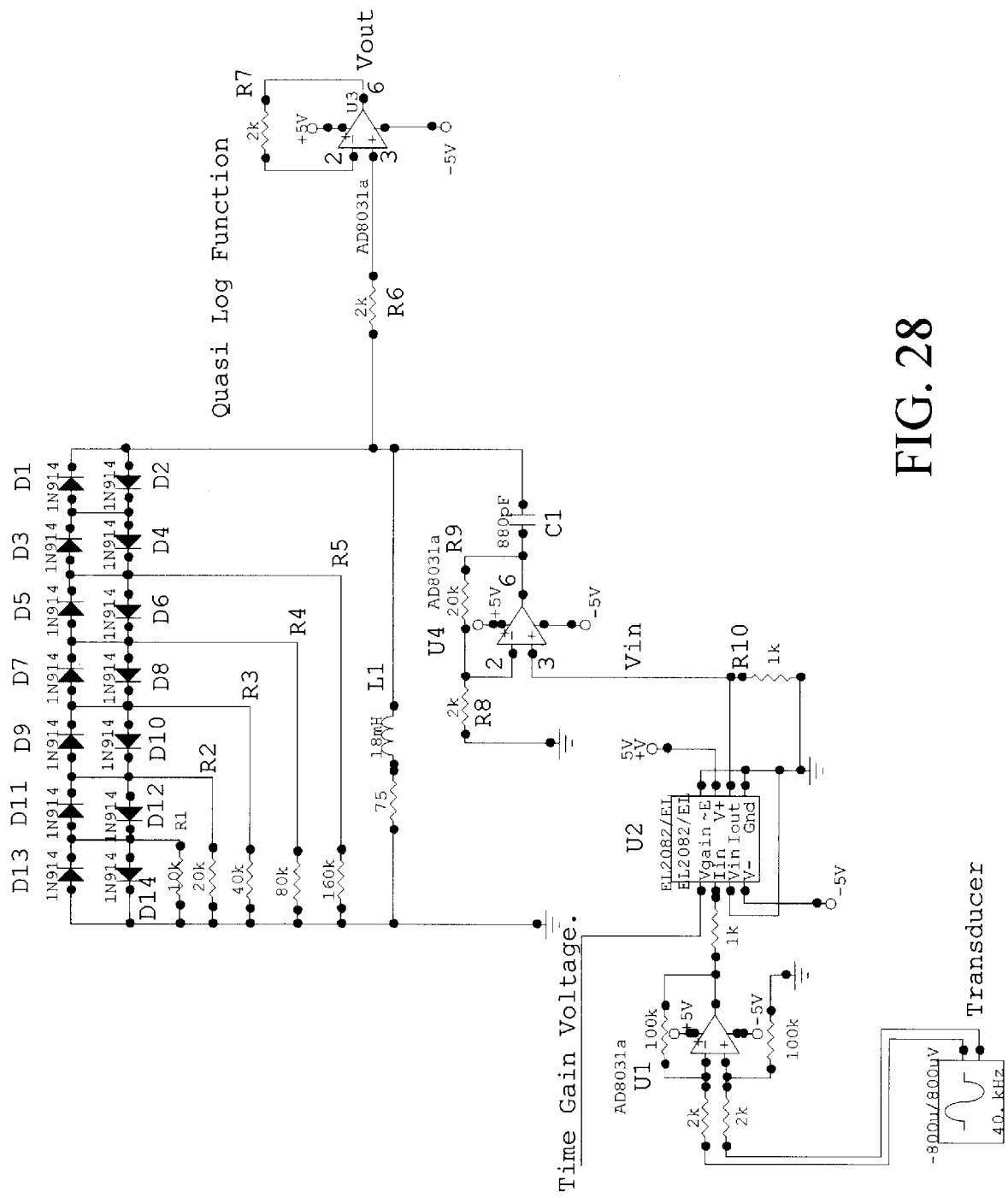
FIG. 28 illustrates a circuit that performs a quasi-logarithmic compression amplification of the return signal.

One method that has proven to be successful in reducing the effects of both short and long term thermal instability is to use a log compression amplifier circuit. A log compression amplifier is a general term used here to indicate an amplifier that amplifies the small return signals more than the large signals. This is coupled with changes to the circuit to increase the signal strength level of the return signal. The increase in signal strength can be accomplished by an increase in the transducer drive voltage, which results in a higher sound pressure level, or by generally increasing the gain of the amplifier of the return signal. In both cases if the log compression amplifier were not present, the analog to digital converter (ADC) would saturate on many of the reflected waves. The log compression amplifier prevents this by amplifying the higher return signals less than the lower signals in such a manner as to prevent this saturation. FIG. 28 illustrates a circuit that performs a quasi-logarithmic compression amplification of the return signal.

The operation of the quasi-logarithmic compression amplifier circuit shown on FIG. 28 is as follows:

(1) The echo detected by the ultrasonic transducer is amplified by stage U1.

(2) The function of stage U2 is to vary the gain of the amplifier with time to compensate for the signal attenuation with distance (time) of the echo reflected from various surfaces.

(3) The actual compression circuit is accomplished by U4, capacitor C1 and inductor L1 with the associated resistor diode network consisting of diodes D1 through D14 and resistors R1 through R5.

(4) C1 and L1 are tuned to the operating frequency of the transducer, typically between 40 and 80 kHz.

(5) For small signals, the diodes do not conduct and therefore the gain is at the maximum since there is no loading of the tuned circuit. Thus, the amplification is high.

(6) When the signal is high enough for diodes D1, D3 and D2, D4 to conduct resistor R5 shunts the tuned circuit lowering the Q and reducing the gain. Q is a measure of resonance capability of a transducer whereby a low Q is indicative of a weak resonance and a high Q is indicative of high resonance. D1, D3 and D2, D4 are connected back to back so that the negative half cycle has the same gain as the positive half cycle.

(7) When the signal increases more, diode D5 and D6 will conduct shunting the tuned circuit with R4 as well as R5, which further reduces the gain of the stage.

(8) When the signal increases more, diode D7 and D8 will conduct shunting the tuned circuit with R3 as well as R4 and R5, which further reduces the gain of the stage.

(9) When the signal increases more, diode D11 and D12 will conduct shunting the tuned circuit with R1 as well as R2 and R3 and R4 and R5 which further reduces the gain of the stage.

(10) When the signal increases more, all of the diodes will conduct and the resistance of the diodes will shunt the resistors lowering the gain.

(11) The diodes are connected back to back so that the positive and negative half cycles will be compressed equally.

(12) The circuit can be temperature stabilized by maintaining the diodes at a constant temperature using apparatus known to those skilled in the art.

(13) The amount of compression can be changed by changing resistor values.

(14) The range of the circuit may be changed by changing the number of diodes and resistors in the network.

(15) The output of the network is buffered by a high impedance circuit with a buffer stage U3.

(16) U3 may be made into a demodulator by adding a diode and a resistor in the buffer stage. The component designated AD8031A in FIG. 28 is a wide bandwidth rail to rail in and out operational amplifier. This operational amplifier and data sheets therefor may be obtained from Analog Devices, Incorporated.

Naturally, other circuits and other mathematical functions can be used as long as they amplify the lower level signals more than the higher level signals. In particular, a similar effect can be achieved by clipping the higher level signals, that is, by eliminating all return signal amplitudes above a certain value. When ultrasonic sensors are used in a pure ranging mode when thermal instabilities are present, it will be found that the location of a reflected signal is substantially invariable, providing the object is not moving, whereas the magnitude of the reflection may vary by factors of 10 or 100. It may sometimes be difficult to distinguish an actual return from the desired object from noise. Such noise may also be invariant in that it may be the result of reflections off of surfaces that are at substantial angles off of the axis of the transducer. These reflections are normally ignored since they are generally small in comparison with the main reflection. When thermal instabilities are present, however, these reflections can become significant relative to the main reflected pulse. One method of compensating for this effect is to average the returned amplitudes over a number of cycles. During dynamic out of position cases, however, there is not sufficient time to perform this averaging and each cycle must be evaluated independently of the other cycles. Using the selective amplification techniques described above, the apparent variation in the signal is substantially reduced and therefore the effects of the thermal instabilities are substantially eliminated. Again, there are many methods of accomplishing the desired result as long as the magnitude of the large reflected signals and reduced relative to the small reflected signals.

2. Training Method with Heat

Since neural networks are preferably used herein as a pattern recognition system to differentiate occupancy conditions within the vehicle, it is quite straightforward to take data with and without the long-term and short-term thermal effects discussed above. The fact that the neural network can find and use the information within the data is not obvious since, especially in the short-term case, the reflected signals from the vehicle interior can vary significantly with time. Nevertheless, the neural network has proven that sufficient information is generally present to make an identification decision. Although neural networks are the preferred method of solving this problem, it is possible to use other pattern recognition systems, such as the sensor fusion system described in U.S. Pat. No. 5,482,314 to Corrado et al, using data taken with and without the thermal instabilities, resulting in a more accurate system than would be otherwise achievable.

3. Single Transducer Send and Receive

When standard piezoelectric ceramic ultrasonic transducers, such as manufactured by MuRata, are used, and excited with a driving pulse of a few cycles, the transducer rings (continues to vibrate and emit ultrasound like a bell) for a considerable period after the driving pulse has stopped. In one common case, eight cycles were used to drive the transducer at 40 kHz and, even though the driving pulse was over at about 0.2 milliseconds, the transducer was still ringing at 1.3 milliseconds. Thus, if a single transducer is to be used for both sending and receiving the ultrasonic waves, it is unable to sense the reflected waves from a target that is closer than about eight to twelve inches. In many situations within the vehicle, important targets are closer than eight inches and thus transducers must be used in pairs, one for sending and the other for receiving. This is less of a problem when piezo-film or electrostatic transducers are used, but such transducers have other significant problems related to temperature sensitivity, the generated signal strength and physical size.

Another point worth noting is that when a piezo-ceramic transducer is used with a horn, as described elsewhere in this specification, the location of the transducer in the horn is critically important. As the transducer is moved further into and out of the base of the horn, the field pattern of ultrasonic radiation changes. At the proper location, the main pattern generally has the widest field angle and the radiation pattern is characterized by the absence of side lobes of ultrasonic radiation. That is, all of the energy is confined to the main field. Side lobes can cause several undesirable effects. In particular, when the transducers are used in pairs, one for sending and the other for receiving, the lobes contribute to cross-talk between the two transducers reducing the ability to measure objects close to the transducer. Also, side lobes frequently send ultrasonic energy into places in the passenger compartment where undesirable reflections result. In one case, for example, reflections from the driver were recorded. In another case reflections from adjacent fixed surfaces such, as the instrument panel (IP) or headliner surface, were received with the effect that when new IP and headliner parts were used, the reflection patterns changed and the system accuracy was significantly degraded. When reflections, either directly or indirectly, occur from such surfaces, the ability to transfer the system from one vehicle to another identical vehicle is compromised.

A. Damped Transducer

Figure 29:
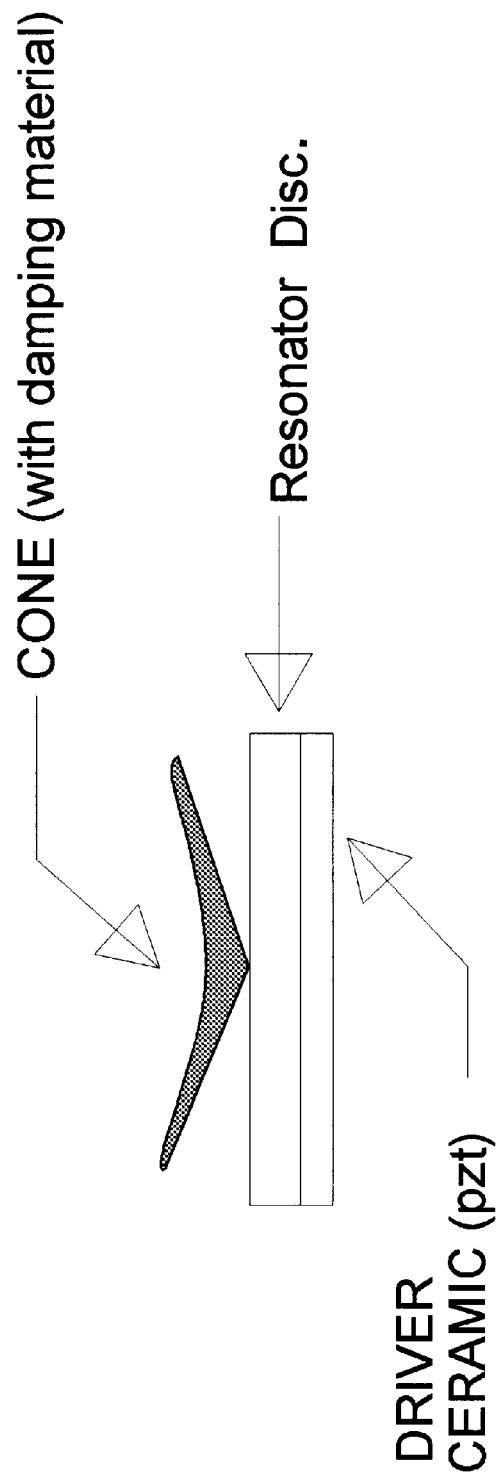
FIG. 29 illustrates a damped transducer where the damping material is placed in the transducer cone.

The ringing problem described above is related to the Q (a measure of the resonance capability of the tranducer) of the device, which is typically in the range of 10 to 20 for piezo-ceramic transducers. Attempts to add damping to the transducer have proven to be difficult to manufacture. A primary transducer supplier, for example, declines to supply transducers with greater damping or lower Q. In addition, many attempts to add damping have been reported in the patent literature with limited success. Experiments have determined, however, that if the damping material is placed in the transducer cone as shown in FIG. 29, in a manner as described herein, the damping can be accurately controlled. The greater the amount of the damping material, which is typically a silicone rubber compound, the greater the damping, with the hardness or durometer of the rubber playing a lesser but significant role.

If the cone is entirely filled with a preferred compound, too much damping may result for some applications depending on the material. However, if the rubber is diluted with a solvent in the proper proportions, the cone can be filled with the diluted mixture and the proper residue will result after the solvent evaporates. In this manner, not only can the proper amount of damping material be administered, but also the resulting uniform coating is desirable. One preferred compound is silicone RTV diluted with Xylene. By this method, a surpassingly consistently damped transducer is achieved. Naturally other damping compounds can be used and different methods of achieving an accurate amount of damping material within the cone can be developed. Additionally, damping material can be placed on other parts of the transducer to achieve similar results. Another approach is to incorporate another plate parallel to, but on the opposite side of, the piezoelectric material from the resonating disk in the transducer assembly, such as one made from tungsten, which serves to reduce the transducer Q. However, the placement within the cone has had the best results and therefore is preferred.

Figure 30:
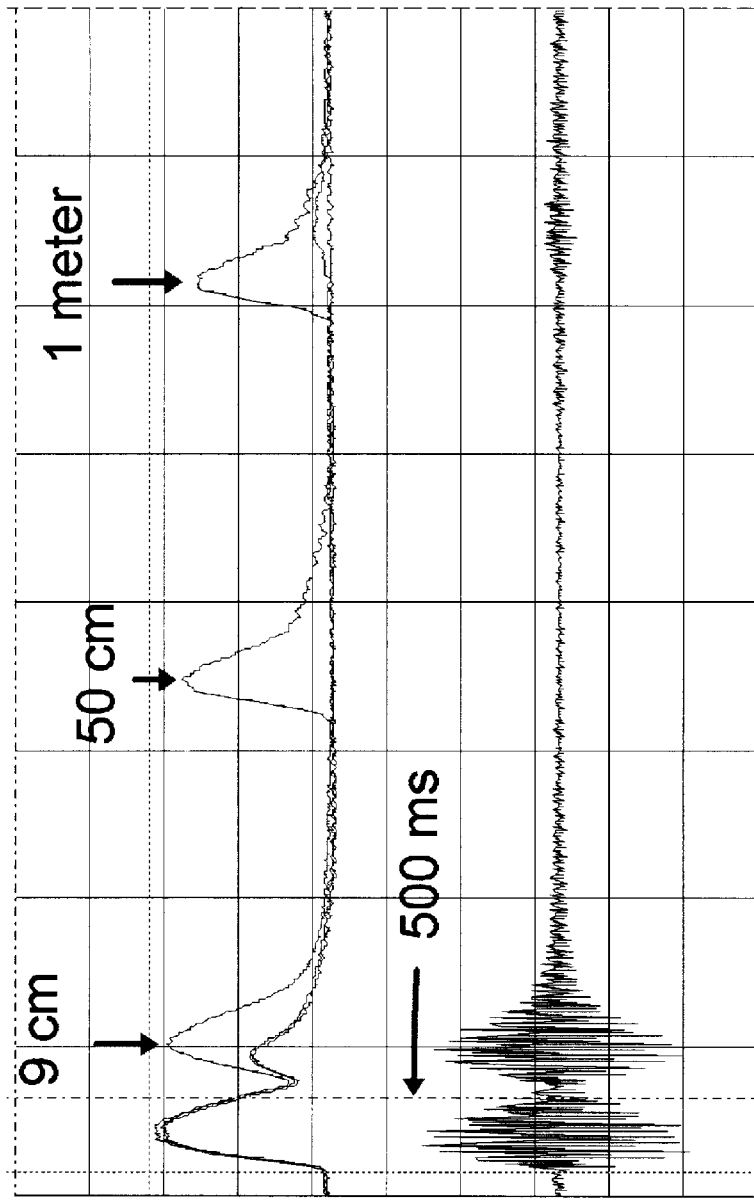
FIG. 30 illustrates the superimposed reflections from a target placed at three distances from the transducer, 9 cm, 50 cm and 1 meter respectively for a transducer with a damped cone as shown in FIG. 29.
Figure 31:
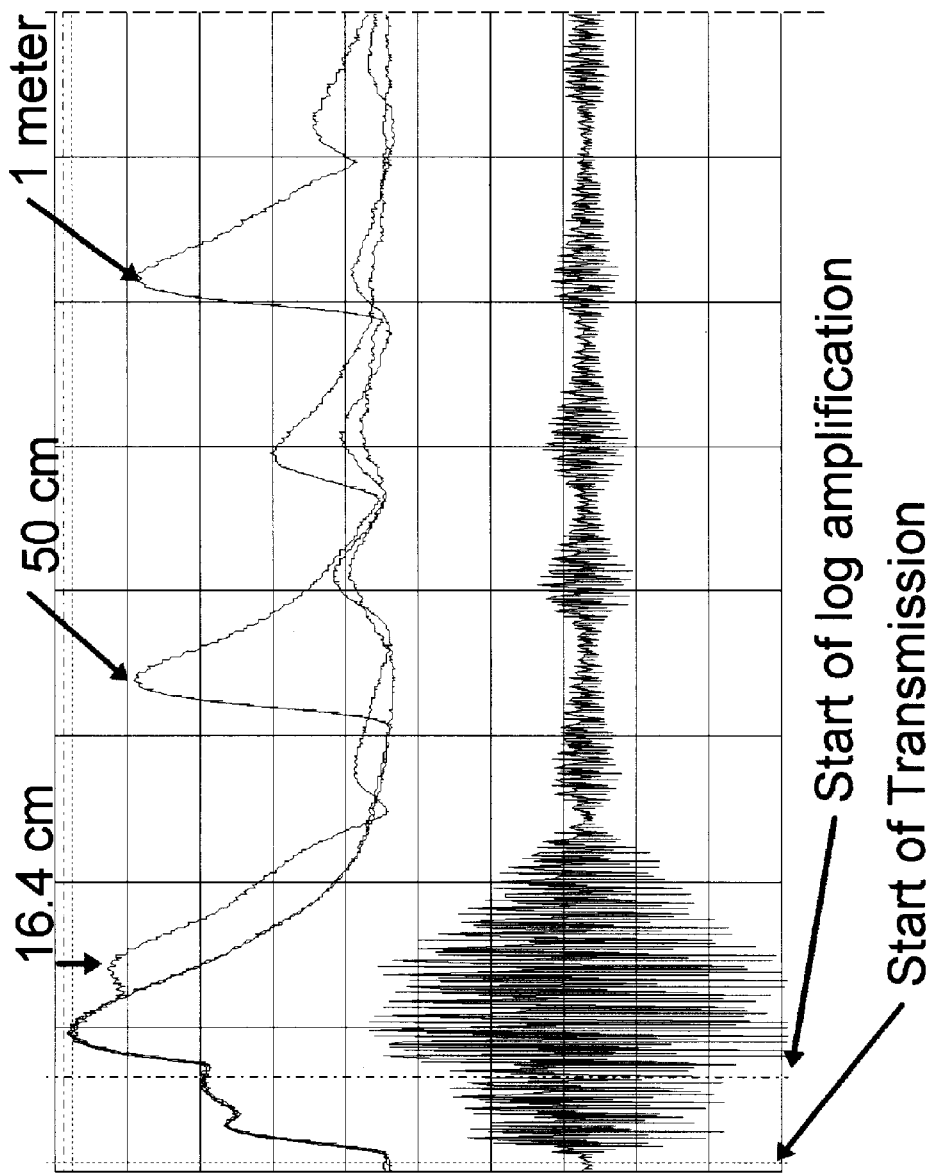
FIG. 31 illustrates the superimposed reflections from a target placed at 16.4 cm, 50 cm and 1 meter respectively for a transducer without a damped cone.

FIG. 30 illustrates the superimposed reflections from a target placed at three distances from the transducer, 9 cm, 50 cm and 1 meter respectively for a single send and receive transducer with a damped cone as described above. FIG. 31 illustrates the superimposed reflections from a target placed at 16.4 cm, 50 cm and 1 meter respectively for a transducer without a damped cone. The upper curves represent the envelopes of the returned signals. In each case the returned signals from the closest target are shown in the lower curves.

Several distinct differences are evident. The closest that could be achieved without the ringing pulse overwhelming the reflected target pulse was 9 cm for the damped case and 18.4 cm for the undamped case. The undamped case also exhibited several unwanted signals that do not represent reflections from the target and could confuse the neural network. No such unwanted reflections were evident in the damped case. The 9 cm target reflection is clearly evident in the damped case while the 16.4 reflection interfered with the ringing signal in the undamped case. In both cases, the logarithmic amplifier was turned on after 600 microseconds as described below B. Transducer in a Tube Another method of achieving a single transducer send and receive assembly is to place the transducer into a tube with the length of the tube determined by the distance required for the ringing to subside and the closest required sensing distance. That is, the length of tube is equal to the distance required for the ringing to subside less the closest required sensing distance. In this situation, since the combined length of the tube and closest required sensing distance is equal to the distance required for the ringing to subside, the ringing will subside at the start of the operative sensing distance. For example, if the minimum target sensing distance is 4 inches and 8 inches is required for the ringing to subside, then the tube can be made 4 inches long. The use of a tube as a conduit for ultrasound is disclosed in DuVall et al. U.S. Pat. No. 5,629,681 entitled "Tubular Ultrasonic Displacement Sensor".

A variety of examples of a transducer in a tube design are illustrated in FIGS. 32A–32F. A straight tube 52 with an exponential horn 52A is illustrated in FIG. 32A. FIGS. 32B and 32C illustrate the bending of the tube 52 through 40 degrees and 90 degrees, respectively. FIG. 32D illustrates the incorporation of a single loop 52B and FIG. 32E of multiple loops 52C, which can be used to achieve a significant tube length in a confined space. It has been found that there is about a 3-dB drop in signal intensity that occurs when transmitting through an 8-inch tube having the same diameter as the transducer and no significant effect has been observed from coiling the tube. A surprising result, however, is that very little additional attenuation occurs even if the tube diameter is substantially decreased providing care is taken in the lead in of the ultrasound into the tube. Thus, it is possible to use a tube which has perhaps a diameter of half that of the transducer will little additional signal loss. This fact substantially facilitates the implementation of this concept since space in the A and B pillars and the headliner is limited.

A smaller tube 52D is illustrated in FIG. 32F where the tube is now shown to have a straight shape however it can be easily bent to adjust to the space available. FIG. 32D and FIG. 32E illustrates a transducer assembly similar to FIG. 32A but wherein the tube is now coiled and can be molded as two parts and later joined together permitting the assembly to occupy a small space. Thus, now the single transducer send and receive assembly not only permits measurements of objects very close to the mounting surface, the headliner for example, but the assembly need not occupy significantly more space than the original two transducer design. Naturally, there is a substantial cost saving since only a single transducer is required and only a single pair of wires also is needed. A mounting device is required in any case and the design of FIG. 32E is no more expensive that the earlier mounting hardware design which needed to accommodate two transducers. Thus, a substantial improvement in performance has been achieved with the additional benefit of a substantial reduction in cost.

Care must be taken in the design of the tube assembly since the reflections of the waves back into the tube at the end of the tube depend on the ratio of the tube diameter to the wavelength. The smaller the tube the greater the reflection. If the tube diameter is greater than one wavelength, less than one percent of the energy will be reflected but this still may be large compared with the reflection off of a distant target. One method of partially solving this problem is through the use of a wave pattern shaping horn as disclosed below and illustrated in FIGS. 32A–32F.

4. Delay in Turning on the Logarithmic Compression Amplifier

Figure 33:
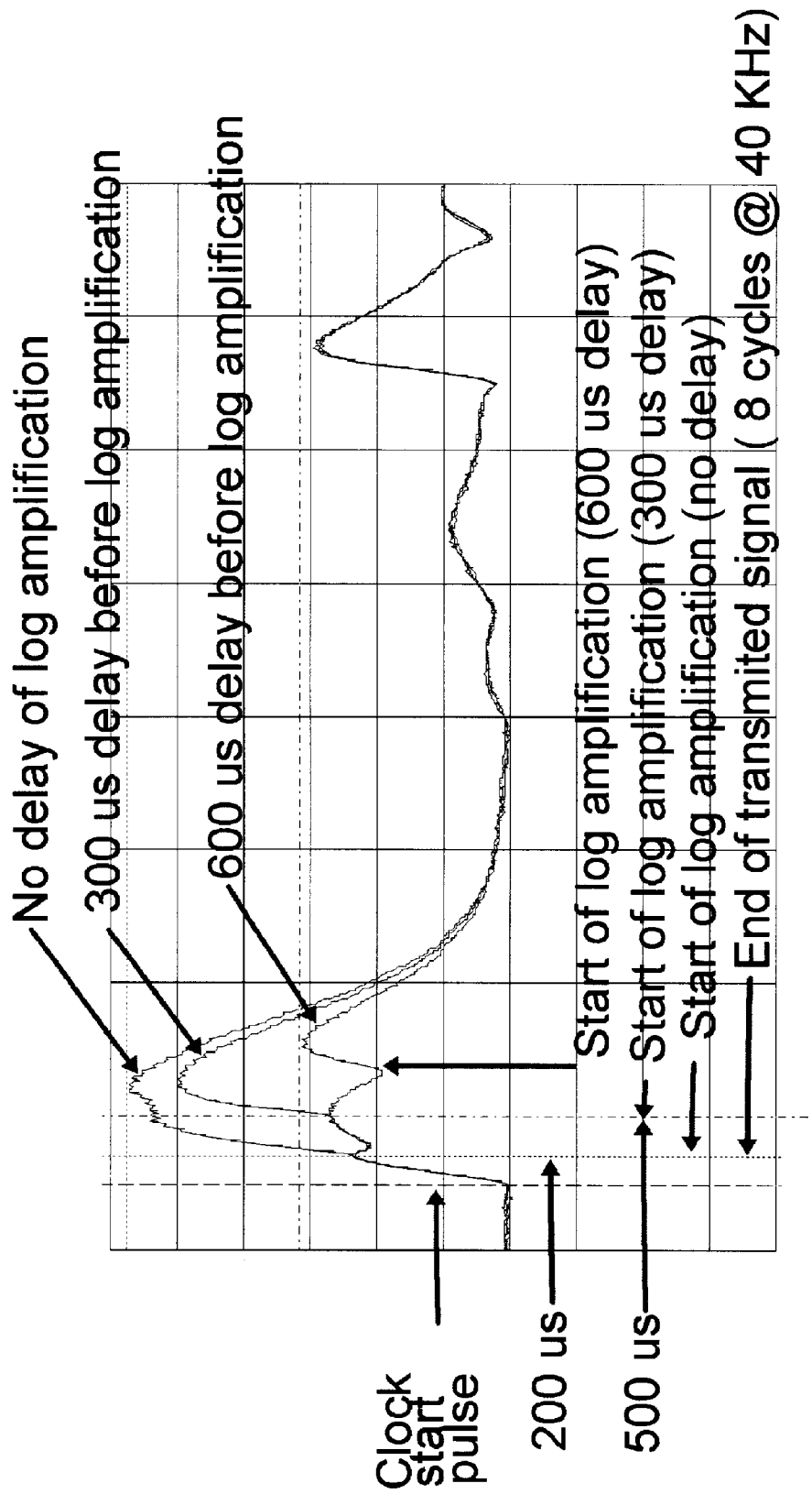
FIG. 33 illustrates the effect of a delay in the start of the amplifier for a fraction of a millisecond on the ability to measure close objects.

If the return signal logarithmic compression amplifier is turned on at the time that the transducer is being driven, in some designs, the combination of the very strong driving pulse and the signal smoothing effect of the amplifier can cause a feed forward effect. This creates an interference with the signal being received making it more difficult to measure reflections from objects close to the transducer. It has been found that if the start of the amplifier is delayed for a fraction of a millisecond the ability to measure close objects is improved. This is illustrated in FIG. 33 where the effects of three different cases is shown for the standard 40 kHz undamped ultrasonic transducer.

5. Electronic Damping

Figure 34A:
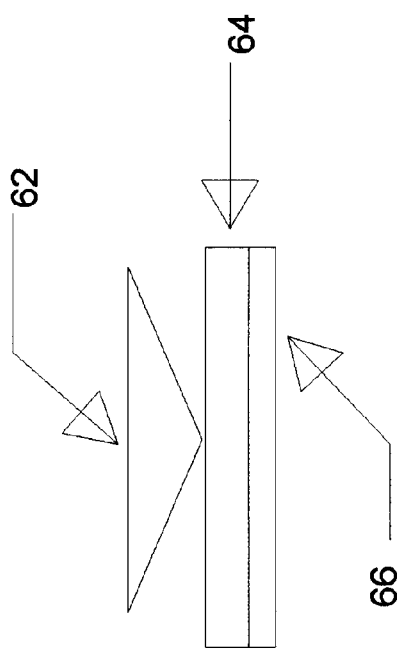
FIGS. 34A–B illustrates the use of a Colpits system for permitting the electronic damping the motion of the transducer cone and thereby eliminating the ringing.
Figure 34B:
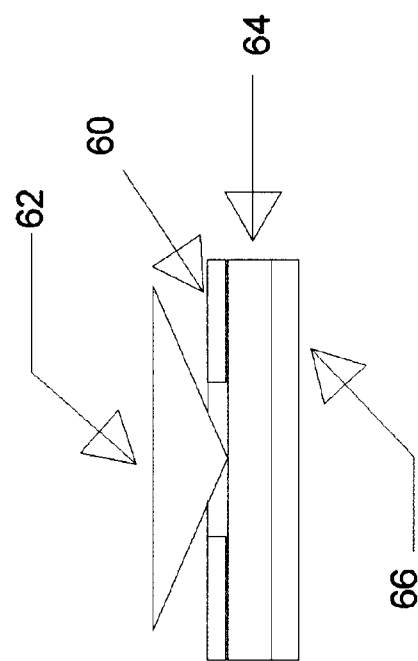

Although the use of a Colpits oscillator is well known in the art of buzzers, such as used in alarms on watches where energy considerations require that the buzzer be driven at its natural frequency, such oscillators have heretofore not been applied to ultrasonic transducers. Particularly, the Colpits oscillator has not been used in a circuit for electronically suppressing the motion of the transducer cone 62 and thereby eliminating the ringing. The principle, as illustrated in FIGS. 34A and 34B, is to use a separate small transducer 60, which could be formed as part of the main transducer 66, for the purpose of measuring the motion of the main transducer. This auxiliary transducer 60 monitors the motion of the resonator 64 and, provides the information to feedback to appropriate electronic circuitry. Transducer 60 may be donut-shaped or bar-shaped or an isolated section of the ceramic of the main tranducer 66. This feedback is used during the driving phase to ascertain that the transducer is being driven at its natural frequency. The separate transducer also permits exact monitoring of the transducer motion after the driving phase permitting an inverted signal to be used to reverse drive the transducer, i.e., mechanically dampen the resonator 64, thereby stopping its motion. This design requires some added complication to the transducer and circuitry but provides the optimum suppression and thus the closest approach to the transducer by a target.

In addition to the Colpits oscillator, another design that may also have application to solving this problem and is known in the art is the Hartley oscillator.

By reducing or eliminating the ringing, all of these damping methods provide better control over the total number of pulses that are sent to the passenger compartment. This results in a sharper image of the contents of the passenger compartment and thus more accurate information.

Figure 35:
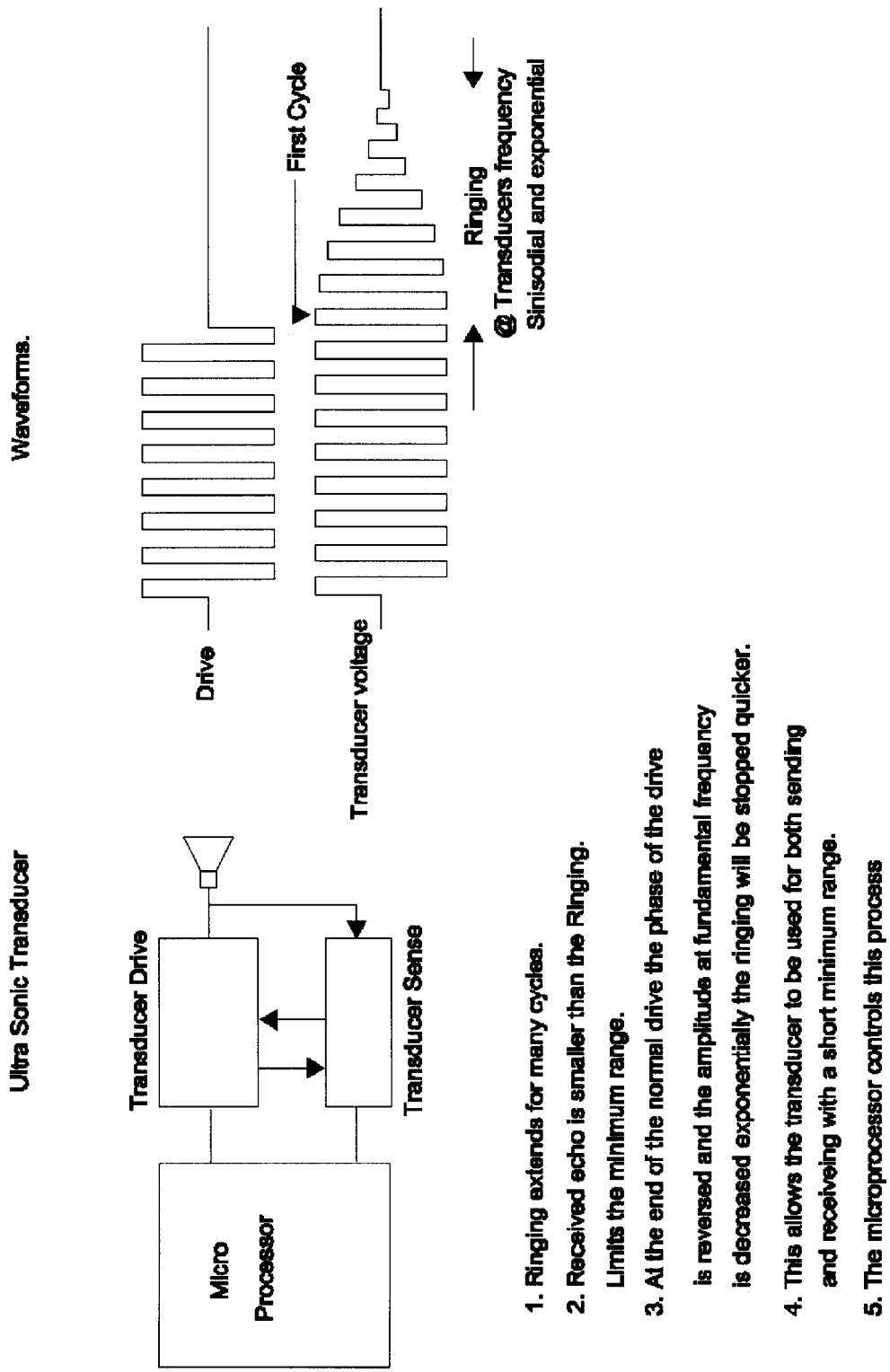
FIG. 35 illustrates an alternative method of electronically reducing the ringing of the ultrasonic transducer.

An alternate method of eliminating the ringing is illustrated in FIG. 35. In this case the natural frequency of each transducer is sensed and the drive circuitry is tuned to drive the transducer exactly at its natural frequency. Once the natural frequency is known, however, then, based on some trial and error development, a sequence of pulses is derived which is fed into the transducer drive circuit with reversed polarity to counteract the motion of the transducer and quickly suppress its oscillations. Thus, by this method the same results as are achieved from the Colpits design with a much simpler implementation that does not require an additional sensing element to be designed into the transducer or the additional wires to the transducer that are needed in the Colpits design. Note that the waveforms in FIG. 35 are shown as square waves whereas they are in fact sine waves. Also note that the ringing has been shown as shorter than the drive pulse whereas in fact it can last four to five times longer depending on the transducer design. With the implementation of the technique disclosed here, the period of the ringing is reduced to about 10% of what is typically present in the standard transducer.

6. Field Shaping

The purpose of an ultrasonic occupant sensing system is to transmit ultrasonic waves into the passenger compartment and from the received reflected waves determine the occupancy state of the vehicle. Thus, waves that do not reflect off of surfaces of interest, such as the driver (when the passenger side is being monitored) and the IP and headliner as discussed above, add noise to the system. In the worst they case can interfere with or mask other important reflected signals. For this reason, significant improvements to the occupant sensing system can be achieved by carefully controlling the shape of the ultrasonic fields emitted by each of the transducers. A.

Horns

Figure 36B:
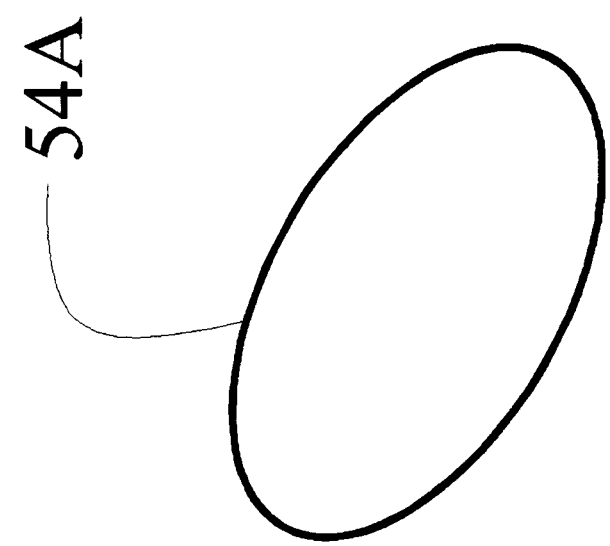
FIG. 36A is an example of a horn shaped to create an elliptical pattern and the resulting pattern is illustrated in FIG. 36B.
Figure 36A:
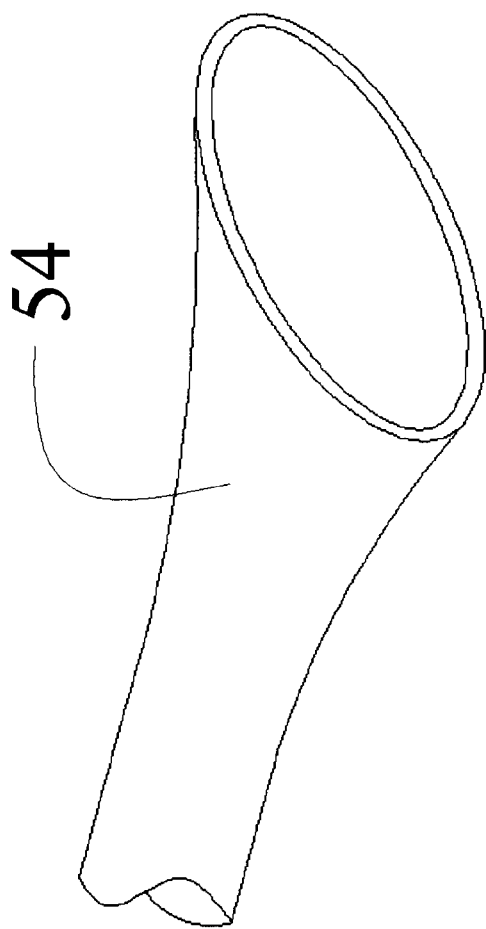

A horn is generally required especially when transferring the ultrasound waves from the tube to the passenger compartment. The angle of radiation from the tube without the horn would be quite large sending radiation into areas where no desired object would occupy. Since the horn can now be arbitrarily shaped, the radiation angle can not only be made narrower but can be arbitrarily elliptically shaped so as to cover the desired volume in the most efficient manner. An example of a horn 54 shaped to create an elliptical pattern is illustrated on FIG. 36A (the opening at the end of the tube being elliptical) whereas the elliptical pattern 54A created by the horn 54 is show FIG. 36B. Heretofore, the output from the transducer had to be baffled or blocked so that it did not receive reflections from the rear seat or the driver, for example. This was wasteful of energy and required additional hardware and thus increased the cost of the installation.

B. Reflective Mode

Figure 38:
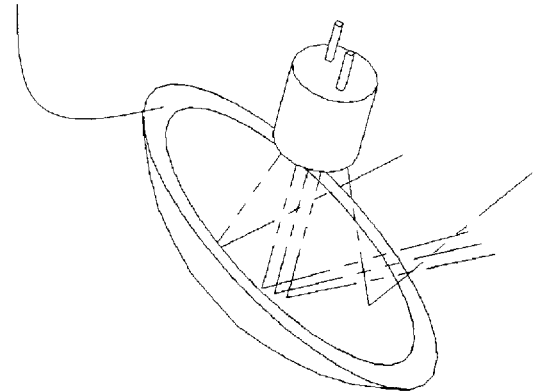
FIG. 38 is similar to FIG. 37 except a concave reflector is used.
Figure 37:
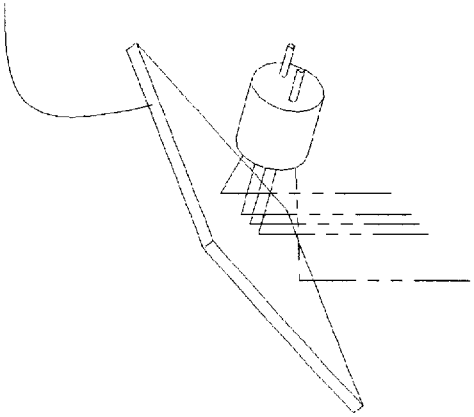
FIG. 37 illustrates an alternate method of achieving a particular desired ultrasonic field shape by using a flat reflector.
Figure 39:
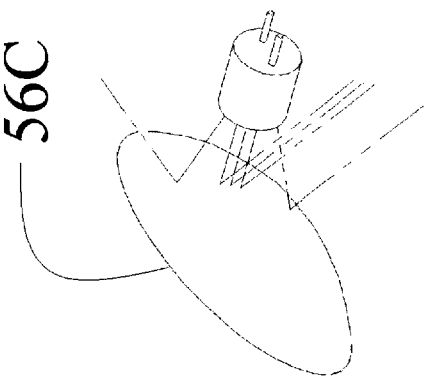
FIG. 39 is similar to FIG. 37 except a convex reflector is used.

An alternate method of achieving the desired field shape is to use a reflector. This has the advantage that more control of the sound waves can be achieved through the careful shaping of the reflector surface as illustrated in FIGS. 37, 38 and 39. FIG. 37 illustrates the reflection off of a flat plane 56A, FIG. 38 illustrates the reflection off of a concave surface 56B and FIG. 39 illustrates the reflection off of a convex surface 56C, respectively. The figures illustrate the extremes of reflections that can be achieved and permit a great deal of freedom in the design of the resulting field patterns. The design problem is significantly more complicated than appears from the figures, however. Since the dimensions of the reflectors are of the same order of magnitude as the wave length of the ultrasound, simple ray tracing, as shown in the figures, will not produce accurate results and an accurate computer model, or extensive trial and error testing, is required.

7. Neural Network Improvements Dual Level ANN

A dual level neural network architecture has proven advantageous in improving categorization accuracy and to prepare for the next level occupant sensing system that includes Dynamic Out-of-Position measurements (DOOP).

Figure 26B:
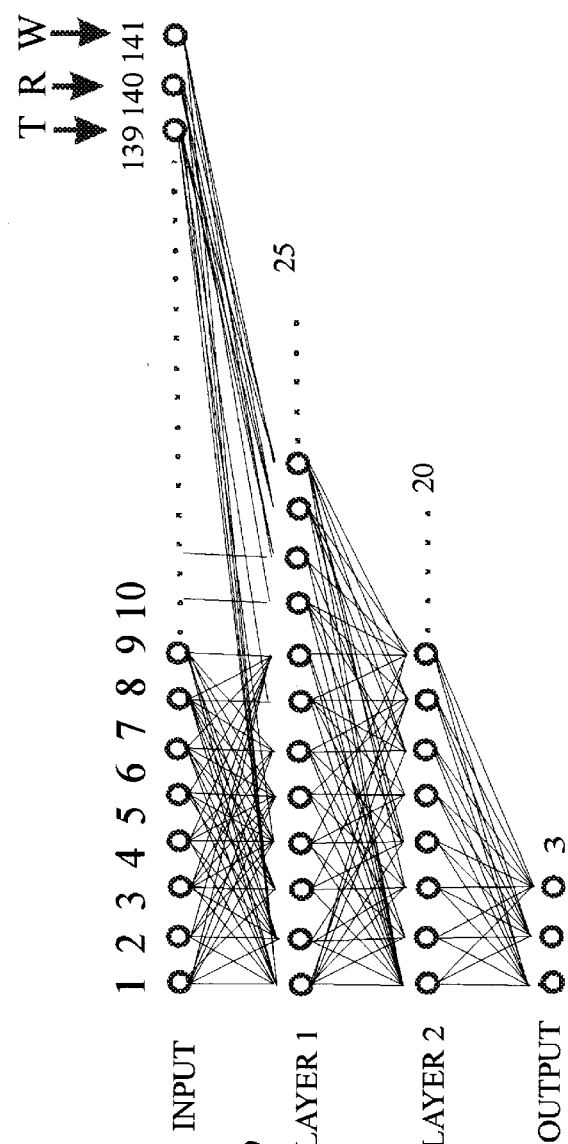
Figure 40:
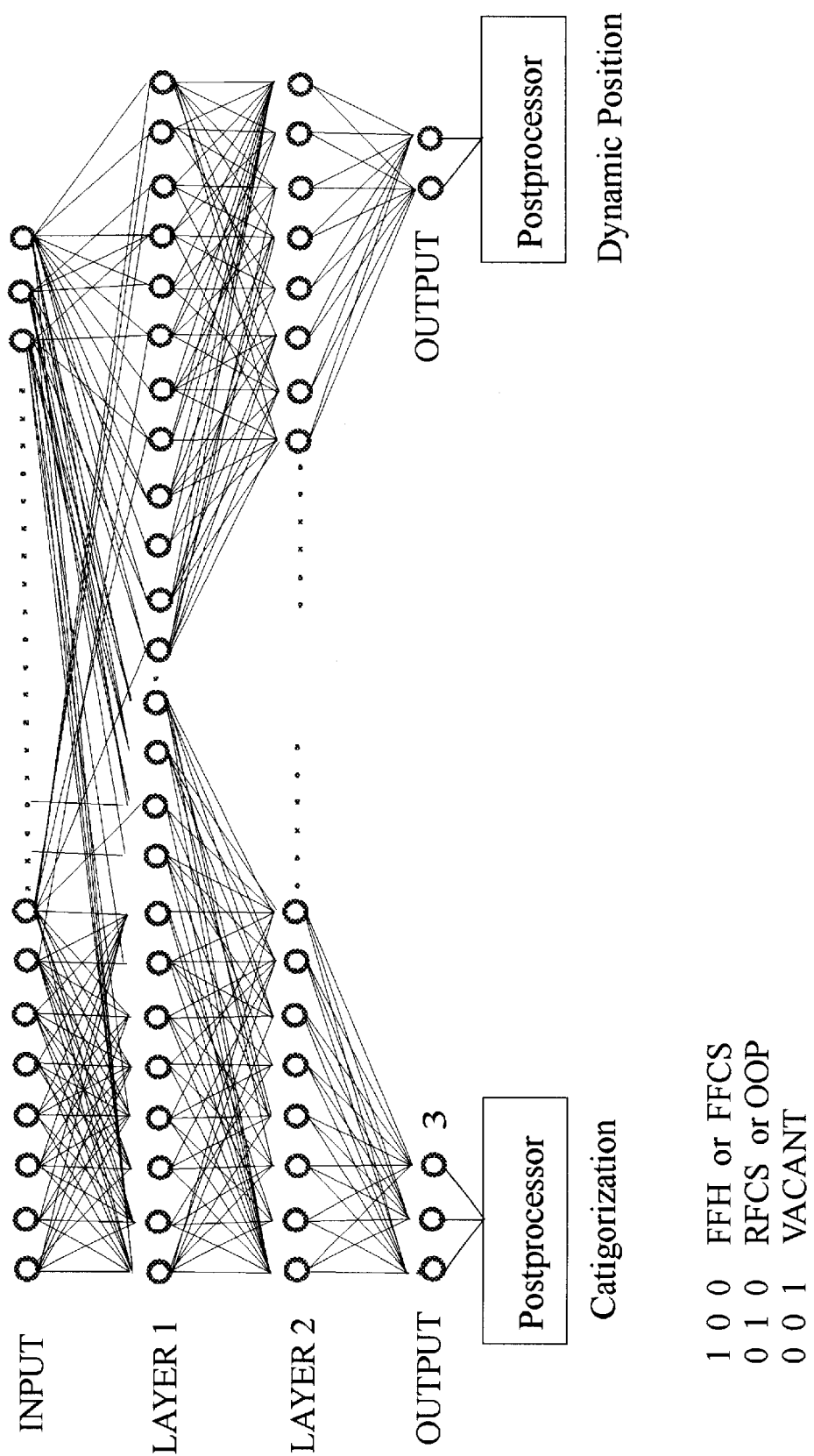
FIG. 40 is diagram of a neural network similar to FIG. 26($b$) only with a dual architecture with the addition of a post processing operation for both the categorization and position measurement networks and separate hidden layer nodes for each of the two networks.

An occupant can move from a position safely displaced from the airbag to a position where he or she can be seriously injured by the deployment of an airbag within a fraction of a second during pre crash braking, for example. On the other hand, it takes a substantially longer time period to change the seat occupancy state from a forward facing person to a rear facing child seat, or even from a forward facing child seat to a rear facing child seat. This fact can be used in the discrimination process through post processing algorithms. One method, which also prepares for DOOP, is to use a two layered neural network or two separate neural networks. The first one categorizes the seat occupancy into, for example, (1) empty seat, (2) rear facing child seat, (3) forward facing child seat and (4) forward facing human (not in a child seat). The second is used for occupant position determination. In the implementation, the same input layer can be used for both neural networks but separate hidden and output layers are used. This is illustrated in FIG. 40 which is similar to FIG. 26B with the addition of a post processing operation for both the categorization and position networks and the separate hidden layer nodes for each network.

If the categorization network determines that either a category (3) or (4) exists, then the second network is run, which determines the location of the occupant. Significant averaging of the vectors is used for the first network and substantial evidence is required before the occupancy class is changed. For example, if data is acquired every 10 milliseconds, the first network might be designed to require 600 out of 1000 changed vectors before a change of state is determined. In this case, at least 6 seconds of confirming data would be required. Such a system would therefore not be fooled by a momentary placement of a newspaper by a forward facing human, for example, that might look like a rear-facing child seat.

If, on the other hand, a forward facing human were chosen, his or her position would be determined every 10 milliseconds. A decision that the occupant had moved out of position would not necessarily be made from one 10 millisecond reading unless that reading was consistent with previous readings. Nevertheless, a series of consistent readings would lead to a decision within 10 milliseconds of when the occupant crossed over into the danger zone proximate to the airbag module. This method of using history is used to eliminate the effects of temperature gradients, for example, or other events that could temporarily distort one or more vectors. The algorithms which perform this analysis are part of the post processor.

8. Dynamic Out-Of-Position (DOOP)

Although it has been proven that crash sensors mounted in the crush zone are better and faster at discriminating airbag required crashes from those where an airbag deployment is not desired, the automobile manufacturers have preferred to use electronic sensors mounted in the passenger compartment, so called single point sensors. Since there is no acceptable theory that guides a sensor designer in determining the proper algorithm for use with single point sensors (see for Breed, D. S., Sanders, W. T. and Castelli, V. "A Critique of Single Point Crash Sensing", Society of Automotive Engineers Paper SAE 920124, 1992), there are many such algorithms in existence with varying characteristics. Some naturally perform better than others. There is a concern among the automobile manufacturers that such sensors might trigger late in some real world crashes for which they have not been tested. In such cases, the automobile manufacturers do not want the airbag to deploy.

If the occupant position sensor designer could rely on the single point sensor doing a reasonable job in triggering on time, or at least as good a job as the electromechanical crush zone mounted sensors, then cases such as high speed barrier crashes need not be considered. Since the characteristics of the electromechanical sensors are well known and can be easily modeled, the occupant position sensor designer can determine when this kind of sensor would trigger in all crashes and as a result high speed barrier crashes, for example, need not be considered. Single point sensor algorithms, on the other hand, are generally proprietary to the supplier. Therefore no assumptions can be made about their ability to respond in time to various crashes. Consequently, the occupant sensor designer must assume the worst case in that the sensor will trigger at the worst possible time in all crashes. It has been shown that if the sensor responds nearly as well as the electromechanical crush zone mounted sensor, that determining the position of the occupant every 50 milliseconds is adequate (see for example Society of Automotive Engineers paper 940527, "Vehicle Occupant Position Sensing" by Breed et al, which is included herein by reference). With the requirement that all worst cases be considered, the time required for measuring the position of an occupant who is not wearing a seatbelt in a high speed short duration crash is closer to 10–20 milliseconds.

Sound travels in air at about 331 meters/second (~1086 feet/second). If an object is as much as three feet from the transducer, the ultrasound will require about 6 milliseconds to travel to the object and back. If the processor requires an additional three milliseconds to process the data (assuming that the neural network is solved each time new data from any transducer is available), it requires a total of about 10 milliseconds for a single transducer to interrogate the desired volume. If four transducers are used, as in the present design, at least 40 milliseconds are therefore required. As discussed above, this is too long and thus an alternative arrangement is required. One solution is to operate the system in two modes. Mode one would use four transducers to identify what is in the subject volume and where it is, relative to the airbag, before the crash begins and mode two would use only one, or at most two, transducers to monitor the motion of the object during the crash. The problem with this solution is that occasionally the chosen transducer could be blocked by a newspaper, for example, or a hat. If two transducers were used this problem would theoretically be solved but there is a problem as to which transducer to believe if they are providing different answers. This latter problem is sufficiently complicated as to require a neural network type solution. But in that case, the neural network really needs the output from all four of the transducers to make an accurate decision due to the vast number of different configurations that can occur in the passenger compartment. To make a highly reliable decision, therefore, all of the transducers need to be used which means that they all have to work at the same time. This can be accomplished if each one uses a different frequency. One could operate at 45 kHz, a second at 55 kHz, the third at 65 kHz and the forth at 75 kHz, for example. The 10 kHz (or even 5 kHz) spacing is sufficient to permit each one to transmit and receive without hearing the transmissions from any other transducer. Thus, the apparatus used in the instant invention contemplates, for most applications, the use of multiple frequencies in contrast to all other systems which have thus far been disclosed.

For the majority of the cases, the position of the occupant at the start of a crash is all that is necessary to determine if he or she is out of position for airbag deployment determination. This is because the motion of the occupant is usually very small during the time that the crash sensors determine that the airbag should be deployed. The Appendix provides a mathematical analysis demonstrating this conclusion. There are some rare cases, however, where it would be desirable to track the occupant in as close to real time as possible. Such cases include: (1) panic braking where the occupant begins at a significant distance from the danger zone; (2) a multiple accident scenario where the first accident is not sufficient to deploy the airbag but does impart a significant relative velocity to the occupant; and (3) an unusually high deceleration prior to a crash such as might occur due to sliding along a guard rail or going through mud or water. Some automobile manufacturers add a fourth category, which is the case of a mal-functioning or poorly functioning crash sensor where the motion of the occupant even in a barrier crash can be significant. For these cases, dynamic out of position (DOOP) needs to be considered and careful attention paid to the development of the post processor algorithms.

A. DOOP—Multiple Frequencies

In a standard ultrasonic system as described above, typically four transducers interrogate the occupant, one after the other. The first transducer transmits a few cycles of typically 40 kHz ultrasound and waits for all of the echoes to return and then the second transducer transmits, etc. Since it takes as much as 7 to 10 milliseconds for the waves to be transmitted, received and for the reverberations to subside, it takes approximately 40 milliseconds for four to do so. If four different frequencies are used, on the other hand, all four transmitters can transmit and receive simultaneously reducing the total time to 10 milliseconds. The time required to calculate the neural network is small compared with 10 milliseconds and can take place while the transducers are transmitting. If the driver is also included, as many as eight frequencies would be used.

B. Differential Mode—Velocity

In addition to the inputs from the transducers, it has been found that the difference between the current vector and the previous vector also contains valuable information as to the motion of the occupant. It represents a kind of velocity vector and is useful in predicting where the occupant will be in the next time period. In addition to a vector representing the latest difference, a series of such difference or velocity vectors has also proven useful for the dynamic out-of-position calculation. Additionally, the difference vector provides a check on the accuracy of the vector since the motion of an occupant must be within a certain narrow band within a 10-millisecond period. This fact can be used to correct errors within a vector.

9. Other Applications—Misc.

A. Location of the Seatback and Seat

The positions of the seatback and the seat are valuable information in determining the location of the occupant for seats without position sensors. One cost-effective method of obtaining this information is to use one or more ultrasonic transducers to locate the seat or seatback relative to a particular point in the vehicle. In many cases, only the seatback location is required as it gives an indication of the location of the occupant's chest for various combinations of seat and seatback position. This measure is particularly useful in helping to differentiate a forward facing human from an empty seat.

3. Ultrasonic Weight Sensor

An ultrasonic transducer also can be used as a weight sensor by measuring the deflection of the seat bottom relative to some seat supporting structure.

C. Thermometer Temperature Compensation

In previous applications, the speed of sound has been determined by measuring the time it takes the sound to travel from one transducer to another. This is successful only if the second transducer can hear the particular frequency being sent by the first transducer. It can be fooled if an object partially obstructs the path from the one transducer to the other creating a second path for the sound to travel. The speed of sound is primarily a function of the temperature of the air. From about −40° C. to 85° C., the speed of sound changes by about 24%. The speed of sound is also affected by humidity, however, this effect is considerably smaller. It is not affected by barometric pressure except to the extent that the temperature is affected. In going from 0% to 100% relative humidity at about 40° C., the speed of sound changes by less than about 1.5%. Thus, it is clear that the temperature is the dominant consideration in this system. The percentage 1.5% represents about 3 centimeters for a target at about 1 meter which is below the accuracy of the ultrasonic system. For these reasons, temperature compensation is all that is required and that can be handled in some cases by placing a temperature sensor on the electronic circuit board and measuring the temperature directly, thereby avoiding the multipath effect.

One problem with measuring the temperature on the printed circuit board, however, is that that temperature may not be representative of the air temperature within the vehicle passenger compartment. An alternate and preferred method is to use a characteristic of each of the transducers which changes with temperature as a measurement of the temperature at the transducer. Since the transducers are generally not in a box with other electronic circuitry, they should have a temperature which is an approximation of the surrounding air temperature. Of the three properties which have been identified as varying with temperature and which are easily measured, capacitance, inductance and resonant frequency, the resonant frequency is the easiest to determine and is thus the preferred method as described above although the measure of the capacitance is also practical.

Although the above discussion has centered on the front passenger seat, it is obvious that the same or similar apparatus can be used for the driver seat as well as the rear seats. Although attention has been focused of frontal protection airbags, again the apparatus can be applied to solving similar problems in side and rear impacts and to control the deployment of other occupant restraints in addition to airbags. Thus, to reiterate some of the more novel features of the invention, this application discloses: (1) the use of a tubular mounting structure for the transducers; (2) the use of electronic suppression of transducer ringing; (3) the use of mechanical damping of the transducer cone, all three of which permits the use of a single transducer for both sending and receiving; (4) the use of a shaped horn to control the pattern of ultrasound; (5) the use of the resonant frequency monitoring principle to permit speed of sound compensation; (6) the use of multiple frequencies with sufficient spacing to isolate the signals from each other; (7) the ability to achieve a complete neural network update using four transducers every 10 to 20 milliseconds; (8) the ability to package the transducer and tube into a small package due to the ability to use a small diameter tube for transmission with minimal signal loss; (9) the use of a logarithmic compression amplifier to minimize the effects of thermal gradients in the vehicle; and, (10) the significant cost reduction and performance improvement which results from the applications of the above principles.

Although several preferred embodiments are illustrated and described above, there are possible combinations using other geometries, sensors, materials and different dimensions for the components that perform the same functions. This invention is not limited to the above embodiments and should be determined by the following claims.

Appendix

Dynamic Out-Of-Position Analysis

Concern has been expressed as to whether the Ultrasonic Automatic Occupant Sensor (UAOS) is sufficiently fast to detect Dynamic Out-of-Position (DOOP). This is based on the belief that the UAOS updates only every 100 milliseconds and that to measure DOOP an update every 10 milliseconds is required. This study therefore will demonstrate two points:

The UAOS can achieve an update rate of once every 10 milliseconds.

A slower update rate of 50 milliseconds or 20 milliseconds is in fact sufficient.

One critical point is that the UAOS system, because of the use of pattern recognition, knows the location of the important parts of the occupant and therefore will probably not be fooled by motions of the extremities. Simpler systems could misinterpret the motion of the arms of a belted occupant for the occupant's chest.

The first issue is to determine what update timing is required for DOOP and when. If the occupant is initially positioned far back from the airbag, for example, there is little doubt that even a 50 millisecond update time is sufficient.

In order to get a preliminary understanding of the problem, consider the simple case to a constant deceleration pulse varying from 1 to 16 G's for a period of 0.1 seconds. 1 G represents something greater than what occurs in braking and 16 G's represents an approximation to a 35 MPH barrier crash. The argument is made that a square wave approximates braking pulses and that vehicles are designed to attempt to achieve a square wave barrier crash pulse. It is also believed that the square wave approximation to a crash pulse is more severe for the purposes here than some other shape. Later in this preliminary report a Haversine crash pulse will be considered. A Haversine crash pulse is a sine wave upwardly displace so that the lowest point is on the x-axis.

The problem then can be stated that: given that there is some clearance from the airbag at the time that an airbag inflation is initiated such that if an occupant is closer than that clearance the airbag should not be deployed (the restricted zone), how much additional clearance must be provided to allow a prediction to be made that the occupant will move to within the restricted zone before the sensor triggers. This additional clearance, called the sensing clearance, will of course depend on the sensing time which we will assume here will vary from 10 to 100 milliseconds. The worst case is where the occupant is at rest and then begins moving just after his position has been measured. Since it is assumed that a measurement has been made before the occupant motion begins, the calcution of the sensing clearance amounts to determining the motion of the occupant, represented here as an unrestrained mass, that can take place during the sensing period. The worst case initial position of the occupant is where the occupant is initally very close to the restricted zone since if he or she starts out at a greater distance there is more time to take position measurements and then project the position of the occupant at a later time.

For the assumptions above, which are believed to be worst case, the sensing clearance can be calculated as shown in the table:

| ACCELERATION | SENSING TIME | | | | |
|---|---|---|---|---|---|
| G's | 0.01 | 0.02 | 0.03 | 0.05 | 0.1 |
| | SENSING CLEARANCE (inches) | | | | |
| 1 | 0.02 | 0.08 | 0.17 | 0.48 | 1.93 |
| 2 | 0.04 | 0.15 | 0.35 | 0.97 | 3.86 |
| 4 | 0.08 | 0.31 | 0.70 | 1.93 | 7.73 |
| 8 | 0.15 | 0.62 | 1.39 | na | na |
| 16 | 0.31 | 1.24 | na | na | na |
| | VELOCITY (mph) | | | | |
| 1 | 0.22 | 0.44 | 0.66 | 1.10 | 2.20 |
| 2 | 0.44 | 0.88 | 1.32 | 2.20 | 4.39 |
| 4 | 0.88 | 1.76 | 2.63 | 4.39 | 8.78 |
| 8 | 1.76 | 3.51 | 5.27 | 8.78 | 17.56 |
| 16 | 3.51 | 7.03 | 10.54 | 17.56 | 35.13 |

"na" in the table signifies that the crash sensor would have triggered before a second measurement reading can be taken. For the 16 G 0.03 second case, for example the sensor would have triggered before 0.02 seconds. From the table it can be seen that for this worst case scenario for 20 millisecond sampling the sensing clearance is about an 1 inch, for 30 milliseconds it is about 1.5 inches and even for 50 milliseconds it is less than 2 inches.

In the table below, 0.7 G braking was assumed followed by a Haversine shaped crash pulse. The program was run for a variety of crash impact speeds, braking durations and initial occupant positions. Out of many thousands of cases which were run, only those cases are shown where the computer predicted that the occupant was further than 8 inches, the restricted clearance, and where the actual position at sensor triggering was within the restricted clearance, that is less than 8 inches. The sensor triggering time was based on the 5 inch less 30 millisecond criteria. It is noteworthy that only a simple linear extrapolation of the last two measurements was used to predict the occupant position. A more realistic extrapolation formula would of course give better results.

Crash impact speeds were varied from 8 to 34 mph with 2 mph steps. For each impact speed crash duration was varied from 30 ms to 180 ms with 30 ms steps and for each crash duration pre-crash braking times varied from 100 to 2200 ms with 300 ms steps. Finally, for each pre-crash braking time initial occupant clearance varied from 30 inches to 4 inches by 4 inches steps. From that full set, these are the cases where the occupant clearance at sensor fire was less than or equal to 8 inches and the predicted clearance was over 8 inches.

| | |
|---|---|
| Driver motion when airbag opened, inches | 5.0000 |
| Airbag deployment time, ms | 30.0000 |
| Time between position and velocity measurements, ms | 20.0000 |
| Pre-crash braking deceleration, g | 0.7000 |
| Minimum occupant clearance at sensor fire, inches | 8.0000 |

| | |
|---|---|
| Vcr | is the crash impact speed, mph |
| T | is the crash duration, ms |
| tb | is the pre-crash braking time, ms |
| Dpab0 | is the initial occupant clearance, inches |
| Vc0 | is the vehicle pre-braking speed, mph |
| ts | is the required sensor fire time, ms |
| Dpaba | is the actual occupant clearance at ts |
| Dbarpabts | is the predicted occupant clearance at ts |
| Dpabm | is the last measured occupant clearance, inches |
| Dpabm2 | is the previous measured occupant clearance, inches |

| Vcr | T | tb | Dpab0 | Vc0 | ts | Dpaba | Dbarpabts | Dpabm | Dpabm2 |
|---|---|---|---|---|---|---|---|---|---|
| 8.0 | 90.0 | 100.0 | 12.0 | 9.54 | 150.49 | 7.9 | 8.82 | 9.59 | 10.36 |
| 8.0 | 120.0 | 100.0 | 12.0 | 9.54 | 165.17 | 7.2 | 8.01 | 8.96 | 9.92 |
| 10.0 | 120.0 | 100.0 | 12.0 | 11.54 | 157.44 | 7.7 | 8.53 | 9.35 | 10.16 |
| 12.0 | 150.0 | 100.0 | 12.0 | 13.54 | 164.91 | 7.5 | 8.19 | 9.06 | 9.94 |
| 14.0 | 150.0 | 100.0 | 12.0 | 15.54 | 160.24 | 7.7 | 8.47 | 9.27 | 10.08 |
| 16.0 | 150.0 | 100.0 | 12.0 | 17.54 | 156.47 | 8.0 | 8.68 | 9.44 | 10.19 |
| 16.0 | 180.0 | 100.0 | 12.0 | 17.54 | 168.03 | 7.4 | 8.09 | 8.97 | 9.84 |
| 18.0 | 180.0 | 100.0 | 12.0 | 19.54 | 164.57 | 7.6 | 8.28 | 9.12 | 9.95 |
| 20.0 | 180.0 | 100.0 | 12.0 | 21.54 | 161.62 | 7.8 | 8.45 | 9.25 | 10.04 |
| 22.0 | 180.0 | 100.0 | 12.0 | 23.54 | 159.05 | 7.9 | 8.59 | 9.35 | 10.12 |

From these results, a sensing clearance of less than 1 inch appears to be adequate.

To further validate the conclusions here, a study should be done using real crash pulses and realistic braking decelerations. From the above analysis, it is unlikely that sensing times faster than 20 milliseconds are required and 50 milliseconds is probably adequate.

In specifying the 8 inch restricted zone, the automobile manufacturers have obviously not taken into account the velocity of the occupant as he or she enters that zone since the amount of displacement into the restricted zone while the airbag is deploying will obviously vary with occupant velocity. A full MADYMO simulation validated by crash and sled tests, of course, will ultimately settle this issue. MADYMO is a computer program which is available TNO Road Vehicles Research Institute, Shoemakerstraat 97, Delft, The Netherlands. It is often used to simulate crash tests (as described, for example, in U.S. Pat. No. 5,695,242).

We claim:

1. In a motor vehicle having an interior passenger compartment for enclosing at least one occupying item having surfaces, a method for controlling a system in the vehicle based on the at least one occupying item comprising the steps of:

arranging a first transducer in a tube having an opening, irradiating at least a portion of the passenger compartment in which the at least one occupying item is situated by controlling the first transducer to emit waves which travel through the tube and out of the opening of the tube into the passenger compartment;

receiving reflected radiation from the surfaces of the at least one occupying item within the passenger compartment at the first transducer after the reflected radiation enters into the tube through the opening;

processing the received radiation in order to create at least one electronic signal containing information of the distance from at least one of the surfaces of the at least one occupying item to the first transducer; and controlling the system in the vehicle based on the at least one signal.

2. The method of claim 1, further comprising the step of:

selectively amplifying the at least one signal whereby the magnitude of at least one larger peak in the at least one signal is reduced relative to the magnitude of at least one smaller peak in the at least one signal, the system in the vehicle being controlled based on the amplified at least one signal.

3. The method of claim 2, wherein the selective amplification is performed by a log compression amplifier circuit.

4. The method of claim 2, wherein the selective amplification is performed by a log compression amplifier, further comprising the step of:

starting the log compression amplifier after the first transducer is driven to emit waves.

5. The method of claim 1, further comprising the step of:

electronically reducing motion of a cone of the first transducer to reduce ringing of the first transducer.

6. The method of claim 5, wherein the step of electronically reducing the motion of the cone of the first transducer comprises the steps of arranging a second transducer for measuring motion of the first transducer and obtaining information from the second transducer to enable electronic circuitry to reduce the motion of the cone of the first transducer.

7. The method of claim 6, further comprising the step of:
directing the first transducer to move opposite to its measured motion after a driving phase with a view toward stopping motion of the first transducer.

8. The method of claim 5, wherein the step of electronically reducing the motion of the cone of the first transducer comprises the steps of:
determining a natural frequency of the first transducer,
tuning drive circuitry of the first transducer to drive the first transducer at the determined natural frequency, and
deriving a sequence of pulses to be fed into the drive circuitry with reversed polarity to counteract the motion of the first transducer and diminish oscillations of the first transducer.

9. The method of claim 1, further comprising the step of:
determining a length of the tube based on the distance required for ringing of the first transducer to subside and a predetermined minimum target sensing distance defined as a distance between the opening of the tube and a position closest to the tube in which the at least one occupying item may be sensed.

10. The method of claim 1, further comprising the step of:
selecting a size of the opening of the tube and a diameter of the tube to avoid excessive signal loss and ensure reception of the reflected waves by the first transducer.

11. The method of claim 1, further comprising the step of:
recessing the tube within a surface defining the passenger compartment.

12. The method of claim 1, further comprising the step of:
selecting a size of a diameter of the tube to avoid excessive signal loss.

13. The method of claim 1, wherein the tube includes a shaped horn adjacent the opening of the tube.

14. The method of claim 13, wherein the opening of the tube is elliptical.

15. In a motor vehicle having an interior passenger compartment for enclosing at least one occupying item having surfaces, a method for controlling a system in the vehicle based on the at least one occupying item comprising the steps of:
arranging a transducer in a tube having an opening,
emitting waves from the transducer to travel through the tube and out of the opening of the tube to impact a location in which the at least one occupying item is likely to be situated;
receiving reflected waves from the at least one occupying item at the same transducer after the reflected waves pass through the opening into the tube;
processing the received reflected waves to obtain information about the distance from the at least one occupying item to the transducer; and
controlling the system in the vehicle based on the determined distance from the at least one occupying item to the transducer.

16. The method of claim 15, further comprising the step of:
determining a length of the tube based on the distance required for ringing of the transducer to subside and a predetermined minimum target sensing distance defined as a distance between the opening of the tube and a position closest to the tube in which the at least one occupying item may be sensed.

17. The method of claim 15, further comprising the step of:
selecting a size of the opening of the tube and a diameter of the tube to avoid excessive signal loss and ensure reception of the reflected waves by the transducer.

18. The method of claim 15, further comprising the step of:
recessing the tube within a surface defining the passenger compartment.

19. The method of 15, further comprising the step of:
selecting a size of a diameter of the tube to avoid excessive signal loss.

20. The method of claim 15, wherein the tube includes a shaped horn adjacent an opening of the tube.

21. The method of claim 20, wherein the opening of the tube is elliptical.

22. In a motor vehicle having an interior passenger compartment for enclosing at least one occupying item having surfaces, a method for controlling a system in the vehicle based on the at least one occupying item comprising the steps of:
irradiating at least a portion of the passenger compartment in which the at least one occupying item is situated by driving a first transducer to emit waves;
receiving reflected radiation from the surfaces of the at least one occupying item within the passenger compartment at a receiver;
processing the received radiation in order to create at least one electronic signal containing information of the distance from at least one of the surfaces of the at least one occupying item to the receiver;
providing a compression amplifier to selectively amplify the at least one signal depending on the level of the at least one signal such that the magnitude of at least one larger peak in the at least one signal is reduced relative to the magnitude of at least one smaller peak in the at least one signal;
starting the compression amplifier only after the first transducer is driven to emit waves; and
controlling the system in the vehicle based on the amplified at least one signal.

23. The method of claim 22, further comprising the step of:
electronically reducing motion of a cone of the first transducer to reduce ringing of the first transducer.

24. The method of claim 23, wherein the step of electronically reducing the motion of the cone of the first transducer comprises the steps of arranging a second transducer for measuring motion of the first transducer and obtaining information from the second transducer to enable electronic circuitry to reduce the motion of the cone of the first transducer.

25. The method of claim 24, further comprising the step of:
directing the first transducer to move opposite to its measured motion after a driving phase with a view toward stopping motion of the first transducer.

26. The method of claim 23, wherein the step of electronically reducing the motion of the cone of the first transducer comprises the steps of:
determining a natural frequency of the first transducer,
tuning drive circuitry of the first transducer to drive the first transducer at the determined natural frequency, and
deriving a sequence of pulses to be fed into the drive circuitry with reversed polarity to counteract the motion of the first transducer and diminish oscillations of the first transducer.

27. The method of claim 22, further comprising the step of:

arranging the first transducer in a tube having an opening.

28. The method of claim 27, further comprising the step of:

recessing the tube within a surface defining the passenger compartment.

29. The method of claim 27, wherein the tube includes a shaped horn adjacent the opening of the tube.

30. In a motor vehicle having an interior passenger compartment for enclosing at least one occupying item having surfaces, a method for controlling a system in the vehicle based on the at least one occupying item comprising the steps of:

irradiating at least a portion of the passenger compartment in which the at least one occupying item is situated by means of a first transducer;

electronically reducing motion of a cone of the first transducer to reduce ringing of the first transducer, the step of electronically reducing the motion of the cone of the first transducer comprising the steps of arranging a second transducer to measure motion of the first transducer and obtaining information from the second transducer to enable electronic circuitry to reduce the motion of the cone of the first transducer;

receiving reflected radiation from the surfaces of the at least one occupying item within the passenger compartment at a receiver;

processing the received radiation in order to create at least one electronic signal containing information of the distance from at least one of the surfaces of the at least one occupying item to the receiver; and controlling the system in the vehicle based on the at least one signal.

31. The method of claim 30, further comprising the step of:

providing a compression amplifier to selectively amplifying the at least one signal depending on the level of the at least one signal such that the magnitude of at least one larger peak in the at least one signal is reduced relative to the magnitude of at least one smaller peak in the at least one signal, the system in the vehicle being controlled based on the amplified at least one signal.

32. The method of claim 30, further comprising the step of:

arranging the first transducer in a tube having an opening.

33. The method of claim 32, further comprising the step of:

recessing the tube within a surface defining the passenger compartment.

34. The method of claim 32, wherein the tube includes a shaped horn adjacent the opening of the tube.

35. The method of claim 30, wherein the electronic circuitry includes a Colpits or Hartley oscillator.

36. The method of claim 30, further comprising the step of forming the second transducer as part of the first transducer.

37. In a motor vehicle having an interior passenger compartment for enclosing at least one occupying item having surfaces, a method for controlling a system in the vehicle based on the at least one occupying item comprising the steps of:

irradiating at least a portion of the passenger compartment in which the at least one occupying item is situated by means of a transducer having a cone;

arranging damping material in the transducer cone to reduce ringing of the transducer;

receiving reflected radiation from the surfaces of the at least one occupying item within the passenger compartment at a receiver;

processing the received radiation in order to create at least one electronic signal containing information of the distance from at least one of the surfaces of the at least one occupying item to the receiver; and controlling the system in the vehicle based on the at least one signal.

38. The method of claim 37, wherein the damping material is a silicone rubber compound.

39. The method of claim 37, wherein the damping material is rubber diluted with a solvent.

* * * * *